United States Patent Office 3,426,067
Patented Feb. 4, 1969

3,426,067
BENZENESULFONYL UREAS AND PROCESS
FOR THEIR MANUFACTURE
Helmut Weber, Frankfurt am Main, Walter Aumüller, Kelkheim, Taunus, Rudi Weyer, Frankfurt am Main, Karl Muth, Kelkheim, Taunus, and Felix Helmut Schmidt, Mannheim, Neuostheim, Germany, assignors to Farbwerke Hoechst Aktiengesellschaft vormals Meister Lucius & Bruning, Frankfurt am Main, Germany, a corporation of Germany
No Drawing. Filed Oct. 13, 1964, Ser. No. 403,641
Claims priority, application Germany, Oct. 19, 1963,
F 41,042
U.S. Cl. 260—553                   27 Claims
Int. Cl. C07c 127/16

ABSTRACT OF THE DISCLOSURE

Benzenesulfonyl urea compounds that are effective as oral antidiabetics.

---

The present invention relates to benzenesulfonyl-ureas corresponding to the formula

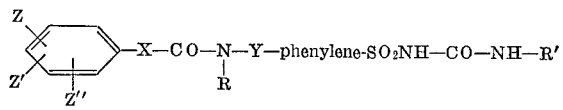

in which
R represents hydrogen, a lower alkyl or a lower phenylalkyl,
R' represents:
(a) alkyl, alkenyl or mercapto-alkyl of 2–8 carbon atoms;
(b) alkoxylalkyl, alkyl-mercaptoalkyl or alkyl-sulfinyl-alkyl having 4–8 carbon atoms of which at least 2 belong to the alkylene-part of the alkoxyalkyl, alkyl-mercaptoalkyl or alkyl-sulfinylalkyl;
(c) lower phenylalkyl, phenylcyclopropyl;
(d) lower cyclohexylalkyl, cycloheptylmethyl, cycloheptylethyl or cyclooctylmethyl;
(e) endoalkylene - cyclohexyl, endoalkylene-cyclohexenyl, endoalkylene-cyclohexylmethyl or endoalkylene - cyclohexenylmethyl with 1-2 carbon atoms in the endoalkylene part;
(f) lower alkylcyclohexyl, lower alkoxycyclohexyl;
(g) cycloalkyl of 5–8 carbon atoms;
(h) cyclohexenyl, cyclohexenylmethyl;
(i) a heterocyclic ring with 4–5 carbon atoms and 1 oxygen atom or 1 sulfur atom as well as with up to 2 ethylenic double linkages, or
(k) a heterocyclic ring linked to the nitrogen atom by means of a methylene group and containing 4–5 carbon atoms, 1 oxygen atom or 1 sulfur atom and up to 2 ethylenic double linkages;
X represents a single chemical linkage or a bridge member of 1 to 6 carbon atoms and, if desired, one of the groups —O—, —S—, —SO— or —SO₂—;
Y stands for a hydrocarbon chain containing 1–4 carbon atoms;
Z stands for hydrogen, lower alkyl, lower alkoxy, halogen, cycloalkoxy having 5–6 carbon atoms, cyclohexyl, lower alkylmercapto, lower alkylsulfinyl, lower alkylsulfonyl, phenylsulfonyl, phenyl, lower phenylalkyl, lower acyl, benzoyl, trifluoromethyl, hydroxy, lower acyloxy, benzyloxy, carboxy, lower carbalkoxy, nitrile, carbamyl, lower alkyl-carbamyl, lower dialkyl-carbamyl or nitro;
Z' and Z" independently of each other represent hydrogen or, if Z stands for hydrogen, hydroxy, carboxy, alkyl, alkoxy or halogen, likewise lower alkyl, lower alkoxy or halogen, or—if Z stands for hydrogen—Z' and Z" together represent the methylenedioxy-group —O—CH₂O—
and to the salts of said benzenesulfonyl-ureas.

In the above and the following definitions "lower alkyl" always means alkyl of 1–4 carbon atoms in straight or branched chain. "Lower acyl" stands for an acyl radical (organic acid radical) having up to 4 carbon atoms, preferably a straight-chain or branched alkanoyl radical of the chain length indicated.

In accordance with the definitions given above, R may represent, for instance, methyl, ethyl, propyl, isopropyl, butyl, isobutyl, tert.butyl, benzyl, α- or β-phenyl-ethyl, α-, β- or γ-phenylpropyl. Compounds in which R stands for methyl or benzyl and, above all, those in which R represents hydrogen, are preferred.

R₂ may represent, for instance, ethyl, propyl, isopropyl, butyl, isobutyl, sec. butyl, straight chain or branched amyl (pentyl), hexyl, heptyl or octyl; the radicals with an ethylenic double linkage, such as allyl or crotyl corresponding to the above-mentioned hydrocarbon radical, furthermore alkyls with 2–8 carbon atoms, carrying, in addition, a mercapto group, for instance β-mercaptoethyl or higher mercaptoalkyls. R' may likewise represent, for instance, γ-methoxypropyl, δ-methoxy-n-butyl, β-ethoxyethyl, γ-ethoxypropyl, δ-ethoxybutyl or higher alkyloxyethyls, -propyls or -butyls as well as the corresponding groups in which the oxygen atom is replaced by a sulfur atom or the member —SO—. Furthermore, R' may stand for benzyl, α-phenylethyl, β-phenylethyl, α-, β- or γ-phenylpropyl or phenylbutyls.

Within the scope of the invention there are particularly preferred compounds containing as R' a cycloaliphatic hydrocarbon radical which may be substituted by alkyl or alkoxy or linked to the nitrogen atom by means of alkylene. Said radicals comprise, for instance, cyclopentyl, cyclohexyl, cycloheptyl, cyclooctyl, methyl-cyclohexyl, ethyl-cyclohexyl, propyl-cyclohexyl, isopropyl-cyclohexyl, methoxy-cyclohexyl, ethoxy-cyclohexyl, propoxy-cyclohexyl, isopropoxy-cyclohexyl. The alkyl-groups or the alkoxy-groups may be present in 2-, 3- or 4-position, preferably in 4-position, in cis- as well as in trans-position. Furthermore, there are mentioned: cyclohexyl-methyl, α- or β-cyclohexylethyl, cyclohexylpropyls, endo-methylene-cyclohexyl (2,2,1-tricycloheptyl), endoethylene-cyclohexyl (2,2,2-tricyclooctyl), endomethylene-cyclohexenyl, endoethylene-cyclohexenyl, endomethylene-cyclohexylmethyl, endoethylene-cyclohexylmethyl, endo-methylene-cyclohexenylmethyl, or endoethylene-cyclohexenyl-methyl, α- or β-phenyl-cyclopropyl in cis as well as in trans form.

Finally, there are suitable as R' heterocyclic rings containing in addition to 4–5 carbon atoms 1 oxygen- or sulfur atom and up to 2 double linkages, which may be bound by means of a methylene-group to the adjacent nitrogen atom. Examples of said heterocyclic rings are:

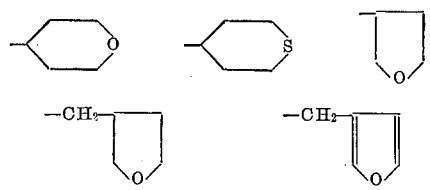

According to the definition X is a single chemical linkage or a bridge member of 1–6 carbon atoms belonging to a hydrocarbon chain and, if desired, one of the groups —O—, —S—, —SO—, or —SO₂—. The two last-mentioned groupings may interrupt the hydrocarbon chain or may stand between the latter and the phenyl nucleus. The groups —O— or —S— may likewise be present between the hydrocarbon chain and the carbonyl-group. According thereto, X may stand for: —CH$_2$—, —CH$_2$—CH$_2$—, —CH(CH$_3$)—, —CH$_2$—CH$_2$—CH$_2$—,

—CH(CH$_3$)—CH$_2$—, —CH$_2$—CH(CH$_3$)—

—C(H$_3$)$_2$—, —CH$_2$—CH$_2$—CH$_2$—CH$_2$—

—CH(CH$_3$)—CH$_2$—CH$_2$—

—CH$_2$—CH(CH$_3$)—CH$_2$—

—CH$_2$—CH$_2$—CH(CH$_3$)—, —CH(CH$_3$)—CH(CH$_3$)—,

—C(CH$_3$)$_2$—CH$_2$—, —CH$_2$—C(CH$_3$)$_2$—

—CH(C$_2$H$_5$)—, —C(C$_2$H$_5$)$_2$—, —C(CH$_3$)(C$_2$H$_5$)— as well as for corresponding straight-chain or branched pentylene- or hexylene-bridges, furthermore for unsaturated members such as, for instance, —CH=CH—,

—CH$_2$—CH=CH—, —CH=CH—CH$_2$—

—C(CH$_3$)=CH—, —CH=C(CH$_3$)— or higher members of the same structure which may likewise carry several double linkages. Examples of members which—in addition—contain one of the above-mentioned heterogroups are: —O—CH$_2$—, —O—CH$_2$—CH$_2$—, —O—CH$_2$—CH$_2$—CH$_2$—, —O—CH(CH$_3$)—

—CH$_2$—O—, —S—CH$_2$—, —S—CH$_2$—CH$_2$—

—CH$_2$—S—CH$_2$—, —S—CH(CH$_3$)—, —SO$_2$—CH$_2$—, —O—C(C$_2$H$_5$)$_2$—.

Finally this bridge member may be of cyclic structure and represent, for instance, the 1,1-cyclopentylidene radical

or corresponding cycloalkylidene radicals, preferably those containing 3–6 carbon atoms.

Y stands for a straight-chain or branched hydrocarbon radical containing 1–4 carbon atoms. As examples there are mentioned the members defined above with regard to X as far as they are covered by the general definition of Y.

As examples for the substituents Z, Z' and Z" there are mentioned: methyl, ethyl, propyl, isopropyl, n-butyl, isobutyl or tert. butyl as well as the corresponding alkoxy-groups, fluorine, chlorine, bromine, iodine, cyclohexyloxy, cyclopentyloxy, methyl-mercapto, ethyl-mercapto, propyl-mercapto or butyl-mercapto, methyl-sulfinyl, ethyl-sulfinyl, propyl-sulfinyl, butyl-sulfinyl, methylsulfonyl, ethyl-sulfonyl, propyl-sulfonyl, butyl-sulfonyl with straight-chain or branched alkyl radicals, benzyl, phenylethyl, phenylpropyl, acetyl, propionyl, butyryl, acetoxy, propionyloxy, butyryloxy, carbomethoxy, carboethoxy carbopropoxy, methylcarbamyl, ethylcarbamyl, dimethylcarbamyl or diethylcarbamyl.

The phenylene radical indicated in the formula by —phenylene— can preferably be unsubstituted or more or several times substituted by halogen, lower alkyl or lower alkoxy. It may contain the remaining parts of the molecule in ortho-, meta- or para-position to one another, the para-position being preferred.

The above-mentioned benzenesulfonyl-ureas can be prepared according to methods generally known for the preparation of compounds of said class.

The following methods may be applied, for instance:

(a) Amines of the formula R'NH$_2$ or, if desired, their salts are reacted with benzenesulfonyl-isocyanates, benzenesulfonyl-carbamic acid esters, benzenesulfonyl-thiocarbamic acid esters, benzenesulfonyl-carbamic acid halides or benzene sulfonyl-ureas carrying the substituent

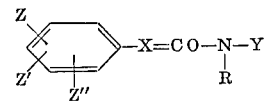

(b) Benzenesulfonamides or their salts carrying the substituent

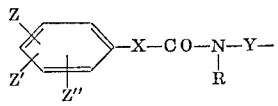

are reacted with R'-substituted isocyanates, carbamic acid esters, thiocarbamic acid esters, carbamic acid halides or ureas.

(c) Benzenesulfonyl-chlorides carrying the substituent

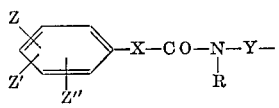

are reacted with R'-substituted ureas, isourea-ethers, isothiourea-ethers or parabanic acids and the benzenesulfonyl-isourea-ethers, benzenesulfonyl-isothiourea-ethers, or benzenesulfonyl-parabanic acids obtained in this way or by another method are hydrolized.

(d) In correspondingly substituted benzenesulfonyl-thioureas the sulfur atom is replaced by an oxygen atom.

(e) Correspondingly substituted benzenesulfenyl-ureas or benzenesulfinylureas are oxydized.

(f) In one or several reaction stages the radical

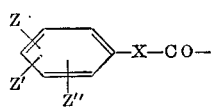

is introduced by acylation into benzenesulfonyl-ureas of the formula

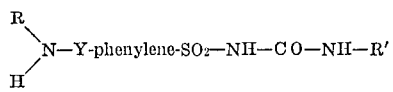

(g) In benzenesulfonyl-ureas of the above-mentioned formula in which Z represents a hydroxy group or a carboxy group protected by esterification or a hydroxy group protected by etherification or—if X stands for a single chemical linkage and R for H—a carboxy group being in o-position to the carbonimide grouping and protected by phthalimide formation, the carboxy group is set free by hydrolysis or catalytic hydrogenation, or (h) In benzenesulfonyl-ureas of the above-mentioned formula in which X contains one or more ethylenic double linkages, these are hydrogenated and the products are treated with alkaline agents if salt formation is desirable.

According to the nature of the members Z, Z', Z", X and R', the one or the other of the processes mentioned above may in single cases be unsuitable for the preparation of the individual compounds covered by the general formula, or at least measures for protecting active groups may be required. Said cases which are relatively unusual are easily recognized by the expert and it does not cause any difficulties to apply with success another method of synthesis of those described above. Thus, it may be necessary to protect hydroxy-groups mentioned sub Z by esterification or etherification, carboxy-groups present in corresponding position by esterification, or a carboxy-group in ortho-position to the carbonamide group likewise by ring closure to the phthalimide derivative. The conditions are similar if R' represents a mercaptoalkyl-group.

The above-mentioned benzenesulfonyl-carbamic acid esters or benzenesulfonyl-thiocarbamic acid esters may contain in the alcohol component a lower alkyl radical or a phenyl radical. The same applies to the R¹-substituted carbamic acid esters or the corresponding mono-thiocarbamic acid esters.

As carbamic acid halides, the chlorides are, above all, appropriate.

The benzenesulfonyl-ureas to be used as starting substances for the process may be unsubstituted at the side of the urea molecule opposite to the sulfonyl group or may, preferably, be once or twice substituted by lower alkyl radicals or aryl radicals. The aryl radicals may be linked with one another by a chemical linkage or by means of a bridge member such, for instance, as —CH₂—, —NH—, —O— or —S—. Instead of benzenesulfonyl-ureas substituted in said manner there can likewise be used corresponding N-benzenesulfonyl-N'-acyl-ureas which—in addition—may be alkylated or arylated at the N'-nitrogen atom, and likewise bis-(benzene sulfonyl)-ureas. It is, for instance, possible to treat said bis - (benzenesulfonyl)ureas or N - benzenesulfonyl - N'-acyl-ureas with amines R¹NH₂, and to heat the salts obtained to elevated temperatures, particularly above 100° C.

It is likewise possible to start from ureas of the formula R¹—NH—CO—NH₂ or from acylated ureas of the formula R¹—NH—CO—NH—acyl, wherein acyl represents an aliphatic or aromatic acid radical preferably of low molecular weight or the nitro-group, or from phenyl-ureas of the formula R¹—NH—CO—NH—C₆H₅ or from diphenyl-ureas of the formula

R¹—NH—CO—N(C₆H₅)₂ in which case the phenyl radicals may be substituted and may be linked with one another directly or by means of a bridge member such as —CH₂—, NH—, —O— or —S—, or from N,N-disubstituted ureas of the formula R¹—NH—CO—NH—R¹ and to react them with benzene-sulfonamides substituted by

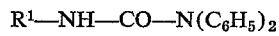

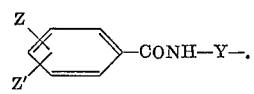

In the correspondingly substituted benzenesulfonyl-thio-ureas the sulfur atom can be replaced by an oxygen atom, for example, with the aid of oxides or salts of heavy metals or likewise by the use of oxydizing agents such as hydrogen peroxide, sodium peroxide or nitrous acid.

The thio-ureas can likewise be desulfurized by treatment with phosgene or phosphorus pentachloride. Chloroformic acid amidines or chloroformic acid carbodiimides obtained as intermediate products can be converted into the benzenesulfonyl ureas by an appropriate treatment, for instance by hydrolysis or addition of water.

The use of phthalimide compounds—if Z represents carboxyl—in ortho-position to the carbonamide grouping is, in principle, possible with all types of reaction. The splitting up of the phthalimide radical can be provoked by alkaline agents; generally it occurs, however, already in the course of the reaction or when the reaction products are worked up. If esters or benzyl-ethers are used, a splitting may be realized later on, in order to obtain the free compounds.

In the same way, a hydroxy-group or a carboxy-group covered by "Z" can be protected and the subsequent splitting of the protective group can be carried out with all types of reactions mentioned above. If Z represents a hydroxy-group, there enter into consideration as protective groups acyl-groups, in particular lower alkanoyl-groups and the benzoyl-group as well as hydrocarbon radicals, especially benzyl, which are capable of being split off by hydrolysis or catalytic hydrogenation. If Z represents a carboxy-group, the protection is realized by esterification with alcohols, especially lower aliphatic alcohols or benzyl alcohol and subsequent splitting by hydrolysis. If compounds are desired which as "Z" contain carbalkoxy or acyloxy or benzyloxy, hydrolysis has, naturally, to be omitted.

As regards the reaction conditions, the forms of realizing the process of the invention, may, in general, vary within wide limits and can be adapted to each individual case.

For example, the reactions can be carried out with the use of solvents, at room temperature or at an elevated temperature.

As starting substances there are used, on the one hand, compounds containing a benzene radical substituted by the group

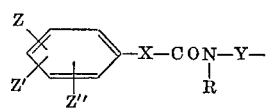

As part

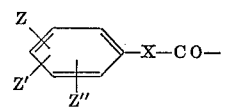

of said formula there enter into consideration:

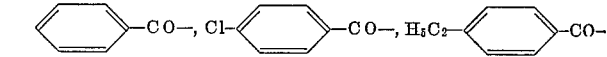
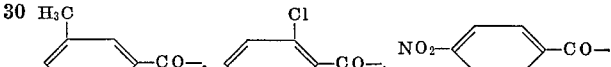
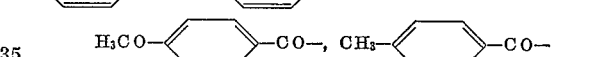
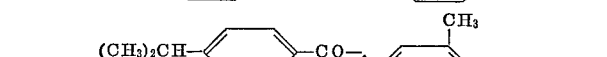
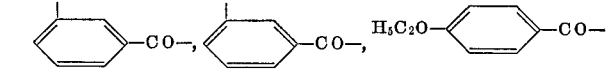
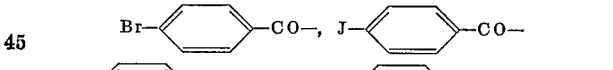
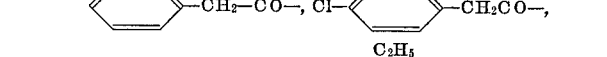
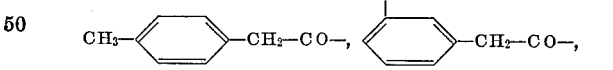
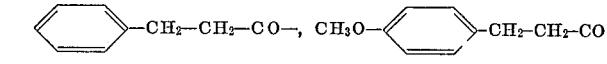
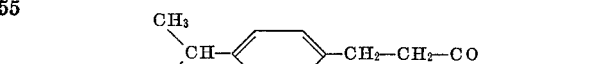
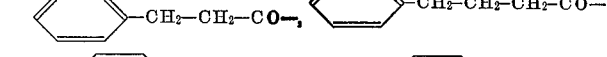
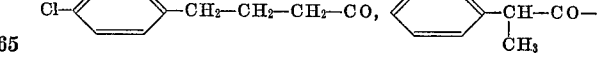
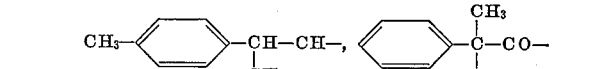
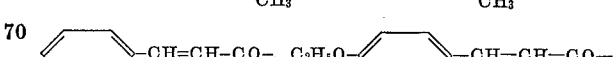
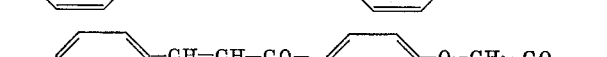

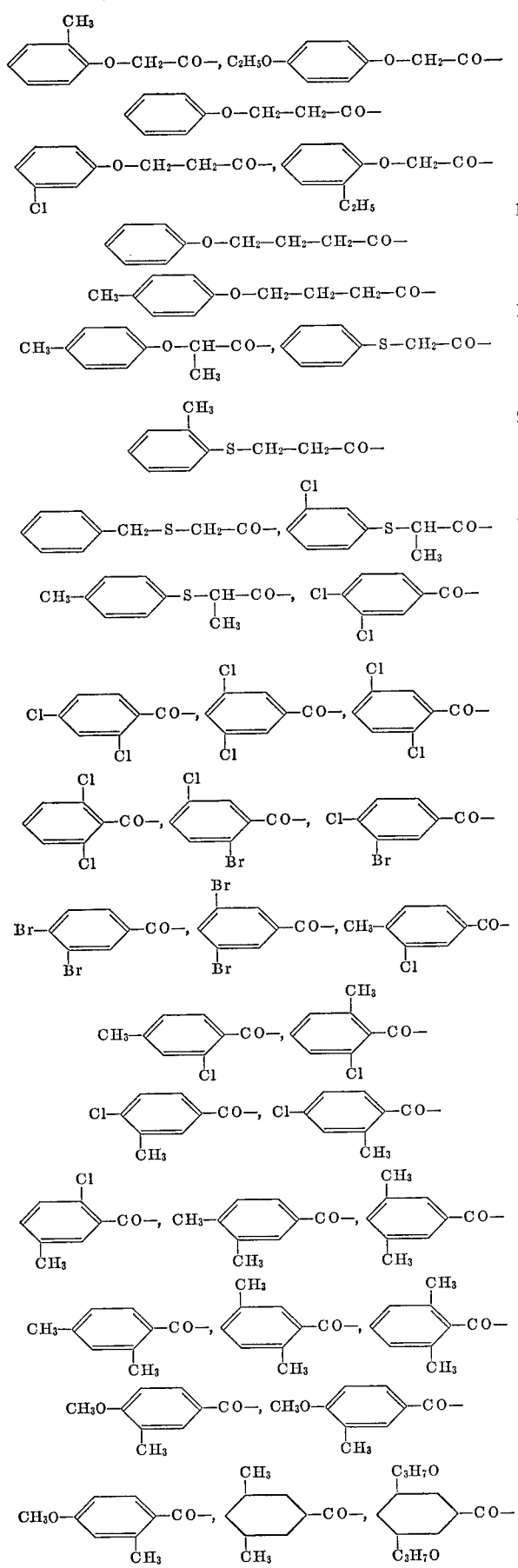
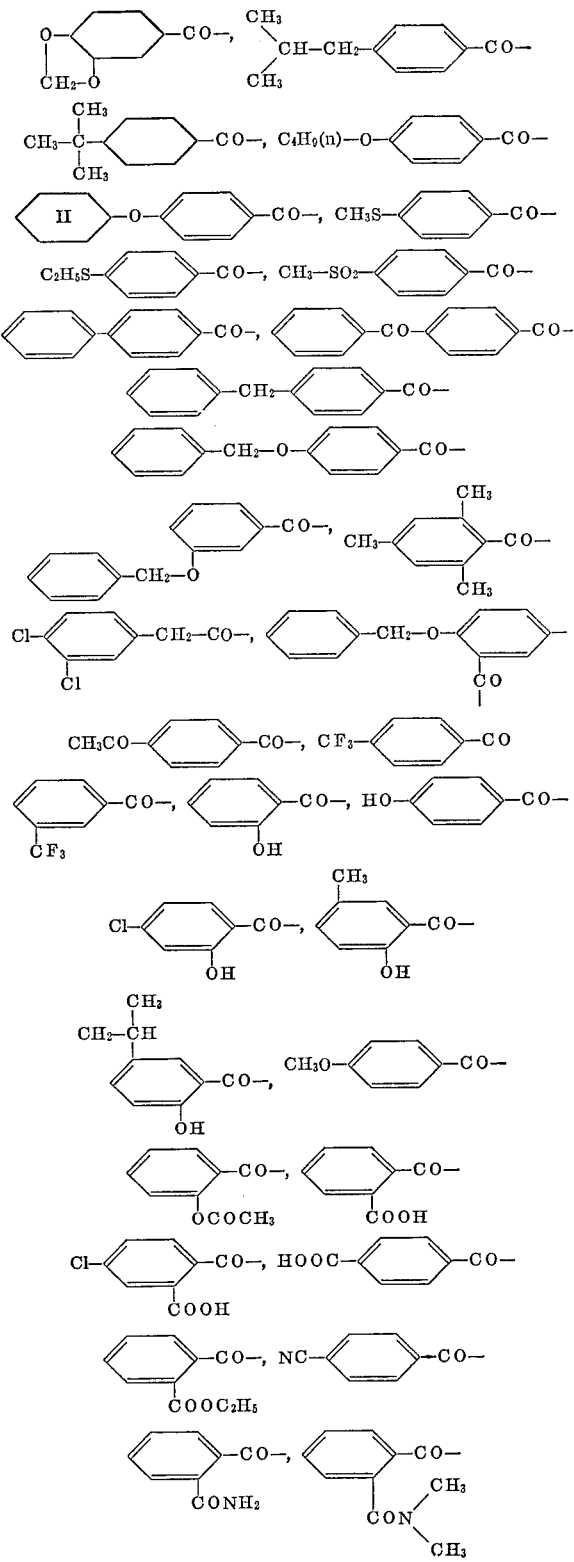

The benzenesulfonyl-urea derivatives obtained according to the process of the present invention are valuable medicaments characterized by a strong and—above all—a long-lasting blood sugar lowering action. Their hypoglycemic action could be determined, for instance, in rabbits by feeding them the products obtained according to the process of the invention in the usual doses of 400 milligrams/kilogram and determining the blood sugar value according to the known method of Hagedorn-Jensen over a prolonged period.

Thus, it was found, for instance, that the N-[4-(β-benzamidoethyl-benzenesulfonyl]-N'-cyclohexyl-urea provokes a maximal lowering of the blood sugar (measured after 6 hours) of 32%. After 24 hours it still amounts to 32%. By administering N-[4-(β-benzamido-ethyl)-benzenesulfonyl]-N'-(4'-methylcyclohexyl)-urea the blood sugar level is lowered by 34% as a maximum, after 24 hours the lowering still amounts to 31% and after 48 hours still to 20%. In contradistinction thereto, the N-(4-methyl-benzenesulfonyl)-N'-butyl-urea known as antidiabetic for oral administration and used as a medicament over the whole world, in a comparison test given in the abovementioned dose showed a blood sugar lowering amounting to 40% as a maximum, which, however, after 24 hours had fallen to zero. Upon administration of the considerably lower dose of 50 mg./kg. to rabbits—which dose allows of determining the hypoglycemic action in a more differentiated manner and comes nearer to the therapeutical dose—it was found that the new N-[4-(β-benzamido-ethyl)-benzenesulfonyl]-N'-cyclohexyl-urea after 24 hours upon administration showed a lowering of the blood sugar amounting to 17% and after 48 hours a such of 11%, and the new N-[4-(β-benzamido-ethyl)-benzenesulfonyl]-N'-(4'-methyl-cyclohexyl)-urea after 24 hours even caused a lowering of 21%, whereas the blood-sugar lowering action of the known N-(4-methyl-benzenesulfonyl)-N'-n-butyl-urea given in the same dose after 24 hours was equal to zero.

Furthermore, it was ascertained, for instance, that 50 mg./kg. of the N-[4-(β-phenoxy-acetamidoethyl)-benzenesulfonyl]-N'-cyclohexyl-urea provoke in the rabbit a blood sugar lowering of 40% after 6 hours, whereas the blood sugar level is reduced by 30% upon administration of the known N-(4-methyl-benzenesulfonyl)-N'-n-butyl-urea.

The strong action of the products obtained according to the invention is particularly evident if the dose is reduced. If N-[4-(β-phenoxyacetamidoethyl)-benzenesulfonyl]-N'-cyclohexyl-urea or N-[4-(β-phenylacetamidoethyl)-benzenesulfonyl]-N'-cyclohexyl-urea is given to rabbits in doses of 1 mg./kg. a distinct lowering of the blood sugar can still be ascertained, when the above-mentioned N-(4-methyl-benzenesulfonyl)-N'-n-butyl-urea given to the rabbit in a dose of less than 25 milligrams/kilogram is no more active.

When administering the N-[4-(β-3-chloro-4-methyl-benzamidoethyl)-benzenesulfonyl]-N'-(4-methyl-cyclohexyl)-urea in a dose of 0.2 mg./kg., the N-[4-(β-3,5-dimethoxy-benzamidoethyl)-benzenesulfonyl]-N'-cyclohexyl-urea in a dose of 0.3 mg./kg. or the N-[4-(β-3,4-dichloro-benzamidoethyl)-benzenesulfonyl]-N'-cyclohexyl-urea in a dose of 0.3 mg./kg., the N-[4-(β-2-hydroxy-benzamidoethyl)-benzenesulfonyl]-N'-n-butyl-urea in a dose of 2 mg./kg. or the N-[4-(β-2-hydroxy-benzamidoethyl)-benzenesulfonyl]-N'-cyclohexyl-urea in a dose of 0.15 mg./kg. to rabbits a distinct lowering of the blood sugar can still be observed.

The following table shows for a number of compounds forming the object of the present invention the doses in mg./kg. which, upon oral administration to rabbits still provoke a distinctly recognizable lowering of the blood sugar level ("threshold dose"). For comparison, it is stated that the threshold dose for the known N-(4-methyl-benzenesulfonyl)-N'-n-butyl-urea amounts to about 25 mg./kg.

| Compound | Threshold dose on oral administration to rabbits (mg./kg.) |
| --- | --- |
| N - [4 - (β - benzamido-ethyl)-benzenesulfonyl]-N'-cyclohexyl-urea | 0.1 |
| N - [4 - (β - benzamido-ethyl)-benzenesulfonyl]-N'-(4-methyl-cyclohexyl)-urea | 0.04 |
| N - [4 - (β - phenoxy - acetamido-ethyl)-benzenesulfonyl]-N'-cyclohexyl-urea | 0.1 |
| N - [4-(β-phenyl-acetamido-ethyl)-benzenesulfonyl]-N'-cyclohexyl-urea | 1 |
| N - [4 - (β-<3-chloro-4-methyl-benzamido>-ethyl)-benzenesulfonyl]-N'-(4-methyl-cyclohexyl)-urea | 0.2 |
| N - [4 - (β - <3,4-dichloro-benzamido>-ethyl)-benzenesulfonyl]-N'-cyclohexyl-urea | 0.3 |
| N - [4-(β-<2-hydroxy-benzamido>-ethyl)-benzenesulfonyl]-N'-n-butyl-urea | 2 |
| N - [4-(β-<2-hydroxy-benzamido>-ethyl)-benzenesulfonyl]-N'-cyclohexyl-urea | 0.15 |
| N - [4-(β<4-methoxy-benzamido>-ethyl)-benzenesulfonyl]-N'-cyclohexyl-urea | 0.2 |
| N - [4-(β<4-methoxy-benzamido>-ethyl)-benzenesulfonyl]-N'-(4-methyl-cyclohexyl)-urea | 0.3 |
| N - [4 - <3 - methyl-benzamido>-ethyl)-benzenesulfonyl]-N'-cyclohexyl-urea | 0.1 |
| N - [4-(β<4-methoxy-benzamido>-ethyl)-benzenesulfonyl]-N'-(4-methyl-cyclohexyl)-urea | 0.2 |
| N - [4 - (β - <4-chloro-benzamido>-ethyl)-benzenesulfonyl]-N'-cyclohexyl-urea | 0.2 |
| N - [4-(β-phenyl-acetamido-ethyl)-benzenesulfonyl]-N'-(4-methyl-cyclohexyl)-urea | 0.5 |
| N - [4 - (β-<α-phenoxy-propionamido>-ethyl)-benzenesulfonyl]-N'-cyclohexyl-urea | 0.1 |
| N - [4 - (β - benzamido-α-methyl-ethyl)-benzenesulfonyl]-N'-cyclohexyl-urea | 0.4 |
| N - [4 - (phenacetamido-methyl)-benzenesulfonyl]-N'-(4-methyl-cyclohexyl)-urea | 0.2 |
| N - [4 - (β - benzamido-ethyl)-benzenesulfonyl]-N'-(4-ethyl-cyclohexyl)-urea | 0.08 |
| N - [4 - (β - <3-trifluoromethyl-benzamido>-ethyl)-benzenesulfonyl]-N'-n-butyl-urea | 0.3 |
| N - [4 - (β - <3-trifluoromethyl-benzamido>-ethyl)-benzenesulfonyl]-N'-(4-methyl-cyclohexyl)-urea | 0.15 |
| N - [4-(β<3-fluoro-benzamido>-ethyl)-benzenesulfonyl]-N'-cyclohexyl-urea | 0.1 |
| N - [4 - (β - <β-phenyl-propionamido>-ethyl)-benzenesulfonyl]-N'-cyclohexyl-urea | 0.3 |
| N - [4 - (β - <β-phenyl-propionamido>-ethyl)-benzenesulfonyl]-N'-(4-methyl-cyclohexyl)-urea | 0.08 |
| N - [4 - (β - <4-chloro-phenoxy-acetamido>-ethyl)-benzenesulfonyl]-N'-cyclohexyl-urea | 0.2 |
| N-[4-(β-cinnamoylamido-ethyl) - benzenesulfonyl]-N'-(4-methyl-cyclohexyl)-urea | 0.2 |
| N - [4-(β-<4-ethyl-benzamido>-ethyl)-benzenesulfonyl]-N'-(4-methyl-cyclohexyl)-urea | 0.2 |
| N - [4 - (β-<3-chloro-benzamido>-ethyl)-benzenesulfonyl]-N'-(4-methyl-cyclohexyl)-urea | 0.1 |
| N - [4 - (β - <3,4-dimethyl-benzamido>-ethyl)-benzenesulfonyl]-N'-(4-methyl-cyclohexyl)-urea | 0.2 |
| N - [4 - (β - benzyloxy-carbonamido-ethyl)-benzenesulfonyl]-N'-cyclohexyl-urea | 0.2 |
| N - [4-(β<3-methyl-benzamido>-propyl)-benzenesulfonyl]-N'-cyclohexyl-urea | 0.2 |
| N - [4 - (β - phenoxyacetamido-propyl)-benzenesulfonyl]-N'-(4-methyl-cyclohexyl)-urea | 0.3 |
| N-[4-(α,α-dimethyl - β - benzamido-ethyl)-benzenesulfonyl]-N'-(4-methyl-cyclohexyl)-urea | 1 |
| N - [4 - chloro - 3 - (β-benzamido-ethyl)-benzenesulfonyl]-N'-(4-methyl-cyclohexyl)-urea | 0.6 |
| N - [4 - (β - phenylmercapto - acetamido-ethyl)-benzenesulfonyl]-N'-(4-methyl-cyclohexyl)-urea | 0.2 |
| N - [4-(β-<3,4-dichloro-phenylacetamido>-ethyl)-benzenesulfonyl]-N'-(4-methyl-cyclohexyl)-urea | 0.3 |
| N-[4-(α-ethyl - β - benzamido - ethyl) - benzenesulfonyl]-N'-(4-methyl-cyclohexyl)-urea | 1 |
| N - [4 - (β-<4-ethoxy-benzamido>-ethyl)-benzenesulfonyl]-N'-(4-methyl-cyclohexyl)-urea | 0.4 |
| N - [4-(β-<4-ethyl-benzamido>-ethyl)-benzenesulfonyl]-N'-(4-methyl-cyclohexyl)-urea | 0.2 |
| N - [4 - (β-<N-methyl-benzamido>-ethyl)-benzenesulfonyl]-N'-(4-methyl-cyclohexyl)-urea | 2 |

| | |
|---|---|
| N-[4-(β-<4 - phenyl - benzamido>-ethyl)-benzenesulfonyl]-N'-cyclohexyl-urea | 2 |
| N-[4-(β-<N-benzyl-benzamido> - ethyl) - benzenesufonyl]-N'-cyclohexyl-urea | 1 |
| N - [4-(β-benzamido-ethyl)-benzenesulfonyl]-N'-cyclohexylmethyl-urea | 1 |
| N - [4 - (β - benzamido-ethyl)-benzenesulfonyl]-N'-(4-methoxy-cyclohexyl)-urea | 2 |
| N - [4 - (γ-benzamido-propyl)-benzenesulfonyl]-N'-(4-methyl-cyclohexyl)-urea | 0.8 |
| N-[4-(γ-<4-methoxy-benzamido>-propyl)-benzenesulfonyl]-N'-(4-methyl-cyclohexyl)-urea | 0.6 |
| N - [4-(γ-<3-chloro-4-methyl-benzamido>-propyl)-benzenesulfonyl]-N'-cyclohexyl-urea | 1 |
| N - [4-(β-<3,5-dimethoxy-benzamido>-ethyl)-benzenesulfonyl]-N'-cyclohexyl-urea | 0.3 |

The above-described benzenesulfonyl-ureas are preferably destined for the manufacture of orally administerable preparations showing blood sugar lowering action in the treatment of diabetes mellitus and can be applied as such or in the form of their salts or in the presence of substances causing salt formation. For the formation of salts there can be used: alkaline agents, for instance, alkali metal hydroxides, alkaline earth metal hydroxides, alkali metal carbonates, alkaline earth metal carbonates, alkali metal bicarbonates, alkaline earth metal bicarbonates, but likewise organic bases, particularly tertiary nitrogen bases, if the latter are tolerated by the organism.

As pharmaceutical preparations there enter into consideration preferably tablets containing in addition to the products of the invention the usual adjuvants and carriers such as talc, starch, lactose, tragacanth or magnesium stearate.

A preparation containing the above-mentioned benzenesulfonyl-ureas as active substance, for instance, a tablet or a powder, with or without the above-mentioned additions, is favorably brought into a suitable dosage unit form. The dose chosen should comply with the activity of the benzenesulfonyl-urea used and the desired effect. Favorably, the dosage per unit amounts to about 0.5 to 100 milligrams, preferably to 2–10 milligrams, but considerably higher or lower dosage units can likewise be used which, if desired, are divided or multiplied prior to application.

EXAMPLE 1

N-[4-(β-benzamido-ethyl)-benzenesulfonyl]-N'-cyclohexyl-urea 13.6 g. of mercuric chloride (0.05 mol) were dissolved in 120 ml. of water. 50 ml. of a 2 N-sodium hydroxide solution were added dropwise, while stirring. The precipitated mercury oxide was combined with 17.8 g. (0.04 mol) of N - [4 - (β - benzamido - ethyl) - benzenesulfonyl]-N'-cyclohexyl-thiourea (melting point 106–108°, prepared from 4-(β-benzamido-ethyl)-benzenesulfonamide and cyclohexyl mustard oil) dissolved in 80 ml. of a mixture of equal parts of 1 N-sodium hydroxide solution and dimethyl formamide, at a temperature of 40°. Stirring was then continued for 2½ hours at 40–50°. The mercuric sulfide formed was filtered off with suction and washed with a small quantity of water. The filtrate was clarified with charcoal and acidified with dilute hydrochloric acid. A precipitate of N-[4-(β-benzamido - ethyl) - benzenesulfonyl]-N'-cyclohexyl-urea was obtained, which was filtered off with suction, washed with water and recrystallized from methanol. Melting point: 189–191°.

EXAMPLE 2

N-[4-(β-benzamido-ethyl)-benzenesulfonyl]-N'-cyclohexyl-urea 4.5 g. of N-[4-(β-benzamido-ethyl)-benzenesulfonyl]-N'-cyclohexyl-isourea methyl ether (melting point 151–153° C.) were heated with 100 ml. of concentrated hydrochloric acid for 5 minutes on the steam bath. The precipitated N-[4-(β-benzamido-ethyl)-benzenesulfonyl]-N'-cyclohexyl-urea was filtered off with suction, triturated with water and recrystallized from methanol. Melting point: 189–191° C.

EXAMPLE 3

N-[4-(benzamido-methyl)-benzenesulfonyl]-N'-cyclohexyl-urea 35 g. of N-(4-benzamido-methyl-benzenesulfonyl)-methylurethane (melting point 170–171°) were dissolved in 50 ml. of xylene; to this solution were added dropwise, while stirring and at 70°, 10 g. of cyclohexylamine. The temperature was raised to 120–130°, whereupon the reaction set in after a short time, with evolution of methanol. After 30 minutes, the whole was cooled, the sulfonyl urea formed precipitated and was recrystallized twice from methanol. The melting point of N-[4-(benzamido-methyl)-benzenesulfonyl]-N'-cyclohexyl-urea was found to be 201–202°.

In analogous manner, there were obtained: N-[4-(benzamido - methyl) - benzenesulfonyl] - N'-cyclooctyl-urea (melting point: 185–186°) (from methanol); N-[4-(benzamido - methyl) - benzenesulfonyl] - N'-butyl-urea (melting point: 193–194°) (from methanol); N-[4-(benzamido - methyl) - benzenesulfonyl] - N'-(4'-methyl-cyclohexyl)-urea (melting point: 210–212°) (from methanol).

EXAMPLE 4

N-[4-(β-4'-chlorobenzamido-ethyl)-benzenesulfonyl]-N'-cyclohexyl-urea

A mixture of 9.5 g. of N-[4-(β-4'-chloro-benzamido-ethyl)-benzenesulfonyl]-urea (melting point 194–196°), 300 ml. of toluene, 30 ml. of glycol monomethyl ether, 1.65 g. of glacial acetic acid, and 2.8 g. of cyclohexylamine was heated under reflux for 5 hours, while stirring. The mixture was concentrated under reduced pressure and the residue was triturated with alcohol. The N-(4-(β-4'-chlorobenzamido - ethyl) - benzenesulfonyl] - N' - cyclohexyl-urea obtained as crude product was filtered off with suction after recrystallization from a mixture of dimethylformamide and water, it was found to melt at 196–197.5°.

In analogus manner, there were obtained: N-[4-(β-4'-chloro - benzamido - ethyl) - benzenesulfonyl] - N'-cyclooctyl-urea (melting point: 180–181°) from dimethylformamide/water); N-[4-(β-4'-chloro-benzamido-ethyl)-benzenesulfonyl]-N'-butyl-urea (melting point: 166–168°) (from dimethylformamide/water); N - [4 - (β-chloro - benzamido - ethyl) - benzenesulfonyl] - N' - (4'-methylcyclohexyl)-urea (melting point: 200–202°) (from dimethylformamide/water).

EXAMPLE 5

N-[4-(β-benzamido-ethyl)-benzenesulfonyl]-N'-(4-methylcyclohexyl)-urea 60.8 g. of 4-(β-benzamido-ethyl)-benzenesulfonamide were dissolved in 100 ml. of 2 N-sodium hydroxide solution and 400 ml. of acetone and to this solution, 28 g. of 4-methylcyclohexyl-isocyanate were added dropwise at 0–5°. Stirring was continued for 2 hours, double the amount of water was then added, the whole was filtered over charcoal and the filtrate was acidified with dilute hydrochloric acid. The precipitated crystals of N-[4-(β-benzamido - ethyl) - benzenesulfonyl] - N' - (4 - methylcyclohexyl)-urea were found to melt after recrystallization from methanol at 177–178°.

In analogous manner, there were obtained: N - [4 - (β-benzamido - ethyl) - benzenesulfonyl] - N' - cyclooctyl-urea (melting point: 148–149°) (from methanol); N - [4 - (β - benzamido - ethyl) - benzenesulfonyl] - N'-cyclohexyl-urea (melting point: 189–191°) (from methanol); N - [4 - (β - benzamido - ethyl)-benzenesulfonyl]-N'-butyl-urea (melting point: 183.5–185°) (from methanol); N - [4 - (β - 4'-methyl-benzamido-ethyl)-benzenesulfonyl]-N'-cyclooctyl-urea (melting point: 168–170°) (from methanol); N-[4-(β-4'-methyl-benzamido-ethyl)-benzenesulfonyl]-N'-cyclohexyl-urea (melting point: 204–206°) (from dimethylformamide/water); N-[4-(β-4'-methylbenzamido - ethyl)-benzenesulfonyl]-N'-butyl-urea (melting point: 185.5–186.5°) (from methanol); N-[4-(β - 4' - methyl - benzamido - ethyl) - benzenesulfonyl]-N'-(4-methyl-cyclohexyl)-urea (melting point: 183–185°) (from dimethylformamide/water); N-[4-(β-4'-methoxybenzamido - ethyl) - benzenesulfonyl]-N'-cyclooctyl-urea (melting point: 192–193°) (from dimethylformamide/water); N - [4-(β-4'-methoxy-benzamido-ethyl)-benzenesulfonyl]-N'-cyclohexyl-urea (melting point: 209–211°) (from dimethylformamide/water); N-[4-(β-4'-methoxybenzamido-ethyl)-benzenesulfonyl]-N'-butyl-urea (melting point: 194–195°) (from dimethylformamide/water); N - (4 - (β - 4' - methoxy - benzamido - ethyl) - benzenesulfonyl]-N'-(4-methylcyclohexyl)-urea (melting point: 208–209°) (from dimethylformamide/water).

EXAMPLE 6

N-[4-(benzamido-methyl)-benzenesulfonyl]-N'-cyclooctyl-urea 31.2 g. of 4-(benzamido-methyl)-benzenesulfonamide sodium were mixed with 15.6 of cyclooctyl urea (prepared from cyclooctylamine and potassium cyanate, melting point 179–181°) in a mortar and then heated for 6 hours to 150° on an oil bath. After cooling, the reaction mixture was taken up in water, the solution was filtered, acidified and the precipitate was filtered off with suction. The N - [4 - (benzamido-methyl)-benzenesulfonyl]-N'-cyclooctyl-urea was found to melt, after filtration with suction and recrystallization from methanol, at 185–186°.

EXAMPLE 7

N-[4-benzamido-methyl)-benzenesulfonyl]-N'-cyclooctyl-urea 15.6 g. of 4-(benzamido-methyl)-benzenesulfonamide sodium were thoroughly mixed with 7 g. of ground potassium carbonate and 18.5 g. of cyclooctyl-carbamic acid methyl ester (prepared by the reaction of cyclooctylamine with chloroformic acid methyl ester, melting point 65–66°) and the whole was heated for 3 hours to 130° on the oil bath. After cooling, the reaction mixture was combined with water, excess carbamic acid ester was removed by extraction with ether, the aqueous solution was acidified and the precipitate was filtered with suction. The crude product thus obtained was recrystallized twice from methanol. The crystals of N-[4-benzamido-methyl)-benzenesulfonyl]-N'-cyclooctyl-urea were found to melt at 185–186°.

EXAMPLE 8

N-[4-(benzamido-methyl)-benzenesulfonyl]-N'-cyclohexyl-urea 3.75 g. of N-[4-(benzamido-methyl)-benzenesulfonyl]-N'-acetyl urea (melting point 161–163°) and 1.59 g. of cyclohexyl-aminoacetate were mixed thoroughly with one another and heated for 2 hours to 140–150° in an open flask. After cooling, the clear melted mass thus formed was dissolved in 1% sodium hydroxide solution, filtered over charcoal and the filtrate was acidified. The precipitate of N - [4 - (benzamido-methyl)-benzenesulfonyl]-N'-cyclohexyl-urea thus obtained was recrystallized twice from methanol and was found to melt at 201–202°.

EXAMPLE 9

N-[4-(β-benzamido-ethyl)-benzenesulfonyl]-N'-(4'-methylcyclohexyl)-urea 15.4 g. of N,N-diphenyl-N'-(4-methylcyclohexyl)-urea, 8.15 g. of 4-(β-benzamido-ethyl)-benzenesulfonamide sodium and 30 ml. of dimethylformamide were heated for 7 hours on the oil bath to 100°. The whole was allowed to cool, water was added, the whole was rendered alkaline and the diphenylamine formed was extracted with ether. The aqueous phase was filtered over charcoal and the filtrate was acidified. The N-[4-(β-benzamidoethyl)-benzenesulfonyl] - N'-(4'-methylcyclohexyl)-urea obtained in a very good yield was found to melt after recrystallization from methanol at 177–178°.

EXAMPLE 10

N-[4-(γ-benzamido-propyl)-benzenesulfonyl]-N'-cyclohexyl-urea 16 g. of 4-(γ-benzamido-propyl)-benzenesulfonamide were dissolved in 100 ml. of acetone and 25 ml. of 2 N-sodium hydroxide solution; to this mixture there were added dropwise, at 0–5° C., while cooling with ice and stirring, 12.5 g. of cyclohexylisocyanate. The temperature of the reaction mixture was allowed to rise to room temperature in the course of 2 hours, the mixture was acidified and the acetone was removed by distillation under reduced pressure at room temperature. The residue was dissolved in 1% ammonium, separated from undissolved matter by filtration. The filtrate was acidified and the residue was recrystallized from a mixture of ethanol and water. (Melting point: 140° C.).

In analogous manner, there were obtained: N-[4-(γ-benzamido - propyl) - benzenesulfonyl]-N'-(4'-isopropylcyclohexyl)-urea (melting point: 179° C.) (from ethanol/water); N-[4-(γ-4'-chlorobenzamido-propyl)-benzenesulfonyl]-N'-cyclohexyl-urea (melting point: 201° C.) (from methanol); N - [4 - (γ - 4'-chlorobenzamido-propyl)-benzenesulfonyl]-N'-n-butyl-urea (melting point: 154° C.) (from ethanol/water).

EXAMPLE 11

N-[4-(β-benzamido-propyl)-benzenesulfonyl]-N'-cyclohexyl-urea 16 g. of 4-(β-benzamido-propyl)-benzenesulfonamide were dissolved in 100 ml. of acetone and 25 ml. of 2 N-sodium hydroxide solution and to this solution there were added dropwise at 0–5° C., while stirring and cooling with ice, 13 g. of cyclohexylisocyanate. The temperature of the reaction mixture was allowed to rise to room temperature in the course of 2 hours, the reaction mixture was acidified with concentrated hydrochloric acid and the acetone was removed by distillation under reduced pressure at room temperature. The residue was taken up in 1% ammonia, filtered and the filtrate was combined with concentrated hydrochloric acid. The precipitate formed was then recrystallized from a mixture of ethanol and water. Melting point: 199–201° C.

In analogous manner, there was obtained: N-[4-(β-benzamido - propyl) - benzenesulfonyl]-N'-n-butyl-urea (melting point: 159–161° C.) (from ethanol).

EXAMPLE 12

N-[4-(β-benzamido-propyl)-benzenesulfonyl]-N'-cyclooctyl-urea 17 g. of N-[4-(β-benzamido-propyl)-benzenesulfonylmethyl-urethane were heated in 90 ml. of dioxane with 5.8 g. of cyclooctylamine and the methanol formed was continuously removed by distillation. As soon as pure dioxane only was passing over, the reaction was complete. The reaction mixture was concentrated under reduced pressure and the residue was treated with 1% ammonia, precipitated with concentrated hydrochloric acid and the precipitate was recrystallized from a mixture of ethanol and water. Melting point: 158° C.

In analogous manner, there were obtained: by heating 36.2 g. of N-[4-(β-benzamido-ethyl)-benzenesulfonyl]-methylurethane with 13.4 g. of γ-phenyl-propylamine the N - [4 - (β - benzamido - ethyl) - benzenesulfonyl] - N'-γ-phenylpropyl-urea (melting point: 182–184° C.) (from methanol) and from the same urethane and 2,5-endomethylene-Δ³-cyclohexenyl-1-methylamine the N-[4-(β-benzamido - ethyl) - benzenesulfonyl] - N' - (2,5 - endomethylene - Δ³ - cyclohexenyl-1-methyl)-urea (melting point: 178–180° C.) (from methanol) and by using 2,5-endomethylene-cyclohexyl - 1 - methylamine the N-[4-(β-benzamido - ethyl) - benzenesulfonyl] - N' - (2,5 - endomethylene cyclohexyl-1-methyl)-urea (melting point: 183–185° C.) (from dilute methanol), by using α-aminomethyl-thiophene the N-[4-(β-benzamido-ethyl)-benzenesulfonyl]-N'-2-thenyl-urea (melting point: 205–208° C.) (from methanol), from N-[4-(benzamidomethyl)-benzenesulfonyl]-methyl-urethane (melting point: 170–171° C.) the N-[4-(benzamidomethyl)-benzenesulfonyl]-N'-cycloheptylmethyl-urea (melting point: 203° C.) (from ethanol) and the N-[4-(benzamidomethyl)-benzenesulfonyl]-N'-cycloheptylethyl-urea (melting point: 197–198° C.) (from ethanol), from N-[4-(β-benzamidoethyl)-benzenesulfonyl]methyl-urethane, melting point: 177–179° C.) the N-[4-(β-benzamidoethyl)-benzenesulfonyl]-N'-cycloheptylmethyl-urea (melting point: 188–189° C.) (from ethanol) and the N-[4-(β-benzamidoethyl)-benzenesulfonyl] - N' - cycloheptylethyl-urea (melting point: 205–206° C.) (from ethanol), from N-[4-(β-benzamidopropyl)-benzenesulfonyl]methyl-urethane (melting point: 112° C.) the N-[4-(β-benzamidopropyl)-benzenesulfonyl]-N'-cycloheptylmethyl-urea (melting point: 195–196° C.) (from ethanol) and the N-[4-(β-benzamidopropyl)-benzenesulfonyl]-N'-cycloheptylethyl-urea (melting point: 174–176° C.) (from ethanol/water), from N-[4-(γ-benzamidopropyl) - benzenesulfonyl]methyl - urethane the N-[4 - (γ - benzamidopropyl) - benzenesulfonyl] - N' - cycloheptylmethyl-urea.

EXAMPLE 13

N-[4-(4'-chlorobenzamido-methyl)-benzenesulfonyl]-N'-cyclohexyl-urea 16.3 g. of 4-(4'-chloro-benzamido-methyl)-benzenesulfonamide (melting point 214–216° C.) were dissolved in 25 ml. of 2 N-sodium hydroxide solution and 50 ml. of acetone and 6.3 g. of cyclohexyl-isocyanate were added dropwise at 0–5° C., while stirring. Stirring was continued for 3 hours, the whole was diluted with a great amount of water, some methanol was added, the whole was filtered and the filtrate was acidified. The N-[4-(4'-chlorobenzamido - methyl) - benzenesulfonyl] - N' - cyclohexylurea obtained was found to melt after recrystallization from methanol at 192–192.5° C.

In analogous manner, there were obtained: N[4-(4'-chloro - benzamido - methyl) - benzenesulfonyl] - N'-cyclooctyl-urea (melting point: 188–189° C.) (from dimethylformamide/water); N - [4 - (4'-chlorobenzamidomethyl)-benzenesulfonyl]-N'-n-butyl-urea (melting point: 183–184° C.) (from methanol); N-[4-(4'-chloro-benzamido - methyl) - benzenesulfonyl - N' - (4' - methylcyclohexyl)-urea (melting point: 211–212° C.) (from methanol); N-[4-(α - benzamidoethyl)-benzenesulfonyl]-N'-cyclohexyl-urea (melting point: 190–190.5° C.) (from methanol); N-[4-(α-benzamido-ethyl)-benzenesulfonyl]-N'-cyclooctyl-urea (melting point: 171–173° C.) (from methanol/dimethylformamide); N - [4 - (α - benzamidoethyl)-benzenesulfonyl]-N'-n-butyl-urea (melting point: 190–191° C.) (from dimethylformamide/water); N-[4-(α - benzamido - ethyl) - benzenesulfonyl] - N' - (4'-methylcyclohexyl)-urea (melting point: 201–202° C.) (from methanol/dimethylformamide); N-[4-(α-4'-chlorobenzamido - ethyl) - benzenesulfonyl] - N' - cyclohexylurea (melting point: 206–208° C.) (from methanol); N-[4 - (β - 3' - methyl - benzamido - ethyl) - benzenesulfonyl]-N'-cyclohexyl-urea (melting point: 169–170° C.) (from methanol); N-[4-(β-3'-methyl-benzamido-ethyl)-benzenesulfonyl]-N'-n-butyl-urea (melting point: 139–140° C.) (from methanol); N-[4-(β-3'-chloro-benzamidoethyl) - benzenesulfonyl] - N' - cyclohexyl - urea (melting point: 190–191° C.) (from methanol); N-[4-(β-3'-chlorobenzamido - ethyl) - benzenesulfonyl] - N' - n - butylurea (melting point: 155–156° C.) (from methanol); N - [4 - (β - 2' - chloro - benzamido - ethyl) - benzenesulfonyl]-N'-cyclohexyl-urea (melting point: 204–205° C.) (from methanol); N - [4 - (β - 3' - fluoro-benzamidoethyl) - benzenesulfonyl] - N' - cyclohexyl - urea (melting point: 198–199° C.) (from methanol); N-[4-(β-3'-fluorobenzamido - ethyl) - benzenesulfonyl] - N' - n - butylurea (melting point: 182–183° C.) (from methanol).

In analogous manner, there were, furthermore, obtained: from 4-(β-4-methylbenzamido-ethyl)-benzenesulfonamide (melting point: 216–218° C.) the N-[(β-4'-methylbenzamido-ethyl) - benzenesulfonyl]-N'-(4-ethylcyclohexyl)-urea (trans) (melting point: 208–210° C.) (from methanol/dimethylformamide); from 4-(β-3-methylbenzamido-ethyl) - benzenesulfonamide (melting point: 165° C.) the N-[4-(β-3-methylbenzamido-ethyl)-benzenesulfonyl]-N'-(4-methylcyclohexyl)-urea (melting point: 165.5–167.5° C.) (from methanol) and the N-[4-(β-3-methylbenzamido-ethyl) - benzenesulfonyl]-N'-(4-ethylcyclohexyl)-urea (trans) (melting point: 170–172.5° C.) (from methanol); from 4-(β-2-methylbenzamido-ethyl)-benzenesulfonamide (melting point: 186–188° C.) the N-[4 - (β-2-methylbenzamido-ethyl) - benzenesulfonyl]-N'-cyclohexyl-urea (melting point: 182–183° C.) (from methanol), the N-[4-(β-2-methylbenzamido-ethyl)-benzenesulfonyl] - N' - (4-methylcyclohexyl) - urea (trans) (melting point: 179–180° C.) (from methanol/dimethylformamide) and the N-[4-(β-2-methylbenzamido-ethyl)-benzenesulfonyl] - N' - (4-ethylcyclohexyl) - urea (trans) (melting point: 169–171° C.) (from dimethylformamide/methanol); from 4-(β-4-ethylbenzamido-ethyl)-benzenesulfonamide (melting point: 149°C.) the N-[4-(β-4-[ethylbenzamidoethyl) - benzenesulfonyl]-N'-cyclohexyl - urea (melting point: 190–192° C.) (from dimethylformamide/water), the N-[4-(β-4-ethylbenzamido-ethyl)-benzenesulfonyl]-N'-n-butyl-urea (melting point: 137–138°C.) (from methanol), the N-[4-(β-4-ethylbenzamido-ethyl)-benzenesulfonyl]-N'-(4-methylcyclohexyl)-urea (melting point: 184–185.5° C.) (from dimethylformamide/water) and the N-[4-(β-4-ethylbenzamido-ethyl)-benzenesulfonyl]-N'-(4-ethylcyclohexyl)-urea (trans) (melting point: 181–182.5° C.) (from methanol), from 4-(β-4-isopropylbenzamido-ethyl)-benzenesulfonamide (melting point: 184° C.) the N-[4-(β-4-isopropylbenzamido-ethyl) - benzenesulfonyl]-N'-cyclohexyl-urea (melting point: 195–196° C.) (from dimethylformamide/water) and the N-[4-(β-4-isopropylbenzamido-ethyl) - benzenesulfonyl]-N'-(4-methylcyclohexyl)-urea (melting point: 196–197° C.) (from dimethylformamide/water); from 4-(β-4-methoxybenzamido-ethyl)-benzenesulfonamide (melting point: 229–231° C.) the N-[4-(β-4-methoxybenzamido-ethyl)-benzenesulfonyl]-N'-(4-ethylcyclohexyl)-urea (trans) (melting point: 218–219.5° C.) (from dimethylformamide/water); from 4-(β-3-methoxybenzamido-ethyl)-benzenesulfonamide (melting point: 162° C.) the N-[4-(β-3-methoxybenzamido-ethyl) - benzenesulfonyl] - N' - cyclohexyl-urea (melting point: 184–185° C.) (from dimethylformamide/water); the N-[4-(β-3-methoxybenzamidoethyl)-benzenesulfonyl]-N'-n-butyl-urea (melting point: 155–156° C.) (from methanol); the N-[4-(β-3-methoxybenzamido-ethyl) - benzenesulfonyl]-N'-(4-methylcyclohexyl)-urea (trans) (melting point: 197–198° C.) (from dimethylformamide/water) and the N-[4-(β-3-methoxybenzamido-ethyl) - benzenesulfonyl] - N' - (4-ethylcyclohexyl)-urea (trans) (melting point: 202–203° C.) (from dimethylformamide/water); from 4-(β-2-methoxybenzamido-ethyl) - benzenesulfonamide (melting point: 173–174° C.) the N - [4 - (β-2-methoxybenzamido-ethyl)-benzenesulfonyl]-N'-cyclohexyl-urea (melting point: 184° C.) (from methanol), the N-[4-(β-2-methoxybenzamido-ethyl) - benzenesulfonyl]-N'-n-butyl-urea (melting point: 124–126° C.) (from methanol), the N-[4-(β-2-methoxybenzamido-ethyl) - benzenesulfonyl]-N'-(4-methylcyclohexyl)-urea (trans) (melting point: 179–181° C.) (from methanol) and the N-[4-(β-2-methoxybenzamido-ethyl)-benzenesulfonyl] - N' - (4-ethylcyclohexyl) - urea (trans) (melting point: 131–132° C.) (from methanol); from 4-(β-4-ethoxybenzamido-ethyl)-benzenesulfonamide (melting point: 212–213° C.) the N-[4-(β-4-ethoxybenzamido-ethyl) - benzenesulfonyl] - N' - cyclohexyl-urea (melting point: 199–200° C.) (from methanol/dimethylformamide), the N - [4 - (β-4-ethoxybenzamido-ethyl)-benzenesulfonyl]-N'-(4-methylcyclohexyl) - urea (melting point: 203–204° C.) (from methanol/dimethylformamide) and the N-[4-(β-4-ethoxybenzamido-ethyl)-benzenesulfonyl]-N'-(4-ethylcyclohexyl-urea (trans) (melting point: 212–213° C.) (from dimethylformamide/water); from 4-(β-4-fluorobenzamido - ethyl) - benzenesulfonamide (melting point: 173–174° C.) the N-[4-(β-4-fluorobenzamido-ethyl)-benzenesulfonyl] - N' - cyclohexyl-urea (melting point: 189–190° C.) (from methanol) and the N-[4-(β-4-fluorobenzamido-ethyl)-benzenesulfonyl]-N'-(4-methylcyclohexyl)-urea (melting point: 190.5–191.5° C.) (from methanol); from 4-(β-3-fluorobenzamido-ethyl)-benzenesulfonamide (melting point: 218–218.5° C.) the N-[4-(β-3-fluorobenzamido-ethyl)-benzenesulfonyl]-N'-(4-methylcyclohexyl)-urea (melting point: 182–184° C.) (from methanol) and the N-[4-(β-3-fluorobenzamido-ethyl)-benzenesulfonyl] - N' - (4-ethylcyclohexyl)-urea (trans) (melting point: 196° C.) (from dimethylformamide/water); from 4-(β-3-chlorobenzamido-ethyl)-benzenesulfonamide (melting point: 166–167° C.) the N-[4-(β-3-chlorobenzamido-ethyl) - benzenesulfonyl]-N'-(4-methylcyclohexyl)-urea (melting point: 173–175° C.) (from methanol) and the N-[4-(β-3-chlorobenzamido-ethyl)-benzenesulfonyl] - N' - (4-ethylcyclohexyl)-urea (trans) (melting point: 164–166° C.) (from methanol); from 4-(β-2-chlorobenzamido-ethyl) - benzenesulfonamide (melting point: 195–196° C.) the N-[4-(β-2-chlorobenzamido-ethyl) - benzenesulfonyl]-N'-n-butyl-urea (melting point: 139.5–141° C.) (from methanol), the N-[4-(β-2-chlorobenzamido-ethyl) - benzenesulfonyl]-N'-(4-methylcyclohexyl)-urea (melting point: 180–182° C.) (from dimethylformamide/water) and the N-[4-(β-2-chlorobenzamido-ethyl) - benzenesulfonyl] - N' - (4-ethylcyclohexyl)-urea (trans) (melting point: 156° C.) (from dimethylformamide/water); from 4-(α-benzamido-ethyl)-benzenesulfonamide (melting point: 215–216° C.) the N-[4-(α-benzamido-ethyl) - benzenesulfonyl] - N' - n-butyl-urea (melting point: 190–191° C.) (from dimethylformamide/water) and the N-[4-(α-benzamido-ethyl) - benzenesulfonyl]-N'-(4-methylcyclohexyl)-urea (melting point: 201–201.5° C.) (from methanol/dimethylformamide); from 4-(α-4-chlorobenzamido-ethyl)-benzenesulfonamide (melting point: 211–214° C.) the N-[4-(α-4-chlorobenzamido-ethyl) - benzenesulfonyl]-N'-(4-methylcyclohexyl)-urea (melting point: 210–211° C.) (from dimethylformamide/water).

In analogous manner, there were, furthermore, obtained: from 4-(γ-benzamidopropyl)-benzenesulfonamide (melting point: 155° C.) the N-[4-(γ-benzamidopropyl)-benzenesulfonyl]-N'-(4-methylcyclohexyl-urea (melting point: 189° C.) (from ethanol/water) and the N-[4-(γ-benzamidopropyl) - benzenesulfonyl] - N' - (4 - ethylcychlohexyl)-urea (trans), (melting point: 179° C.) (from ethanol/water); from 4-(β-4-chlorobenzamidopropyl)-benzenesulfonamide (melting point: 191° C.) the N-[4-(β-4-chlorobenzamidopropyl)benzenesulfonyl]-N'-(4-methylcyclohexyl)-urea (melting point: 240° C.) (from dimethylformamide/water) and the N-[4-(β-4-chlorobenzamidopropyl) - benzenesulfonyl] - N' - cyclohexyl-urea (melting point: 210° C.) (from ethanol) from 4 - (β-4-methylbenzamidopropyl) - benzenesulfonamide (melting point: 209–210° C.) the N-[4-(β-4-methylbenzamidopropyl) - benzenesulfonyl] - N' - (4 - methylcyclohexyl)-urea (melting point: 229° C.) (from dimethylformamide/water) and the N-[4-(β-4-methylbenzamidopropyl) - benzenesulfonyl] - N' - cyclohexyl-urea (melting point: 210° C.) (from ethanol), the N - [4 - (β - 4 - methylbenzamidopropyl) - benzenesulfonyl]-N'-n-butyl-urea (melting point: 178° C.) (from methanol/water) from 4 - (β-4 - methoxybenzamidoproply)-benzenesulfonamide (melting point: 163–165° C.) the N-[4-(β-4 - methoxybenzamidopropyl) - benzenesulfonyl]-N'-(4-methylcychlohexyl)-urea (melting point: 210° C.) (from dimethylformamide/water) and the N-[4 - (B - 4 - methoxybenzamidopropyl) - benzenesulfonyl]-N'-cyclohexyl-urea (melting point: 193–194° C.) (from ethanol/water); from 4-(γ-4-isopropylbenzamidopropyl)-benzenesulfonamide (melting point: 147° C.) the N-[4-(γ - 4 - isopropylbenzamidopropyl)-benzenesulfonyl]-N'-cyclohexyl-urea (melting point: 142° C.) (from methanol), the N-[4-(γ-4-isopropylbenzamidopropyl) - benzenesulfonyl] - N' - (4 - methylcyclohexyl)-urea (melting point: 148° C.) (from methanol/water); from 4-(β - 3 - methylbenzamidopropyl) - benzenesulfonamide (melting point: 164° C.) the N-[4-(β-3-methylbenzamidopropyl) - benzenesulfonyl - N' - (4 - methylcyclohexyl)urea (melting point: 188° C.) (from methanol), and the N-[4-(β-3-methylbenzamidopropyl)-benzenesulfonyl]-N'-cyclohexyl-urea (melting point: 162–163° C.) (from ethanol/water); from 4-(β-benzamidopropyl)-benzenesulfonamide (melting point: 209° C.) the N - [4-(β-benzamidopropyl)-benzenesulfonyl]-N'-(4-methyl-cyclohexyl)-urea (melting point: 204° C.) (from methanol/water); from 4-(γ-4-methoxybenzamidopropyl)-benzenesulfonamide (melting point: 175° C.) the N-[4-(γ - 4 - methoxybenzamidopropyl)-benzenesulfonyl]-N'-(4-methylcyclohexyl)urea (melting point: 150° C.) (from ethanol/water), the N-[4-(γ-4-methoxybenzamidopropyl) - benzensulfonyl]-N' - cychohexyl - urea (melting point: 160° C.) (from ethanol), the N-[4-(γ-4-methoxybenzamidopropyl) - benzenesulfonyl] - N' - (4 - ethylcyclohexyl)urea (trans) (melting point: 172° C.) (from methanol/water); from 4-(γ-4-methylbenzamidopropyl)-benzenesulfonamide (melting point: 150° C.) the N-[4-γ - 4 - methylbenzamidopropyl) - benzenesulfonyl] - N'-cyclohexyl-urea (melting point: 194° C.) (from methanol/water) the N - [4 - (γ - 4 - methylbenzamidopropyl)-benzenesulfonyl]-N'-(4-methylcychohexyl)-urea (melting point: 165° C.) (from methanol/water); from 4-(β-benzamidopropyl)-benzenesulfonamide (melting point: 208° C.) the N-[4-(β-benzamidopropyl)-benzenesulfonyl]-N'-cyclopentyl-urea (melting point: 176° C.) (from ethanol/water), the N-[4-(β-benzamidopropyl)-benzenesulfonyl]-N'-cyclooctyl-urea (melting point: 158° C.) (from ethanol/water), the N-[4-(β-benzamidopropyl)-benzenesulfonyl]-N'-(4-isopropylcyclohexyl)-urea (melting point: 183° C.) (from isopropanol) the N-[4-(β-benzamidopropyl) - benzensulfonyl] - N' - cycloheptyl-urea (melting point: 189° C.) (from ethanol/water), the N-[4-(β-benzamidopropyl) - benzenesulfonyl]-N'-(4-ethylcyclohexyl)-urea (trans) melting point: 203° C.) (from ethanol); from 4-(β-3-fluorobenzamidopropyl)-benzenesulfonamide (melting point: 165° C.) the N-[4-(β - 3 - fluorobenzamidopropyl) - benzenesulfonyl] - N'-cyclohexyl-urea (melting point: 177° C.) (from ethanol), the N-[4-(β-3-fluorobenzamidopropyl)-benzenesulfonyl] - N'-(4 - methylcyclohexyl) - urea (melting point: 204–205° C.) (from ethanol); from 4-(β-3-chlorobenzamidopropyl)-benzenesulfonamide (melting point: 168° C.) the N-[4-(β-3-chlorobenzamidopropyl) - benzenesulfonyl]-N'-cyclohexyl-urea (melting point: 176–178° C.) (from ethonal) the N-[4-(β-3-chlorobenzamidopropyl)-benzenesulfonyl]-N'-(4-methylcyclohexyl)-urea (melting point: 169° C.) (from ethanol); from 4-(β-4-iodobenzamidoethyl-benzenesulfonamide (melting point: 206° C.) the N-[4 - (β - 4 - iodobenzamidoethyl) - benzenesulfonyl]-N'-cyclohexyl-urea (melting point: 209° C.) (from methanol/water); from 4-(β-4-brombenzamido - ethyl)-benzenesulfonamide melting point: 236–238° C.) the N-[4 - (β - 4 - brombenzamido-ethyl) - benzenesulfonyl]-N'-(4-methylcyclohexyl)-urea (trans) (melting point: 205–207° C.) (from ethanol/dioxane), the N-[4-(β-4-brombenzamido-ethyl) - benzenesulfonyl] - N' - isobutyl-urea (melting point: 181–183° C.) (from ethanol/dioxane); from 4-(β-2-brombenzamido-ethyl) - benzenesulfonamide (melting point: 176–178° C.) the N-[4-

(β - 2 - brombenzamido - ethyl) - benzenesulfonyl] - N'-(4-methylcyclohexyl)-urea (trans) (melting point: 181–186° C.) (from methanol) and the N-[4-(β-2-brombenzamido-ethyl)-benzenesulfonyl]-N'-isobutyl-urea (melting point: 165–167° C.) (from methanol).

Furthermore, by the reaction of 4-(β-benzamido-α-methylethyl)-benzenesulfonamide with cyclohexylisocyanate there was obtained N-[4-(β-benzamido-α-methyl-ethyl) - benzenesulfonyl] - N' - cyclohexyl - urea (melting point: 176–178° C.) (from methanol) and when using butylisocyanate there was obtained N-[4-(β-benzamido-γ-methyl-ethyl)-benzenesulfonyl]-N'-butyl-urea (melting point: 184–185° C.) (from methanol).

Furthermore, there was obtained by the reaction of 4 - (β - 4' - chloro - benzamido - γ - methyl - ethyl - benzenesulfonamide with cyclohexylisocyanate the N-[4-β-4' - chloro - benzamido - γ - methyl - ethyl) - benzenesulfonyl]-N'-cyclohexyl-urea (melting point: 196–198° C.) (from methanol) and when using butylisocyanate, there was obtained the corresponding N-[4-(β-4-chloro-benzamido - α - methyl - ethyl) - benzenesulfonyl] - N' - butyl-urea (melting point: 159–161° C.) (from methanol).

EXAMPLE 14

N - [4 - (β - benzamido - ethyl)-benzenesulfony] - N'-(4'-ethylcyclohexyl)-urea 18.1 g. of N-[4-(β-benzamido-ethyl)-benzenesulfonyl]-methylurethane and 6.4 g. of 4-ethyl-cyclohexylamine were suspended in 200 ml. of dioxane and heated for 1.5 hours to 120–130° C. The methanol formed during the reaction was removed by distillation over a small column. As soon as the passing over temperature had risen to 100° C., the whole was allowed to cool and water was added. The N-[4-(β-benzamido-ethyl)-benzenesulfonyl]-N'-(4'-ethylcyclohexyl)-urea obtained in crystalline form was recrystallized from methanol and found to melt at 190–192° C.

In analogous manner, there were obtained: N-[4-(β-benzamido-ethyl) - benzenesulfonyl]-N'-(β-phenylethyl)-urea (melting point: 193–194° C.) (from methanol); N-[4-(β-benzamido-ethyl) - benzenesulfonyl]-N'-(cyclohexylmethyl)-urea (melting point: 190–200° C.) (from dimethylformamide/water). N-[4-(β - benzamido - ethyl)-benzenesulfonyl] - N' - cyclopentylurea (melting point: 188–190° C.) (from methanol) N-[4-(β-benzamidoethyl)-benzenesulfonyl] - N' - (4-methoxycyclohexyl)-urea (melting point: 161–163° C.) N-[4-(β-benzamidoethyl)-benzenesulfonyl]-N'-(4-ethoxycyclohexyl)-urea (melting point: 176–178° C.) N - [4 - (β-benzamidoethyl)-benzenesulfonyl]-N'-(4--isoproproxycyclohexyl)-urea (melting point: 186–188° C.) N-[4-(β-benzamidoethyl)-benzenesulfonyl] - N' - (γ - methoxypropyl)-urea (melting point: 162–164° C.) N-[4-(β-'-chloro-benzamidoethyl)-benzenesulfonyl]-N'-(4-methoxy-cyclohexyl)-urea (melting point: 183–185° C.) N-[4-(β-4'-chloro-benzamido-ethyl)-benzenesulfonyl]-N'-(4-ethoxy-cyclohexyl) - urea (melting point: 200–202° C.) N-[4-(β-4'-chloro-benzamidoethyl)-benzenesulfonyl] - N'-(γ-methoxy-propyl)-urea (melting point: 173–174° C.).

In analogous manner, there were, furthermore, obtained: from N-[4-(β-benzamido-ethyl)-benzenesulfonyl]-methylurethane (melting point: 177–179° C.) the N-[4-(β-benzamido-ethyl)-benzenesulfonyl] - N'-ethyl-urea (melting point: 210–210.5° C.) (from methanol), the N-[4-(β-benzamido-ethyl)-benzenesulfonyl] - N' - n-propyl-urea (melting point: 200–202° C.) (from methanol/dimethylformamide) the N-[4-(β-benzamidoethyl)-benzenesulfonyl]-N'-n-hexyl - urea (melting point: 170–171.5° C.) (from methanol), the N-[4-(β-benzamido-ethyl)-benzenesulfonyl] - N' - (O - methylcyclohexyl)-urea (trans) (melting point: 184–186° C.) (from methanol) and the N-[4-(β-benzamido-ethyl)-benzenesulfonyl]-N'-(4-methylcyclohexyl)-urea (cis) (melting point: 186° C.) (from methanol); from N-[4-(β-4-chlorobenzamido-ethyl)-benzenesulfonyl] - methylurethane (melting point: 212–215° C.) the N-[4 - (β - 4 - chlorobenzamido-ethyl)-benzenesulfonyl]-N'-(4-ethylcyclohexyl) - urea (melting point 207–208° C.) (from methanol); from N-[4-(β-benzamidoethyl)-benzenesulfonyl] - methylurethane the N-[4-(β - benzamido-ethyl) - benzenesulfonyl]-N'-(tetrahydropyranyl-2-methyl-urea (melting point: 166–167.5° C.) (from methanol), the N-[4-(β-benzamido-ethyl)-benzenesulfonyl] - N' - (trans-2-phenylcyclopropyl)-urea (melting point: 182–183° C.) (from methanol) and the N-[4-(β - benzamido-ethyl) - benzenesulfonyl] - N' - (β-phenyl-isopropyl)-urea (melting point: 190–192.5° C.) (from methanol); from N-[4-(β-4-chlorobenzamido-ethyl)-benzenesulfonyl]-methylurethane the N-[4-(β-4-chlorobenzamido-ethyl)-benzenesulfonyl] - N' - (Δ3-tetrahydrobenzyl)-urea (melting point: 200–202° C.) (from methanol/dimethylformamide); from N-[4-(β-benzamido-ethyl)-benzenesulfonyl]-methylurethane the N-[4-(β-benzamido-ethyl)-benzenesulfonyl] - N'-allyl-urea (melting point: 203–204° C.) (from dimethylformamide/water) and the N-[4-(β-benzamido-ethyl)-benzenesulfonyl]-N' - (β - cyclohexylethyl) - urea (melting point: 211–212.5° C.) (from dimethylformamide/water).

EXAMPLE 15

N-[4-(β-benzamido-ethyl)-benzenesulfonyl]-N'-cyclooctyl-urea 72.4 g. of N-[4-(β-benzamido-ethyl)-benzenesulfonyl]-methyl-urethane were suspended in 500 ml. of dioxane; 25.4 g. of cyclooctylamine were added and the whole was then heated to 120–130° C. The methanol formed during the reaction was removed by distillation over a small column. As soon as the passing-over temperature had risen to 100° C., the whole was allowed to cool and water was slowly added, while stirring, until the urea precipitation ceased. The product was recrystallized from methanol. The N-[4-(β-benzamido-ethyl)-benzenesulfonyl]-N'-cyclooctyl-urea obtained in a very good yield was found to melt at 172.5–174° C. (from methanol) and constituted thus another form of the urea defined in Example 5 under the same nomenclature, which had a melting point of 148–149° C. Both forms can be converted into the other one by crystallization.

EXAMPLE 16

N-[4-(benzamido-methyl)-benzenesulfonyl]-N'-cyclohexyl-urea 2.2 g. of N-[4-(aminomethyl)-benzenesulfonyl]-N'-cyclohexyl-urea (melting point: 190° C.) and 1.1 g. of pyridine and 1.0 g. of benzoyl chloride were heated for 6 hours to 35° C. in 10 ml. of chloroform. The chloroform was evaporated in vacuo and the residue was treated with an equimolar quantity of 1% aqueous sodium carbonate solution. The sodium salt of the urea specified in the heading formed while heating and was dissolved in the aqueous solution. The solution was heated and filtered over charcoal. After cooling, the sodium salt crystallized out. It was suction-filtered, dissolved in a great amount of water and the free compound was precipitated by means of gaseous HCl. Melting point: 209–210° C.

EXAMPLE 17

N-[4-(α-benzamido-ethyl)-benzenesulfonyl]-N'-cyclohexyl-urea 1.6 mol of N-benzoyl-α-phenylethylamine were introduced at 20–25°, while stirring, into 7 mols of chlorosulfonic acid. Stirring was continued for 15 minutes at room temperature and then for 30 minutes at 60°. The whole was then poured onto ice and the crude sulfonyl chloride obtained was removed by suction-filtration. The moist sulfonyl chloride was heated for half an hour on the steam bath, while stirring, with 1 l. of 12% ammonia. Undissolved matter was removed by filtration and after cooling, the pH value of the reaction mixture was adjusted to 9 by means of dilute acetic acid. The 4-(α-benzamidoethyl)-benzenesulfonamide obtained was suction-filtered, washed with water and recrystallized from 90% ethyl alcohol. Yield: 65% of the theory, melting point: 214–216°.

1/10 mol of this amide were heated under reflux for 7 hours with 41 g. of potash, 200 cc. of acetone and 13 cc. of chloroformic acid ester. After cooling, 200 cc. of water were added and the upper aqueous-acetonic layer was separated. After evaporation of the acetone, the pH was adjusted to 6 by adding dilute acetic acid and the separated starting material was suction-filtered and the filtrate was adjusted to a pH of 3. The 4-(α-benzamido-ethyl)benzene-sulfonyl-ethylurethane separated in crystalline form was then suction-filtered, washed with water and dried under reduced pressure. Yield: 54% of the theory, melting point: 145–146°.

37 g. of this sulfonylurethane were suspended in 30 cc. of dimethylformamide. After the addition of 10 g. of cyclohexylamine, there was obtained a clear solution which was heated for 1 hour to 90° and for half an hour to 110°. The solution was diluted with hot water while still hot. Upon cooling, the above-defined benzenesulfonyl urea crystallized out. It was suction-filtered, washed with water and dried in vacuo. Yield: 63% of the theory, melting point (from methanol): 198–199°.

In analogous manner, there was obtained from N-[4-(β-benzamido-ethyl)-benzenesulfonyl]-methylurethane and 4-amino-tetrahydrothiopyrane the N-[4-(β-benzamido-ethyl)-benzenesulfonyl]-N'-thiacyclohexyl-urea.

EXAMPLE 18

N-[4-(β-benzamidopropyl)-benzenesulfonyl]-N'-cyclohexylurea

N-acetyl-benzedrine was reacted in the manner described in Example 17 with chlorosulfonic acid to yield the corresponding sulfonyl chloride and the latter was reacted with ammonia to yield the 4-(β-acetamidopropyl)-benzenesulfonamide (melting point: 176–177° C.) (yield: 84% of the theory).

123 g. of this acetyl compound were heated to the boil for 5 hours with 500 cc. of 5 N-sodium hydroxide solution. After cooling, 250 cc. of 6 N-hydrochloric acid were added and 75 g. of benzoyl chloride were dropped in at 20–25° and while stirring. The forming crystalline precipitate was redissolved by the addition of 2 N-sodium hydroxide solution. Upon careful adjustment to a pH value of 10–11, there was obtained the 4-(β-benzamidopropyl)-benzenesulfonamide melting at 208–210° in a yield of 65% of the theory. A mixture of 100 g. of this sulfonamide, 129 g. of potash, 1000 cc. of acetone and 41 cc. of chloroformic acid ethyl ester was heated for 6 hours to the boil and worked up as described in Example 17. There was obtained the 4-(β-benzamidopropyl)-benzenesulfonyl-ethylurethane in a yield of 81.6% of the theory. Melting point: 124–126°.

50 g. of this sulfonylurethane were reacted as described in Example 17 in 30 cc. of dimethylformamide with 12.7 g. of cyclohexylamine. There was obtained the product identified in the heading (melting point: 203–204° C.) in a yield of 65% of the theory.

EXAMPLE 19

N-[4-(γ-benzamidopropyl)-benzenesulfonyl]-N'-cyclohexylurea

In a manner analogous to that described in Example 18, there was obtained from 8 g. of 4-(γ-benzamidopropyl-benzenesulfonamide, 12 g. of potash, 4 cc. of chloroformic acid ethyl ester and 100 cc. of acetone after a 6 hours heating, the 4-(γ-benzamidopropyl)-benzenesulfonyl-ethylurethane in a yield of 51% (melting point: 112–113° C.).

5 g. of this urethane were suspended in 3 cc. of dimethylformamide and heated with 1.3 g. of cyclohexylamine for 1 hour to 90° as well as for half an hour to 110°. The desired sulfonyl urea was obtained in a yield of 60% of the theory (melting point: 152–159°) (from methanol).

EXAMPLE 20

N-[4-(β-4'-chlorobenzamido-ethyl)-benzenesulfonyl]-N'-cyclohexyl-urea 3 g. of N-[4-(β-aminoethyl)-benzenesulfonyl]-N'-cyclohexyl-urea (melting point: 203°) were heated with 1.6 g. of p-chlorobenzoyl chloride and 1.5 g. of pyridine in 20 ml. of chloroform for 15 hours to 35–40°. The chloroform was then evaporated under reduced pressure and the residue was dissolved in an excess of 1% aqueous sodium carbonate solution. The solution was then extracted by shaking with ether. The aqueous layer was then separated, treated with charcoal, filtered and precipitated with the aid of an excess of hydrochloric acid. The sulfonyl urea was recrystallized from alcohol (melting point: 209°).

In analogous manner, there were obtained: N-[4-(β-benzamido-ethyl)-benzenesulfonyl]-N'-butyl-urea (melting point: 168–170° C.), N-[4-(β-4'-methylbenzamido-ethyl)-benzenesulfonyl]-N'-cyclohexyl-urea (melting point: 214–215° C.), N-[4-(β-benzamido-ethyl)-benzenesulfonyl]-N'-(4-methylcyclohexyl)-urea (melting point: 173–174° C.).

EXAMPLE 21

N-[4-(β-benzamido-ethyl)-benzenesulfonyl]-N'-cyclohexyl-urea 16.2 g. of N-4-(β-benzamido-ethyl)-benzenesulfonic acid chloride, 250 ml. of benzene, 10 g. of cyclohexyl-parabanic acid (melting point: 184°) and 5 g. of triethylamine were heated for 2 hours at boiling temperature under reflux. From the solution which at first was clear, crystals separated after about 2 minutes. After termination of the heating, the whole was allowed to cool and the separated crystals were suction-filtered. They were washed with water and dried on clay. 1-[4-(β-benzamido-ethyl)-benzenesulfonyl]-3-cyclohexyl-parabanic acid was obtained in a yield of about 75%, and, after recrystallization from a mixture of methanol and dioxane was found to melt at 246–247° C.

5 g. of the parabanic acid derivative thus obtained were heated for 45 minutes on the steam bath in 50 ml. of dioxane and 100 ml. of 1 N-sodium hydroxide solution. A clear solution was obtained which, after termination of heating, was combined with dilute hydrochloric acid. The crystals that had separated were filtered off with suction. The N-[4-(β-benzamido-ethyl)-benzenesulfonyl]-N'-cyclohexyl-urea thus obtained was found to melt at 189–191° C. Yield upon saponification: about 94%. After recrystallization, the compound was found to melt at 191–193° C.

EXAMPLE 22

N-[4-(β-benzamido-ethyl)-benzenesulfonyl]-N'-cyclohexyl-urea 16.2 g. of 4-(β-benzamido-ethyl)-benzenesulfonic acid chloride, 2.7 g. of sodium methylate, 10 g. of cyclohexyl-parabanic acid and 250 ml. of benzene were heated for 2 hours at boiling temperature under reflux. After cooling, the whole was concentrated to dryness, the residue obtained was digested with water, 50 ml. of dioxane and 100 ml. of 1 N-sodium hydroxide solution were added and the whole was heated for 45 minutes on the steam bath. By adding water, acidifying with hydrochloric acid and recrystallizing the precipitated product, there was obtained N-[4-(β-benzamidoethyl)-benzenesulfonyl]-N'-cyclohexyl-urea in a yield of about 36%.

Example 23

N-[4-(β-4'-chloro-benzamido-ethyl)-benzenesulfonyl]-N'-cyclohexyl-urea 18 g. of 4-(β-4'-chloro-benzamido-ethyl)-benzenesulfonic acid chloride (melting point: 134–136° C.), 250 ml. of benzene, 10 g. of cyclohexyl-parabanic acid and 5 g.

of triethylamine were heated for 2 hours at boiling temperature under reflux. The products dissolved at first and after some minutes crystals separated out. After a 2 hours heating under reflux, the whole was allowed to cool, the separated crystals were filtered off with suction, washed with water and dried. 1-[4-(β-4'-chloro-benzamido-ethyl)-benzenesulfonyl]-3-cyclohexyl-parabanic acid was obtained in a yield of about 77%. The compound was found to melt after recrystallization from a mixture of methanol and dioxane at 226–228° C.

5 g. of the parabanic acid derivative thus obtained were heated for 45 minutes on the steam bath in 50 ml. of dioxane and 100 ml. of 1 N-sodium hydroxide solution. The clear solution was diluted with water and acidified with hydrochloric acid. The crystalline precipitate obtained constituting N-[4-(β-4'-chloro-benzamido-ethyl)-benzenesulfonyl]-N'-cyclohexyl-urea, was suction-filtered, washed with water and dried. The yield of saponification product was 91.5% of the theory. The N-[4-(β-4'-chloro-benzamido-ethyl)-benzenesulfonyl]-N'-cyclohexyl-urea obtained was found to melt after recrystallization from a mixture of dioxane and methanol at 196–197.5° C.

Example 24

N-[4-(β-phenoxy-acetamido-ethyl)-benzenesulfonyl]-N'-cyclohexyl-urea 13.7 g. of 4-(β-phenoxy-acetamido-ethyl)-benzenesulfonamide (melting point: 172–174° C.) (from dimethylformamide/methanol) obtained by the reaction of phenoxyacetic acid chloride with 4-(β-aminoethyl-benzenesubfonamide-sodium) were suspended in 19 ml. of 2 N-sodium hydroxide solution and 50 ml. of acetone and, at 0–5° C., 4.8 g. of cyclohexylisocyanate were added dropwise. The whole was stirred for 3 hours at room temperature, then diluted with 150 ml. of water and 50 ml. of methanol, filtered and the filtrate was acidified with dilute hydrochloric acid. The N-[4-(β-phenoxy-acetamido-ethyl)-benzenesulfonyl]-N'-cyclohexylurea thus obtained was recrystallized from methanol and found to melt at 176–177° C.

In analogous manner, there were obtained: N-[4-(β-phenoxy-acetamido-ethyl)-benzenesulfonyl] - N' - butyl-urea (melting point: 114–116° C.) (from methanol), N-[4-(β-phenoxy-acetamido-ethyl) - benzenesulfonyl] - N'-(4'-methyl-cyclohexyl)-urea (melting point: 161° C.) (from methanol), N-(4-(phenyl-acetamido-methyl)-benzenesulfonyl]-N'-cyclooctyl-urea (melting point: 196–197° C.) (from dimethylformamide/water), N-[4-(phenyl-acetamido-methyl)-benzenesulfonyl]-N' - cyclohexyl-urea (melting point: 212–213° C.) (from dimethylformamide/water), N - [4-(phenyl-acetamido-methyl)-benzenesulfonyl]-N'-n-butylurea (melting point: 197–198° C.) (from dimethylformamide/water), N-[4-(phenyl-acetamido-methyl)-benzenesulfonyl] - N' - (4'-methyl-cyclohexyl)-urea (melting point: 194–195° C.) (from dimethylformamide/water), N-[4-(β-hydro-cinnamoyl-amido-ethyl) - benzenesulfonyl]-N' - cyclohexyl-urea (melting point: 184–186° C.) (from methanol), N-[4-(β-cinnamoylamido-ethyl)-benzenesulfonyl] - N' - cyclohexylurea (melting point: 183–184° C.) (from methanol), N-{4-[β-(α-phenoxy-propionylamido)-ethyl]-benzenesulfonyl}-N'-cyclohexyl-urea (melting point: 158–159° C.) (from methanol).

In analogous manner, there were obtained: from 4-(β-phenoxyacetamido-ethyl)-benzenesulfonamide (melting point: 171–173° C.) the N-[4-(β-phenoxyacetamido-ethyl)-benzenesulfonyl] - N' - (4-ethylcyclohexyl)-urea (melting point: 160–161° C.) (from dimethylformamide/water); from 4-(β-<β-phenylpropionamido>-ethyl)-benzenesulfonamide (melting point: 165–166.5° C.) the N-[4-(β-<β-phenylpropionamido>-ethyl)-benzenesulfonyl]-N'-n-butyl-urea (melting point: 129–130.5° C.) (from methanol), the N-[4-(β-<β-phenylproprionamido>-ethyl)-benzenesulfonyl] - N' - (4-methylcyclohexyl)-urea (melting point: 190.5° C.) (from methanol) and the N-[4-(β-<β-phenylpropionamido>-ethyl)-benzenesulfonyl]-N'-(4 - ethylcyclohexyl) - urea (melting point: 184–186° C.) (from methanol); from 4-(β-phenylpropionamidomethyl) - benzenesulfonamide (melting point: 131–133° C.) the N-[4-(β-phenylpropionamidomethyl) - benzenesulfonyl]-N'-cyclohexyl-urea (melting point: 174–176° C.) (from methanol) and the N-[4-(β-phenylpropionamidomethyl)-benzenesulfonyl] - N' - (4-methylcyclohexyl)-urea (melting point: 192–193° C.) (from methanol/dimethylformamide); from 4-(β-4-chlorophenylacetamido-ethyl)-benzenesulfonamide (melting point: 115–118° C. (crude)), the N-[4-(β-4-chlorophenylacetamido-ethyl)-benzenesulfonyl] - N' - cyclohexyl-urea (melting point: 164–166° C.) (from methanol) and the N-[4-(β-<β-phenylisobutyramido>-ethyl)-benzenesulfonyl] - N' - (4-ethylcyclohexyl)-urea (trans) (melting point: 180–181.5° C.) (from methanol); from 4 - [β - (β-phenylisobutyramido)-ethyl] - benzenesulfonamide (melting point: 157–160° C.) the N-[4-(β-<β-phenylisobutyramido>-ethyl)-benzenesulfonyl] - N' - cyclohexyl-urea (melting point: 163–166° C.) (from methanol) and the N-[4-(β-<βphenylisobutyramido>-ethyl)-benzenesulfonyl]-N'-(4-methylcyclohexyl)-urea (trans) (melting point: 187–189° C.) (from methanol); from 4-(β-cinnamoylamido-ethyl)-benzenesulfonamide (melting point: 236–237.5° C.) the N-[4-(β-cinnamoylamidoethyl)-benzenesulfonyl]-N'-butyl-urea (melting point: 162–163° C.) (from methanol), the N-[4-(β-cinnamoylamido-ethyl) - benzenesulfonyl] - N' - (4-methylcyclohexyl)-urea (melting point: 204–206° C.) (from methanol) and the N-[4-(β-cinnamoylamido-ethyl)-benzenesulfonyl]-N'-(4-ethyl-cyclohexyl)-urea (trans) (melting point: 205–206° C.) (from methanol); from 4-(β-4-chlorocinnamoylamido-ethyl)-benzenesulfonamide (melting point: 214–215° C.) the N-[4-(β-4-chlorocinnamoyla-amido-ethyl)-benzenesulfonyl]-N'-cyclohexyl-urea (melting point: 206–208° C.) (from dimethylformamide/water), the N-[4-(β-4-chlorocinnamoylamido-ethyl)-benzenesulfonyl] - N'-(4-methylcyclohexyl)-urea (trans) (melting point: 225–226° C.) (from dimethylformamide/water) and the N-[4-(β-4-chlorocinnamoylamido-ethyl)-benesulfonyl-N'-(4-ethylcyclohexyl)-urea (trans) (melting point: 223–224° C.) (from methanol/dimethylformamide); from 4-[β-(β-methylcinnamoylamido)-ethyl]-benzenesulfonamide (melting point: 190–192° C.) the N-[4-(β - <β - methylcinnamoylamido> - ethyl) - benzenesulfonyl]-N'-cyclohexyl-urea (melting point: 167–169° C.) (from methanol) the N-[4-(β-<β-methylcinnamoylamido> - ethyl) - benzenesulfonyl] - N' - butyl - urea (melting point: 172–174° C.) (from methanol), the N-[4-(β-<β - methylcinnamoylamido> - ethyl) - benzenesulfonyl]-N'-(4-methylcyclohexyl)-urea (trans) (melting point: 174–175.5° C.) (from methanol) and the N-[4-(β-<β-methylcinnamoylamido> - ethyl) - benzenesulfonyl - N'-(4-ethylcyclohexyl)-urea (trans) (melting point: 168–170° C.) (from methanol); from 4-[β-(α-methylcinnamoylamido)-ethyl]-benzenesulfonamide (melting point: 207° C.) the N-[4-(β-<α-methylcinnamolyamido>-ethyl)-benzenesulfonyl]-N'-cyclohexyl-urea (melting point: 175–177.5° C.) (from methanol); from 4-(β-4-methyl phenoxyacetamido-ethyl) - benzenesulfonamide (melting point: 160–161° C.) the N-[4-(β-4-methylphenoxyacetamido-ethyl)-benzenesulfonyl]-N'-cyclohexyl - urea (melting point: 167–168° C.) (from methanol), the N-[4-(β-4-methylphenoxyacetamido - ethyl) - benzenesulfonyl - N'-(4-methylcyclohexyl)-urea (melting point: 173–175° C.) (from dimethylformamide/water) and the N-[4-(β-4-methylphenoxyacetamido - ethyl) - benzenesulfonyl] - N'-(4-ethylcyclohexyl)-urea (melting point: 195–196.5° C.) (from dimethylformamide/water); from 4-(β-4-chlorophenoxyacetamido - ethyl) - benzenesulfonamide (melting point: 159–161° C.) the N-[4-(β-4-chlorophenoxyacetamido - ethyl) - benzenesulfonyl] - N' - cyclohexyl - urea (melting point: 174–176° C.) (from dimethylformamide/water) and the N-[4-(β-chlorophenoxyacetamido-ethyl)-benzenesulfonyl]-N'-(4-methylcyclohexyl)-urea (melting point: 173–174° C.) (from methanol/dimethylformamide); from 4-(β-<α-phenoxypropionamido>-ethyl)-benzenesulfonamide (melting point: 146–147° C.) the N-[4-(β-<α-phenoxypropionamido>-ethyl)-benzenesulfonyl]-N'-butyl-urea (melting point: 139–141° C.) (from methanol), the N-[4-(β-<α-phenoxypropionamido>-ethyl)-benzenesulfonyl]-N'-(4-methylcyclohexyl)-urea (melting point: 202–204° C.) (from methanol/dimethylformamide) and the N-[4-(β-<α-phenoxypropionamido>-ethyl)-benzenesulfonyl]-N'-(4-ethylcyclohexyl)-urea (trans) (melting point: 209.5–211.5° C.) (from methanol/dimethylformamide); from 4-(α-phenoxypropionamido-methyl)-benzenesulfonamide (melting point: 145–146° C.) the N-[4-(α-phenoxy-propionamidomethyl)-benzenesulfonyl]-N'-cyclohexyl-urea (melting point: 176–177° C.) (from methanol/dimethylformamide) and the N-[4-(α-phenoxy-propionamidomethyl)-benzenesulfonyl]-N'-(4-methylcyclohexyl)-urea (melting point: 205–206° C.) (from dimethylformamide/water); from 4-[β-(γ-phenoxybutyramido)-ethyl]-benzenesulfonamide (melting point: 168–170° C.) the N-[4-(β-<γ-phenoxybutyramido>-ethyl)-benzenesulfonyl]-N'-cyclohexyl-urea (melting point: 173–175° C.) (from methanol) and the N-[4-(β-<γ-phenoxybutyramido>-ethyl)-benzenesulfonyl]-N'-(4-methylcyclohexyl)-urea (trans) (melting point: 154–157° C.) (from methanol); from 4-(β-benzyloxycarbonamido-ethyl)-benzenesulfonamide (melting point: 157–158° C.) the N-[4-(β-benzyloxycarbonamido-ethyl)-benzenesulfonyl]-N'-cyclohexyl-urea (melting point: 170–170.5° C.) (from methanol), the N-[4-(β-benzyloxycarbonamido-ethyl)-benzenesulfonyl]-N'-butyl-urea (melting point: 120–122° C.) (from methanol) and the N-[4-(β-benzyloxycarbonamido-ethyl)-benzenesulfonyl]-N'-(4-methylcyclohexyl)-urea (melting point: 178–179.5° C.) (from methanol); from 4-(benzyloxycarbonamido-methyl)-benzenesulfonamide (melting point: 156–157° C.) the N-[4-(benzyloxycarbonamido-methyl)-benzenesulfonyl]-N'-cyclohexyl-urea (melting point: 170–171° C.) from methanol), the N-[4-(benzyloxycarbonamido-methyl)-benzenesulfonyl]-N'-(4-methylcyclohexyl)-urea (trans) (melting point: 185–185.5° C.) (from methanol) and the N-[4-benzyloxycarbonamido-methyl)-benzenesulfonyl]-N'-(4-ethylcyclohexyl)-urea (trans) (melting point: 184–186° C.) (from methanol); from 4-(β-phenylmercaptoacetamido-ethyl)-benzenesulfonamide (melting point: 139–142° C.) the N-[4-(β-phenylmercaptoacetamido-ethyl)-benzenesulfonyl]-N'-cyclohexyl-urea (melting point: 151–152° C.) (from methanol), the N-[4-(β-phenylmercaptoacetamido-ethyl)-benzenesulfonyl]-N'-butyl-urea (melting point: 124–125° C.) from methanol), the N-[4-(β-phenylmercaptoacetamido-ethyl)-benzenesulfonyl]-N'-(4-methylcyclohexyl)-urea (trans) (melting point: 179–180° C.) (from dimethylformamide/water) and the N-[-(β-phenylmercaptoacetamido-ethyl)-benzenesulfonyl]-N'-(4-ethylcyclohexyl)-urea (trans) (melting point: 193–194.5° C.) (from dimethylformamide/water); from 4-[β-(β-phenylmercaptopropionamido)-ethyl]-benzenesulfonamide (melting point: 113–115° C.) the N-[4-(β-<β-phenylmercaptopropionamido>-ethyl)-benzenesulfonyl]-N'-cyclohexyl-urea (melting point: 160–161° C.) (from methanol), the N-[4-(β-<β-phenylmercaptopropionamido>-ethyl)-benzenesulfonyl]-N'-(4-methylcyclohexyl)-urea (trans) (melting point: 152–153° C.) (from methanol) and the N-[4-(β-<β-phenylmercaptopropionamido>-ethyl)-benzenesulfonyl]-N'-(4-ethylcyclohexyl)-urea (trans) (melting point: 150–151° C.) (from methanol); from 4-[β-4-chlorobenzylmercaptoacetamido-ethyl]-benzenesulfonamide (melting point: 157° C.) the N-[4-(β-4-chlorobenzylmercaptoacetamido-ethyl)-benzenesulfonyl]-N'-cyclohexyl-urea (melting point: 139–141° C.) (from methanol) and the N-[4-(β-4-chlorobenzylmercaptoacetamido-ethyl)-benzenesulfonyl]-N'-butyl-urea (melting point: 133–134.5° C.) (from methanol); from 4-(β-3-methoxy-phenylacetamido-ethyl)-benzenesulfonamide (melting point: 125° C.) the N-[4-(β-3-methoxy-phenylacetamidoethyl)-benzenesulfonyl]-N'-cyclohexyl-urea (melting point: 190–192° C.) (from ethanol/water), the N-[4-(β-3-methoxy-phenylacetamidoethyl)-benzenesulfonyl]-N'-butyl-urea (melting point: 128–130° C.) (from ethanol/water) and the N-[4-(β-3-methoxy-phenylacetamidoethyl)-benzenesulfonyl]-N'-(4-methyl-cyclohexyl)-urea (melting point: 170–172° C.) (from ethanol/water) and the N-[-(β-3-methoxy-phenylacetamidoethyl)-benzenesulfonyl]-N'-(4-ethyl-cyclohexyl)-urea (melting point: 157–159° C.) (from ethanol/water); from 4-(3-methoxyphenylacetamidomethyl)-benzenesulfonamide (melting point: 140–142° C.) the N-[4-(3-methoxyphenylacetamidomethyl)-benzenesulfonyl]-N'-cyclohexyl-urea (melting point: 202–204° C.) (from ethanol/water) and the N-[4-(3-methoxy-phenylacetamidomethyl)-benzenesulfonyl]-N'-butyl-urea (melting point: 184–187° C.) (from ethanol/water); from N-4-(β-phenylacetamido)-propyl-benzenesulfonamide (melting point: 161° C.) the N-[4-(β-phenylacetamido-propyl)-benzenesulfonyl]-N'-n-butyl-urea (melting point: 179–180° C.) (from methanol/water) and the N-[4-(β-phenylacetamido-propyl)-benzenesulfonyl]-N'-(4-methyl-cyclohexyl)-urea (melting point: 186–187° C.) (from methanol/water); from N-4-(β-<β-phenyl>-propionamido-propyl)-benzenesulfonamide (melting point: 131° C.) the N-[4-(β-<β-phenyl>-propionamido-propyl)-benzenesulfonyl]-N'-(4-methyl-cyclohexyl)-urea (melting point: 165° C.) (from methanol/water); from N-4-(β-phenoxyacetamido)-propyl-benzenesulfonamide (melting point: 172–173° C.) the N-[4-(β-phenoxyacetamido-propyl)-benzenesulfonyl]-N'-(4-methyl-cyclohexyl)-urea (melting point: 137° C.) (from methanol/water); from N-4-(γ-<α-phenoxy>-propionamido-propyl)-benzene-sulfonamide (melting point: 116–117° C.) the N-[4-(γ-<α-phenoxy>propionamido-propyl)-benzenesulfonyl]-N'-cyclohexyl-urea (melting point: 148° C.) (from methanol/water); from N-4-(β-<α-phenoxy>-propionamido)-benzenesulfonamide (melting point: 172° C.) the N-[4-(β-<α-phenoxy>-propionamido-propyl)-benzenesulfonyl]-N'-cyclohexyl-urea (melting point: 188° C.) (from ethanol) and the N-[4-(β-<α-phenoxy>-propionamido-propyl)-benzenesulfonyl]-N'-(4-methylcyclohexyl)-urea (melting point: 180° C.) (from methanol/water); from N-4-(β-2-chlorophenoxyacetamido-propyl)-benzenesulfonamide (melting point: 121° C.) the N-[4-(β-2-chlorophenoxyacetamidopropyl)-benzenesulfonyl]-N'-cyclohexyl-urea (melting point: 152° C.) (from methanol/water);

EXAMPLE 25

N-[4-(β-phenyl-acetamido-ethyl)-benzensulfonyl]-N'-cyclohexyl-urea 9 g. of N-[4-(β-phenyl-acetamido-ethyl)-benzenesulfonyl]-urea (melting point: 174–176° C.) from dimethylformamide/water, obtained from 4-(β-phenyl-acetamidoethyl)-benzenesulfonamide and potassium cyanate were heated under reflux for 5 hours, while stirring with a mixture of 250 ml. of toluene, 30 ml. of glycol monomethyl ether, 1.65 g. of glacial acetic acid and 2.8 g. of cyclohexylamine. The reaction mixture was concentrated under reduced pressure and the residue was treated with 1 l. of 1% aqueous ammonia. It was filtered over charcoal and the filtrate was acidified. After recrystallization from methanol the N-[4-(β-phenyl-acetamido-ethyl)-benzenesulfonyl]-N'-cyclohexyl-urea [1] was found to melt at 176° C.

---
[1] Obtained as crude product.

In analogous manner, there were obtained: N-[4-(β-phenylacetamido-ethyl) - benzenesulfonyl] - N' - cyclooctyl-urea (melting point: 178–180° C.) (from methanol), N-[4-(β-phenyl-acetamido - ethyl) - benzenesulfonyl]-N'-butyl-urea (melting point: 140–141° C.) (from methanol), N-[4-(β-phenyl-acetamido-ethyl) - benzenesulfonyl]-N'-(4'-methylcyclohexyl)-urea (melting point: 183–184° C.) (from methanol).

EXAMPLE 26

N-[4-(β-4'-chlorophenyl-acetamido-α-methyl-ethyl)-benzene-sulfonyl]-N'-cyclohexyl-urea 26.5 g. of 4-[β-4'-chlorophenyl-acetamido-α-methyl-ethyl]-benzenesulfonamide were suspended in 250 ml. of acetone. 9.6 g. of finely ground potassium carbonate were added, while stirring and the whole was heated for 1 hour to boiling temperature. 12.5 g. of cyclohexyl-isocyanate were added dropwise and stirring was continued for 5 hours at boiling temperature. After removing the acetone by distillation the residue was taken up in water. The whole was filtered and the filtrate was acidified. The N-[4-(β-4'-chlorophenyl - acetamido-α-methyl - ethyl)-benzenesulfonyl]-N'-cyclohexyl-urea obtained in a yield of 21 g. was found to melt after recrystallization from methanol at 180–182° C.

EXAMPLE 27

N-[4-(β-cinnamoylamido-ethyl)-benzenesulfonyl]-N'-cyclohexyl-urea

A sample of 4.7 g. of N-[4-(β-cinnamoylamido-ethyl)-benzenesulfonyl]-N'-cyclohexyl-thiourea, prepared from 4-(β-cinnamoylamido-ethyl)-benzenesulfonamide and cyclohexyl-mustard oil, (melting point: 175–176° C.) was dissolved in excess 1 N-sodium hydroxide solution, an excess of 3% hydrogen peroxide was added and the whole was shortly heated on the steam bath. After cooling, the separated sulfur was filtered off, the whole was clarified with charcoal and the filtrate was acidified with dilute hydrochloric acid. The N-[4-(β-cinnamoyl-amido-ethyl)-benzenesulfonyl]-N'-cyclohexyl-urea obtained in a good yield was found to melt after recrystallization from methanol at 183–184° C.

EXAMPLE 28

N-[4-(β-cinnamoylamido-ethyl)-benzenesulfonyl[-N'-cyclohexyl-urea 4.6 g. of N-[4-(β-cinnamoylamido-ethyl)-benzenesulfonyl]-N'-cyclohexyl-isourea methyl ether prepared from the thiourea used as starting material according to Example 4 by the reaction of mercuric oxide in methanol at 60° C. (melting point: 133–135° C.) (from methanol) were heated for some minutes on the steam bath with 100 ml. of concentrated hydrochloric acid. The mass which was at first smeary solidified and immediately crystallized. After suction-filtration and recrystallization from methanol the N-[4-(β-cinnamoylamido-ethyl)-benzenesulfonyl]-N'-cyclohexyl-urea obtained was found to melt at 183–184° C.

EXAMPLE 29

N-[4-(γ-phenacetamido-propyl)-benzenesulfonyl]-N'-cyclohexyl-urea 18 g. of 4 - (γ - phenacetamido-propyl)-benzenesulfonamide (melting point: 167° C.) were combined with 110 ml. of acetone and 27 ml. of 2 N-sodium hydroxide solution and cooled down to 0–5° C. At this temperature, 7 g. of cyclohexyl-isocyanate were added dropwise, while stirring. The dropwise addition being complete, stirring was continued for 3 hours, while allowing the temperature to rise to 20° C. by removing the ice bath. The reaction solution was acidified, the acetone was removed at room temperature under reduced pressure and the residue was extracted with 1% ammonia. The extract was acidified, the precipitate formed was suction-filtered and recrystallized from a mixture of ethanol and water. (Melting point: 156° C.).

In analogous manner, there were obtained: N-[4-(γ-phenacetamido - propyl)-benzensulfonyl]-N'-n-butyl-urea (melting point: 167–168° C.) (from ethanol), N-[4-(β-phenacetamino-propyl)-benzenesulfonyl] - N'-cyclohexyl-urea (melting point: 178° C.) (from ethanol), N-[4-(β-phenoxyacetamino-propyl) - benzenesulfonyl] - N' - cyclohexyl-urea (melting point: 181° C.) (from methanol), N-[4-(γ - phenoxyacetamido - propyl) - benzenesulfonyl]-N'-(4-methyl-cyclohexyl)-urea (melting point: 161° C.) (from ethanol), N-[4-(β-phenoxyacetamido-propyl)-benzenesulfonyl]-N'-n-butyl-urea (melting point: 149° C.) (from ethanol).

EXAMPLE 30

N-[4-(phenoxyacetamidomethyl)-benzenesulfonyl]-N'-cyclohexyl-urea 32 g. of 4-(phenoxyacetamidomethyl)-benzenesulfonamide (melting point: 177–178° C.), prepared from 4-aminomethyl-benzenesulfonamide and phenoxyacetyl chloride were suspended in 200 ml. of acetone. This suspension was combined with a solution of 4 g. of sodium hydroxide in 60 ml. of water and to the clear solution obtained were added dropwise while stirring and at room temperature 12.5 g. of cyclohexyl isocyanate. Stirring was continued for 2 hours, the batch from which the reaction product had already precipitated was combined with water and hydrochloric acid and suction-filtered. The N-[4 - phenoxyacetamidomethyl) - benzenesulfonyl] - N'-cyclohexyl-urea was found to melt after recrystallization from a mixture of methanol and dimethylformamide at 170–172° C.

In analogous manner, there were obtained: N-[4-phenoxyacetamidomethyl)-benzenesulfonyl] - N' - (4-iso-propyl cyclohexyl)-urea (melting point: 180–182° C.), N-[4-(phenoxyacetamidomethyl) - benzenesulfonyl] - N'-isobutyl-urea (melting point: 140–142° C.).

EXAMPLE 31

N - [4-{β-(4-methoxy-phenylacetamido)-ethyl}-benzenesulfonyl]-N'-cyclohexyl-urea 17.4 g. of 4-[β-(4-methoxy-phenylacetamido)-ethyl]-benzenesulfonamide (melting point: 134–135° C.), prepared from 4-(β-aminoethyl)-benzenesulfonamide and p-methoxyphenyl-acetyl chloride), were introduced into 200 ml. of acetone and the aqueous solution of 2 g. of sodium hydroxide was added. Water was added in such an amount that a nearly clear solution was obtained, 6.5 g. of cyclohexyl isocyanate were added dropwise, while stirring, and stirring was continued for 2 hours. The turbidity formed was suction-filtered, the filtrate was combined with water and hydrochloric acid and the isolated product was recrystallized from ethanol. The N-[4-{β-(4-methoxy - phenylacetamido) - ethyl}-benzenesulfonyl]-N'-cyclohexyl-urea was found to melt at 166–168° C.

In analogous manner, there were obtained: N-[4-{β-(4-methoxy - phenylacetamido)-ethyl}-benezenesulfony]-N'-butyl-urea (melting point: 131–133° C.), N-[4-(4-methoxy - phenylacetamidomethyl)-benzenesulfonyl]-N'-cyclohexyl-urea (melting point: 192–194° C.), N-[4-(4-methoxy-phenylacetamidomethyl) - benzenesulfonyl] - N'-butyl-urea (melting point: 171–173° C.).

EXAMPLE 32

N-[4-(phenoxyacetamidomethyl)-benzenesulfonyl]-N'-cyclohexyl-urea 19 g. of N-[4-phenoxyacetamidomethyl)-benzenesulfonyl]-methyl-urethane (melting point: 163–165° C.), prepared from 4-(phenoxyacetamidomethyl)-benzenesulfonamide and chloroformic acid methyl ester in the presence of potassium carbonate in acetone, were heated on the oil bath with 5 g. of cyclohexylamine until a clear melted mass had formed (melting point: 150–160° C.) from which methanol escapes. The temperature was main-

EXAMPLE 33

N-[4-(phenoxyacetamidomethyl)-benzenesulfonyl]-N'-cyclohexyl-urea 9 g. of 4-(phenoxy-acetamidomethyl)-benzenesulfonyl-urea (melting point: 169–171° C.), prepared from 4-(phenoxy - acetamidomethyl) - benzenesulfonamide and potassium cyanate, were heated for 5 hours to boiling temperature in a mixture of 300 ml. of toluene and 30 ml. of monomethyl glycol with 1.65 g. of glacial acetic acid and 2.8 g. of cyclohexylamine, while stirring. Then the whole was concentrated under reduced pressure, the residue was triturated with alcohol and, after suction-filtration, the reaction product was recrystallized from a mixture of methanol and dimethylformamide. The N-[4-(phenoxy-acetamidomethyl)-benzenesulfonyl] - N'-cyclohexyl-urea was found to melt at 170–172° C.

EXAMPLE 34

N-[4-(β-cinnamoylamido-ethyl)-benzenesulfonyl]-N'-cyclohexyl-urea 7.35 g. of N,N-diphenyl-N'-cyclohexyl-urea and 8.8 g. of the sodium salt of the 4-(β-cinnamoylamido-ethyl)-benzenesulfonamide were suspended in 50 ml. of dimethylformamide and heated for 6 hours to 100° C., while stirring. The clear solution was then diluted with a small quantity of water; the whole was rendered alkaline with dilute sodium hydroxide solution and was twice shaken out with ether. The aqueous phase was filtered over charcoal and acidified, the precipitated N-[4-(β-cinnamoyl-amido-ethyl)-benzenesulfonyl] - N' - cyclohexyl-urea was suction-filtered and recrystallized from a mixture of dimethylformamide and water. (Melting point: 182–184° C.)

EXAMPLE 35

N-[4-(β-3,5-dimethoxy-benzamidoethyl)-benzenesulfonyl]-N'-cyclohexyl-urea 18.2 g. of 4-(β-3,5-dimethoxy-benzamidoethyl)-benzenesulfonamide (melting point: 151–153° C.), prepared from 4-(β-amino-ethyl)-benzenesulfonamide and 3,5-dimethoxybenzoyl chloride, were combined in 200 ml. of acetone with a solution of 2 g. of sodium hydroxide in a small quantity of water. The addition of water was continued until a clear solution had formed, 6.5 g. of cyclohexyl isocyanate were added dropwise at room temperature, while stirring, and stirring was continued for 2 hours at room temperature. A slight precipitate formed was suction-filtered and the filtrate was combined with water and hydrochloric acid. The precipitated product was suction-filtered and recrystallized from a mixture of ethanol and water. The N-[4-(β-3,5-dimethoxy-benzamidoethyl)-benzenesulfonyl] - N' - cyclohexyl-urea was found to melt at 184–186° C.

In analogous manner, there were obtained: N-[4-(β-3,5-dimethoxy-benzamidoethyl) - benzenesulfonyl]-N'-(4-ethyl-cyclohexyl)-urea (melting point: 209–210° C.), N-[4-(β-3,5-dimethoxy-benzamido-ethyl) - benzenesulfonyl]-N'-butyl-urea (melting point: 178–180° C.).

In analogous manner, there were obtained: from 4-(3,5-dimethoxybenzamido-methyl)-benzenesulfonamide (melting point: 189–191° C.) the N-[4-(3,5-dimethoxy-benzamido-methyl) - benzenesulfonyl] - N' - cyclohexyl - urea (melting point: 160–162° C.), the N-[4-(3,5-dimethyloxybenzamido - methyl) - benzenesulfonyl] - N' - (4 - ethylcyclohexyl)-urea (melting point: 190–192° C.).

EXAMPLE 36

N - [4 - (3 - methyl-4-chlorobenzamidomethyl)-benzenesulfonyl]-N'-cyclohexyl-urea 12 g. of 4 - (3-methyl-4-chlorobenzamidomethyl)-benzene-sulfonamide (melting point: 204° C.) were dissolved in 110 ml. of acetone and 18 ml. of 2 N-sodium hydroxide solution and, at 0–5° C., 5 g. of cyclohexyl isocyanate were slowly added dropwise, while stirring. Stirring was continued for 3 hours while allowing the temperature to rise to room temperature. The whole was acidified with 2 N-hydrochloric acid and the solvent was distilled off under reduced pressure. The residue was extracted with 1% ammonia, the extract was acidified and the precipitate was recrystallized from ethanol by adding a small quantity of water. (Melting point: 187° C.)

In analogous manner, there were obtained: N-[4-(3-methyl-4-chlorobenzamidomethyl)-benzenesulfonyl] - N'-(4 - methylcyclohexyl) - urea (melting point: 180° C.) (from ethanol) from 4 - (β - 3-methyl-4-chlorobenzamidoethyl)-benzenesulfonamide) melting point: 180–181° C.): N - [4 - (β - 3-methyl-4-chlorobenzamidoethyl)-benzenesulfonyl]-N'-n-butyl-urea (melting point: 178° C.) (from methanol/water), N - [4-(β-3-methyl-4-chlorobenzamidoethyl) - benzenesulfonyl] - N' - cyclohexyl-urea (melting point: 184° C.) (from ethanol/water) N-[4-β-3-methyl-4-chlorobenzamidoethyl) - benzenesulfonyl] - N'-(4-methylcyclohexyl)-urea (melting point 191° C.) (from ethanol) from 4 - (β-3-chloro-4-methylbenzamidopropyl)-benzenesulfonamide (melting point: 159° C.): N-[4-(β-3-chloro-4-methylbenzamidopropyl) - benzenesulfonyl] - N'-cyclohexyl-urea (melting point: 209° C.) (from ethanol/water) from 4-(γ-3-chloro-4 - methylbenzamidopropyl)-benzenesulfonamide (melting point: 145° C.): N - [4-(γ-3-chloro - 4 - methylbenzamidopropyl)-benzenesulfonyl]-N'-(4-methylcyclohexyl)-urea (melting point: 151° C.) (from methanol) N-[4 - (γ-3-chloro-4-methylbenzamidopropyl) - benzenesulfonyl] - N'-cyclohexyl-urea (melting point: 168° C.) (from ethanol) from 4-(2,4-dimethylbenzamidomethyl) - benzenesulfonamide (melting point: 202° C.): N - [4-(2,4-dimethylbenzamidomethyl)-benzenesulfonyl] - N' - cyclohexyl-urea (melting point: 197–199° C.) (from ethanol) from 4-(β-2,4-dimethylbenzamidoethyl) - benzenesulfonamide (melting point: 173° C.): N-[4 - (β - 2,4 - dimethylbenzamidoethyl)-benzenesulfonyl] - N' - cyclohexyl-urea (melting point: 208° C.) (from much ethanol or dimethylformamide/water) N-[4-(β - 2,4 - dimethylbenzamidoethyl)-benzenesulfonyl]-N'-(4 - methylcyclohexyl)-urea (melting point: 177° C.) (from ethanol) from 4 - (γ-2,5-dimethylbenzamidopropyl)-benzenesulfonamide (melting point: 141° C.): N-[4-(γ - 2,5 - dimethylbenzamidopropyl) - benzenesulfonyl]-N'-cyclohexy - urea (melting point: 184° C.) (from ethanol).

EXAMPLE 37

N - [4 - (β-2-methyl-6-chloro-benzamido-ethyl)-benzenesulfonyl]-cyclohexyl-urea 17.5 g. of 4 - (β - 2-methyl-6-chloro-benzamido-ethyl)-benzenesulfonamide (melting point: 176–178° C.) were heated for 1 hour to boiling temperature in 250 ml. of acetone with 13.8 g. of finely ground potassium carbonate, while stirring. Then 6.3 g. of cyclohexyl isocyanate were added dropwise and stirring was continued for 6 hours at boiling temperature. The acetone was distilled off under reduced pressure, the residue was taken up in about 3 l. of water, filtered and the filtrate was acidified with dilute hydrochloric acid. The crystalline precipitate of N-[4-(β-2 - methyl - 6-chloro-benzamido-ethyl)-benzenesulfonyl]-cyclohexyl-urea obtained was suction-filtered, washed with water and dissolved in 1% ammonia for further purification. After filtering again, the filtrate obtained was acidified and, after suction-filtration, the crystallization product was recrystallized from methanol. Melting point: 203–204° C.

In analogous manner, there was obtained: from 4-(β-2 - methyl - 6 - chloro-benzamido-ethyl)-benzenesulfonamide and 4-methyl-cyclohexylisocyanate the N-[4-(β-2-methyl - 6 - chloro-benzamido-ethyl)-benzenesulfonyl]-N' - (4 - methyl-cyclohexyl)-urea (melting point: 190–191° C.) (from methanol).

In analogous manner, there were obtained: N-[4-(β-3,5-dipropoxy - benzamido - ethyl) - benzenesulfonyl]-N'-cyclohexyl-urea (metling point: 172–174° C.) (from methanol) by reacting 4-(β-3,5-dipropoxybenzamido-ethyl)-benzenesulfonamide (melting point: 185–187° C.) with cycloisocyanate and the N - [4-(β-3,5-dipropoxy-benzamido-ethyl)-benzene sulfonyl]-N' - (4 - methyl - cyclohexyl)-urea from the above-defined sulfonamide and 4-methyl-cyclohexyl - isocyanate, (melting point: 170– 172° C.) (from methanol), as well as the N-[4-(β-3,5-dipropoxy-benzamido-ethyl)-benzenesulfonyl] - N' - n - butyl-urea from the above-defined sulfonamide and butylisocyanate (melting point: 170–172° C.) (from isopropanol).

EXAMPLE 38

N - [4 - (β-2,6 - dimethyl-benzamido-ethyl)-benzenesulfonyl]-N'-cyclohexyl-urea (a) N - [4 - (β - 2,6-dimethyl-benzamido-ethyl)-benzenesulfonyl] - N' - cyclohexyl - thiourea.—16.6 g. of 4-(β-2,6-dimethyl-benzamido - ethyl) - benzenesulfonamide (melting point: 174–175° C.) and 13.8 g. of potassium carbonate were heated under reflux for 2 hours to boiling temperature in 200 ml. of acetone, while stirring. Then 7 g. of cyclohexyl mustard oil were added dropwise and stirring was continued for 16 hours at boiling temperature. After concentration under reduced pressure, the residue obtained was dissolved at 45° C. on the steam bath in about 3 l. of water. The whole was clarified with charcoal, filtered and the filtrate was acidified with dilute hydrochloric acid. For further purification the N-[4-(β-2,6-dimethyl-benzamido-ethyl) - benzenesulfonyl]-N' - cyclohexylthiourea was dissolved in 1% ammonia and, after filtration, the solution was acidified with hydrochloric acid. After suction-filtration, drying and recrystallization from methanol, the crystallization product was found to melt at 171–173° C.

(b) N - [4 - (β-2,6 - dimethyl-benzamido-ethyl)-benzenesulfonyl] - N' - cyclohexyl-urea.—3.4 g. of mercuric chloride were dissolved in 30 ml. of water. 12.5 ml. of 2 N-sodium hydroxide solution were added dropwise, while stirring. The precipitated mercuric oxide was combined at a temperature of 40° C., with 4.5 g. of N-[4-(β-2,6-dimethyl - benzamido - ethyl) - benzenesulfonyl]-N'-cyclohexyl-thiourea dissolved in 20 ml. of a mixture of equal parts of 1 N-sodium hydroxide solution and dimethylformamide. Stirring was continued for 2½ hours at 40–50° C. The mercuric sulfide obtained was suction-filtered and washed with a small quantity of water. The filtrate was clarified with charcoal and acidified with dilute hydrochloric acid. A precipitate of N-[4-(2,6-dimethyl-benzamidoethyl)-benzenesulfonyl] - N' - cyclohexyl - urea was obtained which was suction-filtered, washed with water and recrystallized from ethanol. (Melting point: 191–193° C.).

(c) N - [4-(β-2,6-dimethyl-benzamido-ethyl)-benzenesulfonyl] - N'-cyclohexyl-iso-urea-methylether.—2.5 g. of mercuric oxide were suspended in 40 ml. of methanol. The whole was heated to 40° C. and then 4.73 g. of N-[4-(β-2,6 - dimethyl - benzamido-ethyl) - benzenesulfonyl]-N'-cyclohexyl-thiourea dissolved in 60 ml. of methanol and 25 ml. of dioxane were added. The suspension was stirred for 5 hours at 40° C. the mercuric sulfide formed was filtered off and from the filtrate the N-[4-(β-2,6-dimethyl-benzamido - ethyl) - benzenesulfonyl]-N'-cyclohexyl-iso-urea-methylether was precipitated as crystallization product by sprinkling with water. The substance was suction-filtered and dried. After recrystallization from acetic ester it was found to melt at 136–138° C. The same substance may be obtained by reacting 4-(β-2,6-dimethyl-benzamidoethyl)-benzenesulfonic acid chloride with N-cyclohexyl-isourea-methyl-ether.

(d) N - [4-(β-2,6-dimethyl-benzamido-ethyl)-benzenesulfonyl] - N' - cyclohexyl-urea.—3.7 g. of N-[4-(β-2,6-benzamido - ethyl) - benzenesulfonyl] - N'-cyclo-isourea-methylether were heated for 5 minutes on the steam bath with 100 ml. of concentrated hydrochloric acid. The precipitated N-[4-(β-2,6-dimethylbenzamido-ethyl)-benzenesulfonyl]-N'-cyclohexyl-urea was suction-filtered, triturated with water and recrystallized from ethanol. (Melting point: 191–193° C.).

EXAMPLE 39

N-[4-(β-2-methyl-6-chloro-benzamido-ethyl)-benzenesulfonyl]-N'-cyclohexyl-urea (a) N - [4 - (β - 2-methyl-6-chloro-benzamido-ethyl)-benzenesulfonyl]-N'-cyclohexyl-parabanic acid.—14.9 g. of 4 - (β-2-methyl-6-chlorobenzamido-ethyl)-benzenesulfonic acid chloride were heated ulnder reflux for 2 hours to boiling temperature in 200 ml. of benzene with 8 g. of cyclohexyl-parabanic acid and 4 g. of triethylamine. At first a clear solution was obtained, then N-[4-(β-2-methyl-6 - chloro - benzamido-ethyl)-benzenesulfonyl]-N'-cyclohexyl-parabanic acid separated in crystalline form. It was allowed to stand over night; then it was suction-filtered and recrystallized from a mixture of methanol and dioxane. The substance obtained was found to melt at 211–213° C.

(b) N - [4 - (β - 2-methyl-6-chloro-benzamido-ethyl)-benzenesulfonyl]-N'-cyclohexyl-urea.—5 g. of the parabanic acid derivative obtained according to (a) were heated for 45 minutes on the steam bath in 50 ml. of dioxane and 100 ml. of 1 N-sodium hydroxide solution. A clear solution was obtained, which, after termination of heating was combined with dilute hydrochloric acid. The precipitated crystals were suction-filtered. The melting point of the N-[4-(β-2-methyl-6-chloro-benzamido-ethyl)-benzenesulfonyl]-N'-cyclohexyl-urea thus obtained was found to be after recrystallization from methanol 203–204° C.

EXAMPLE 40

N-[4-(β-2-methyl-4-chloro-benzamido-ethyl)-benzenesulfonyl]-N'-cyclohexyl-urea 41 g. of [4 - (β - 2-methyl-4-chloro-benzamido-ethyl)-benzenesulfonyl]-methyurethane (melting point: 175–177° C.) were suspended in 50 ml. of xylene and, at 70° C., 10 g. of cyclohexylamine were added dropwise, while stirring. The temperature was raised to 120–130° C., whereupon the reaction set in after a short time, with evolution of methanol. After 30 minutes, the whole was cooled; the sulfonylurea formed precipitated and was recrystallized from a mixture of dimethylformamide and water. The melting point of N-[4-(β-2-methyl-4-chloro-benzamido - ethyl) - benzenesulfonyl]-N'-cyclohexyl-urea was found to be 195–196° C.

In analogous manner, there was obtained: from N-[4-(β - 3,4 - dichlorobenzamido - ethyl) - benzenesulfonyl]-methylurethane (melting point: 197–200° C.) the N-[4-(β - 3,4 - dichlorobenzamido-ethyl)-benzenesulfonyl]-N'-(4-ethoxycyclohexyl)-urea (melting point: 206–207.5° C.) (from methanol).

EXAMPLE 41

N-[4-(β-2-methyl-4-chloro-benzamido-ethyl)-benzenesulfonyl]-N'-(4-methyl-cyclohexyl)urea A mixture of 9.9 g. of N-[4-(β-2-methyl-4-chloro-benzamido-ethyl)-benzenesulfonyl]-urea (melting point: 194° C.), 300 ml. of toluene, 30 ml. of glycol monomethyl ether, 1.65 g. of glacial acetic acid and 3.2 g. of 4-methylcyclohexylamine were heated under reflux for 5 hours, while stirring. The mixture was concentrated under reduced pressure and the residue was triturated with alcohol. The N - [4 - (β-2-methyl-4-chloro-benzamido-ethyl)-benzenesulfonyl]-N'-(4-methyl-cyclohexyl)-urea obtained as crude product was suction-filtered and found to melt, after recrystallization from a mixture of dimethylformamide and water, at 196–197° C.

EXAMPLE 42

N-[4-(β-3,4-dimethyl-benzamido-ethyl)-benzenesulfonyl]-N'-cyclohexyl-urea 16.6 g. of 4-(β-3,4-dimethyl-benzamido-ethyl)-benzenesulfonamide (melting point 190° C.) were combined, at 0–5° C. in 25 ml. of 2 N-sodium hydroxide solution and 50 ml. of acetone with 6.5 g. of cyclohexyl-isocyanate, while stirring. Stirring was continued for 3 hours, the whole as diluted with water and a small quantity of methanol, the undissolved matter was filtered off, the filtrate was acidified and the precipitate obtained was recrystallized from a mixture of dimethylformamide and water. The melting point of N-[4-(β-3,4-dimethyl-benzamido-ethyl)-benzenesulfonyl]-N'-cyclohexyl-urea was found to be 194–195° C.

In analogous manner, there were obtained: N-[4-(β-3,4 - dimethyl - benzamido - ethyl) - benzenesulfonyl]-N'-(4-methyl-cyclohexyl)-urea (melting point: 172–174° C.) (from dimethylformamide/water) from 4-(β-3,4-dichlorobenzamido-ethyl)-benzenesulfonamide (melting point: 171–172° C.) N - [4 - (β-3,4-dichloro-benzamido-ethyl)-benzenesulfonyl]-N'-cyclohexyl-urea (melting point: 187–189° C.) from dimethylformamide/water) N-[4-(β-3,4-dichloro - benzamido - ethyl) - benzenesulfonyl - N'-(4-methyl-cyclohexyl)-urea (melting point: 192–194° C.) (from dimethylformamide/water) from 4-(β-3-chloro-4-methyl - benzamido-ethyl)-benzenesulfonamide (melting point: 198–200° C.) N - [4 - (β-3-chloro-4-methyl-benzamido - ethyl) - benzenesulfonyl] - N' - cyclohexyl-urea (melting point: 207–209° C.) (from dimethylformamide/water) N - [4 - (β - 3-chloro-4-methyl-benzamido-ethyl)-benzenesulfonyl] - N'-(4-methyl-cyclohexyl)-urea (melting point: 200–202°) (from dimethylformamide/water from 4-(β-2,6-dichloro-benzamido-ethyl)-benzenesulfonamide (melting point: 182–184° C.): N - [4 - (β - 2,6-dichloro-benzamido-ethyl)-benzenesulfonyl] - N'-cyclohexyl-urea (melting point: 206–207° C.) (from dimethylformamide/water), N - [4 - (β - 2,6-dichloro-benzamido-ethyl)-benzenesulfonyl] - N'-butyl-urea (melting point: 189–191° C.) (from dimethylformamide/water), N - [4-(β-2,6-dichloro-benzamido-ethyl) - benzenesulfonyl]-N'-(4-methyl-cyclohexyl)-urea (melting point: 180–181° C.) (from methanol); from 4 - (β - 2,5-dimethyl-benzamido-ethyl)-benzenesulfonamide (melting point: 162° C.): N-[4-(β-2,5-dimethyl-benzamido-ethyl) - benzenesulfonyl]-N'-cyclohexyl-urea (melting point: 184–185° C.) (from methanol), N - [4-(β-2,5-dimethyl-benzamido-ethyl)-benzenesulfonyl] - N'-butyl-urea (melting point: 169–171° C.) (from methanol); from 4-(β-2,4-dichloro-benzamido-ethyl)-benzenesulfonamide (melting point: 162–164° C.): N-[4-(β-2,4 - dichloro-benzamido-ethyl) - benzenesulfonyl] - N' - cyclohexyl-urea (melting point: 197–198° C.) (from dimethylformamide/water), N-[4-(β-2,4-dichloro-benzamido-ethyl)-benzenesulfonyl]-N'-butyl-urea (melting point: 186–188° C.) (from dimethylformamide/water); from 4 - (β - 3-chloro-4-methylbenzamido-ethyl)-benzenesulfonamide (melting point: 198–200° C.) the N-[4-(β-3 - chloro-4-methylbenzamido-ethyl) - benzenesulfonyl]-N'-butyl-urea (melting point: 174–175° C.) (from methanol/dimethylformamide) and the N-[4-(β-3-chloro-4-methylbenzamido-ethyl)-benzenesulfonyl] - N'-(4-ethyl-cyclohexyl)-urea (trans) (melting point: 196–197° C.) (from methanol/dimethylformamide); from 4-(β-3,4-dimethylbenzamido-ethyl) - benzenesulfonamide (melting point: 190° C.) the N - [4 - (β-3,4-dimethylbenzamido-ethyl)-benzenesulfonyl] - N' - (4-ethylcyclohexyl)-urea (trans) (melting point: 177.5–179° C.) (from methanol).

EXAMPLE 43

N-[4-(β-4-n-butoxy-benzamido-ethyl)-benzenesulfonyl]-N'-cyclohexyl-urea 18.8 g. of 4-(β-4-n-butoxy-benzamido-ethyl)-benzenesulfonamide (melting point: 208–209° C.) were stirred for 1 hour together with 13.8 g. of potassium carbonate and 300 ml. of acetone, while heating to the boiling temperature of the acetone. Then 6.3 g. of cyclohexyl-isocyanate were added dropwise at the boiling temperature of acetone and stirring was continued for 4 hours, while further boiling. The whole was concentrated under reduced pressure, the residue obtained was dissolved in about 2 l. of water on the steam bath, filtered and the filtrate was acidified with dilute hydrochloric acid. The residue obtained was taken up in 1% aqueous ammonia and re-precipitated by acidifying the filtrate with hydrochloric acid. The N-[4-(β-4-n-butoxy-benzamido-ethyl)-benzenesulfonyl]-N'-cyclohexyl-urea thus obtained was found to melt, after recrystallization from a mixture of methanol and dioxane, at 197–199° C.

In analogous manner, there were obtained from the same 4-(β-4-n-butoxy-benzamido-ethyl) - benzenesulfonamide and 4-methyl-cyclohexylisocyanate the N-[4-(β-4-n - butoxy-benzamido-ethyl)-benzenesulfonyl]-N'-4-methyl-cyclohexyl-urea (melting point: 202–204° C.) (from methanol/dioxane) and by using n-butylisocyanate the N-[4-(β-4-n-butoxy-benzamido-ethyl) - benzenesulfonyl]-N' - n - butyl-urea (melting point: 203–205° C.) (from methanol).

EXAMPLE 44

N-[4-(β-4-n-butoxy-benzamido-ethyl)-benzenesulfonyl]-N'-isobutyl-urea 13.6 g. of mercuric chloride were dissolved in 120 ml. of water. 50 ml. of 2 N-sodium hydroxide solution were added dropwise, while stirring. To the precipitated mercuric oxide, 18 g. of N - [4 - (β-4-n-butoxy-benzamido-ethyl)-benzenesulfonyl] - N' - isobutyl-thiourea (melting point: 124–126° C.) prepared from β-4-n-butoxy-benzamido-ethyl-benzenesulfonamide and isobutyl mustard oil in the presence of potassium carbonate) dissolved in 80 ml. of a mixture of equal parts of 1 N-sodium hydroxide solution and dimethylformamide were added at a temperature of 40° C. Stirring was continued for 2½ hours at 40–50° C., the mercuric sulfide formed was suction-filtered and washed with a small quantity of water. The filtrate was clarified with charcoal and acidified with dilute hydrochloric acid. A precipitate of N-[4-(β-4-n-butoxy-benzamido-ethyl)-benzenesulfonyl]-N'-isobutyl-urea was obtained which was washed with water and recrystallized from methanol. (Melting point: 210–212° C.)

EXAMPLE 45

N-[4-(β-4-n-butoxy-benzamido-ethyl)-benzensulfonyl]-N'-cyclohexyl-urea

A mixture of 10 g. of N-[4-(β-4-n-butoxy-benzamido-ethyl)-benzenesulfonyl]-urea (melting point: 219–220° C.), 300 ml. of toluene, 30 ml. of glycol monomethyl ether, 1.7 g. of glacial acetic acid and 8.8 g. of cyclohexylamine was heated under reflux for 5 hours, while stirring. The mixture was concentrated under reduced pressure and the residue was triturated with alcohol. The N-[4-(β-4-n-butoxy - benzamido-ethyl) - benzenesulfonyl]-N'-cyclohexyl-urea obtained as crude product was suction-filtered. After recrystallization from a mixture of dimethylformamide and water it was found to melt at 190–192° C.

EXAMPLE 46

N-[4-(β-[2'-benzyloxy]-benzamido-ethyl)-benzenesulfonyl]-N'-cyclohexyl-urea 20.5 g. of 4-(β-[2'-benzyloxy]-benzamido-ethyl)-benzenesulfonamide (melting point: 180–183° C.) were suspended in 250 ml. of acetone. 13.8 g. of ground potassium carbonate were added and the whole was heated under reflux for 1½ hours to boiling temperature. Then 6.25 g. of cyclohexyl-isocyanate were added dropwise. Stirring was continued for 7½ hours at the boiling temperature of the acetone which was then distilled off under reduced pressure. The residue was taken up in water, the undissolved matter was filtered off, the whole was clarified with charcoal and the filtrate was acidified. The crude N-[4-(β-[2'-benzyloxy]-benzamido-ethyl) - benzenesulfonyl]-N'-cyclohexyl-urea obtained was found to melt after recrystallization from methanol at 175–177° C.

In analogous manner, there was obtained by using the above-defined sulfonamide and methyl - cyclohexyl-isocyanate the N-[4-(β-[2'-benzyloxy] - benzamido-ethyl)-benzenesulfonyl]-N'-4 - methyl-cyclohexyl-urea (melting point: 165–167° C.).

EXAMPLE 47

N-[4-(β-2-hydroxy-benzamido-ethyl)-benzenesulfonyl]-N'-cyclohexyl-urea 1 g. of the N-[4-(β-2-benzylhydroxy-benzamido-ethyl)-benzenesulfonyl]-N'-cyclohexyl-urea obtained according to Example 46 was dissolved in about 150 ml. of methanol. After the addition of palladium black the solution was shaken in a hydrogenation duck with hydrogen. The absorption of hydrogen being complete, the reaction solution was filtered off from the catalyst and concentrated. The N-[4-(β-2-hydroxy - benzamido - ethyl)-benzenesulfonyl]-N'-cyclohexyl-urea obtained was found to melt, after recrystallization from methanol, at 191–193° C.

EXAMPLE 48

N-[4-(β-2-carboxy-benzamido-α-methyl-ethyl)-benzenesulfonyl]-N'-cyclohexyl-urea 34.4 g. of 4-(β-phthalimido-α-methyl-ethyl) - benzenesulfonamide (melting point: 165–171° C.) were dissolved in 500 ml. of acetone. 27.6 g. of ground potassium carbonate were added and the whole was heated under reflux for 1 hour to boiling temperature, while stirring. Then 12.5 g. of cyclohexyl-isocyanate were added dropwise. After heating for 6 hours under reflux and simultaneously stirring, the acetone was distilled off from the reaction mixture and the residue was dissolved in water. By acidifying with hydrochloric acid a precipitate was obtained which was re-dissolved in 1% ammonia. After filtrating and acidifying, the N-[4-(β - 2 - carboxy-benzamido-α-methyl-ethyl)-benzenesulfonyl]-N'-cyclohexyl - urea crystallized out. The melting point of the substance was found to be, after recrystallization from methanol, 170–171° C.) (under decomposition).

In analogous manner, there were obtained by using 4-(β-phthalimidoethyl)-benzenesulfonamide (melting point: 225–227° C.) the N - [4-(β-2-carboxybenzamido-ethyl)-benzenesulfonyl]-N'-cyclohexyl-urea (melting point: 161–163° C.) (under decomposition) and by using the above-defined benzenesulfonamide and isobutyl-isocyanate the N-[4-(β-2-carboxy-benzamido-ethyl) - benzenesulfonyl]-N'-isobutyl-urea (melting point: 145–146° C.) (under decomposition).

The same compound was obtained by reacting instead of the phthalimide the 4-(β-2-carboxy-benzamido-ethyl)-benzenesulfonamide in acetone with isobutyl-isocyanate by using an excess of potassium carbonate.

In analogous manner, there was obtained: from 4-(β-2-carboxy - 4 - chloro-benzamido-ethyl) - benzenesulfonamide and cyclohexylisocyanate the N-[4-(β-2-carboxy-4-chloro-benzamido-ethyl)-benzenesulfonyl] - N' - cyclohexyl-urea (melting point: 117–118° C.) (decomposition); from 4 - (β - 2-carboxy-4-chloro-benzamido-ethyl)-benzenesulfonamide and 4 - methyl - cyclohexylisocyanate the N - [4 - (β - 2-carboxy-4-chloro-benzamido-ethyl)benzenesulfonyl] - N' - (4 - methyl-cyclohexyl)-urea (melting point: 109–110° C.) (decomposition).

EXAMPLE 49

N-[4-(β-3-trifluoromethyl-benzamido-ethyl)-benzenesulfonyl]-N'-cyclohexyl-urea 18.6 g. of 4-(β-3-trifluoromethyl - benzamido-ethyl)-benzenesulfonamide (melting point: 145–147° C.) (from methanol) were dissolved in 25 ml. of 2 N-sodium hydroxide solution and 50 ml. of acetone and, at 0–5° C., 6.3 g. of cyclohexyl isocyanate were added dropwise. Stirring was continued for 3 hours, the whole was diluted with water and a small quantity of methanol, filtered and the filtrate was acidified. The N-[4-(β-3-trifluoromethyl-benzamido-ethyl) - benzenesulfonyl-N'-cyclohexyl-urea precipitating in crystalline form was found to melt, after recrystallization from methanol, at 160–162° C.

In analogous manner, there were obtained: N-[4-(β-3-trifluoromethyl-benzamido-ethyl) - benzenesulfonyl]-N'-butyl-urea (melting point: 145–146° C.) (from methanol), N-[4-(β-3-trifluoromethyl-benzamido-ethyl) - benzenesulfonyl]-N'-(4-methyl - cyclohexyl)-urea (melting point: 176–177° C.) (from methanol).

In analogous manner, there were obtained: from 4-(β-4-cyano-benzamido-ethyl) - benzenesulfonamide (melting point: 237–238° C.) (from dimethylformamide/water) the N-[4-(β-4-cyano-benzamido-ethyl)-benzenesulfonyl]-N'-cyclohexyl-urea (melting point: 198° C.) (from dimethylformamide/water), the N-[4-(β - 4 - cyano-benzamido - ethyl) - benzenesulfonyl]-N'-butyl-urea (melting point: 192–193° C.) (from methanol) and the N-[4-(β-4 - cyano - benzamido-ethyl) - benzenesulfonyl]-N'-(4-methyl - cyclohexyl) - urea (melting point: 189–199° C.) (from methanol), from 4 - (β - 4-trifluoro-methyl-benzamido-ethyl) - benzenesulfonamide (melting point: 216–217° C.) the N-[4-(β-4-trifluoromethyl-benzamido-ethyl)-benzenesulfonyl]-N'-cyclohexyl-urea (melting point: 205–206° C.) (from dimethylformamide/water) and the N-[4-(β-4-trifluoromethyl - benzamido-ethyl) - benzenesulfonyl] - N' - (4-methyl-cyclohexyl)-urea (melting point: 213–214° C.) (from dimethylformamide/water), from 4-(β-4-methylsulfonyl-benzamido-ethyl) - benzenesulfonamide (melting point: 238–240° C.) the N-[4-(β-4-methylsulfonyl - benzamido-ethyl) - benzenesulfonyl]-N'-cyclohexyl-urea (melting point: 212° C.) (from dimethylformamide/methanol) and the trans N-[4-(β-4-methylsulfonyl-benzamido-ethyl)-benzenesulfonyl] - N' - (4-methylcyclohexyl)urea (melting point: 210–211° C.) (from dimethylformamide/methanol), from 4-(β-[4'-benzyloxy]-benzamido-ethyl)-benzenesulfonamide (melting point: 242° C.) the N-[4-(β-[4'-benzyloxy]-benzamido-ethyl) - benzenesulfonyl]-N'-cyclohexyl-urea (melting point: 218° C.) (from dimethylformamide/water) and the trans N-[4-(β-[4'-benzyloxy]-benzamido-ethyl) - benzenesulfonyl]-N'-(4 - methyl-cyclohexyl)-urea (melting point: 224° C.) (from dimethylformamide/water), from 4-(β-3-trifluoromethylbenzamido-ethyl) - benzenesulfonamide (melting point: 145–147° C.) the N-[4-(β-3-trifluoromethylbenzamido-ethyl) - benzenesulfonyl] - N' - (4-ethylcyclohexyl)-urea (trans) (melting point: 181–182.5° C.) (from methanol); from 4-(β-4-methylsulfonylbenzamido-ethyl)-benzenesulfonamide (melting point: 238–240° C.) the N-[4-(β-4-methyl-sulfonylbenzamido-ethyl) - benzenesulfonyl]-N'-butyl-urea (melting point: 190–191° C.) (from methanol/dimethylformamide); from 4 - (β-[4'-benzyloxy]-benzamido - ethyl) - benzenesulfonamide (melting point: 242° C.) the N-[4-(β-[4'-benzoyloxy]-benzamido-ethyl)-benzenesulfonyl]-N'-butyl-urea (melting point: 206–207° C.) (from dimethylformamide/water); from 4 - (β - 4-phenylbenzamido - ethyl) - benzenesulfonamide (melting point: 281–283° C.) the N - [4 - (β - phenylbenzamido-ethyl) - benzenesulfonyl] - N' - cyclohexyl - urea (melting point: 222° C.) (decomposition) (from methanol); from 4-(β-4-tert.butylbenzamido-ethyl)-benzenesulfonamide (melting point: 208° C.): the N-[4-(β-4-tert.butylbenzamido - ethyl) - benzenesulfonyl]-N'-cyclohexyl-urea (melting point: 201–202.5° C.) (from methanol), the N-[4 - (β-4-tert.butylbenzamido-ethyl)-benzenesulfonyl]-N'-butyl-urea (melting point: 160–161° C.) (from methanol), the N-[4-(β-4-tert.butylbenzamido-ethyl)-benzenesulfonyl]-N'-(4-methylcyclohexyl)-urea (trans) (melting point: 190–191° C.) (from methanol) and the N-[4-(β-4 - tert.butylbenzamido - ethyl)-benzenesulfonyl]-N'-(4-ethylcyclohexyl)-urea (trans) (melting point: 180–181° C.) (from methanol); from 4-(β-2-acetylbenzamidoethyl)-benzenesulfonamide (melting point: 213–215° C.) the N-[4-(β-2-acetylbenzamido-ethyl)-benzenesulfonyl]-N'-cyclohexyl-urea (melting point: 181° C.) (decomposition) (from methanol) and the N-[4-(β-2-acetylbenzamido - ethyl)-benzenesulfonyl]-N'-(4-methylcyclohexyl)-urea (trans) (melting point: 184–185° C.) (from methanol); from 4-(4-methylmercaptobenzamidomethyl)-benzenesulfonamide (melting point: 195° C.) the N-[4-(4 - methylmercaptobenzamidomethyl)-benzenesulfonyl]-N'-cyclohexyl-urea (melting point: 191–192° C.) (from dimethylformamide/water) and the N-[4-(4-methylmercaptobenzamindomethyl) - benzenesulfonyl] - N' - (4 - methylcyclohexyl)-urea (trans) (melting point: 204–205° C.) (from dimethylformamide/water); from 4-(β-2-hydroxy - 4 - chloro-benzamido-ethyl)-benzenesulfonamide (melting point: 172–174° C.) the N-[4-(β-2-hydroxy-4-chloro - benzamido - ethyl) - benzenesulfonyl]-N'-cyclohexyl-urea (melting point: 204–206° C.) (from methanol/dioxane), the N-[4-(β-2-hydroxy-4-chloro-benzamido-ethyl) - benzenesulfonyl] - N' - 4-methylcyclohexyl-urea (trans) (melting point: 203–205° C.) (from methanol) and the N-[4-(β-2-hydroxy-4-chloro-benzamido-ethyl)-benzenesulfonyl]-N'-n-butyl-urea (melting point: 171–173° C.) (from ethanol).

EXAMPLE 50

N-[4-(β-4-methylmercapto-benzamido-ethyl)-benzenesulfonyl]-N'-cyclohexyl-urea 40.8 g. of N - [4 - (β - 4 - methylmercapto-benzamidoethyl)-benzenesulfonyl]-methylurethane (melting point: 195–197° C.) (from dimethylformamide/water) were suspended in 50 ml. of xylene and, at 70°, 10 g. of cyclohexylamine were added dropwise, while stirring. The temperature was raised to 120–130°, whereupon the reaction set in after a short time, with evolution of methanol. After 1 hour the whole was cooled. The sulfonyl-urea formed precipitated and was recrystallized from a mixture of dimethylformamide and water. The N-[4-(β-4-methylmercapto - benzamido-ethyl)-benzenesulfonyl]-N'-cyclohexyl-urea thus obtained was found to melt at 212–213°.

In analogous manner, there was obtained the trans-N-[4 - (β - 4-methylmercapto-benzamido-ethyl)-benzenesulfonyl]-N'-(4-methyl-cyclohexyl)-urea (melting point: 213°) (from dimethylformamide/water).

EXAMPLE 51

N-[4-(γ-4-carboxy-benzamido-propyl)-benzenesulfonyl]-N'-cyclohexyl-urea 7 g. of N-4-(γ-4-carboxy-benzamido-propyl)-benzenesulfonamide (melting point: 148–149° C.) were dissolved in 100 ml. of acetone and 19.4 ml. of 2 N-sodium hydroxide solution and 2.5 g. of cyclohexyl-isocyanate were added dropwise, while stirring and cooling (0–5°). The dropwise addition being complete, stirring was continued for 3 hours while allowing the temperature to rise to 20°. Then the whole was acidified, the acetone was removed under reduced pressure at room temperature and the residue was extracted with 1% ammonia. The urea precipitated with acid was recrystallized from methanol and a small quantity of water. (Melting point: 163–164°.)

EXAMPLE 52

N-[4-(2-hydroxy-benzamido-methyl)-benzenesulfonyl]-N'-(4-methyl-cyclohexyl)-urea 10 g. of N-[4-(2-hydroxy-benzamido-methyl)-benzenesulfonamide (melting point: 184°) were dissolved in 80 ml. of acetone and 32.5 ml. of 2 N-sodium hydroxide solution, cooled down to 0–5° and 4.6 g. of methylcyclohexyl isocyanate were added dropwise, while stirring. Stirring was continued for 3 hours while allowing the temperature to rise to 20°, the whole was acidified and the acetone was removed at room temperature on the rotation evaporator. The residue was extracted with 1% ammonia, the extract was acidified and the precipitate was suction-filtered. By recrystallization from a mixture of ethanol and water crystals having a melting point of 180–181° were obtained.

In analogous manner, there were obtained: from N-[4-(β - 2 - hydroxy-benzamido-ethyl)-benzenesulfonamide (melting point: 207°) the N-[4-(β-2-hydroxy-benzamido-ethyl) - benzenesulfonyl - N'-cyclohexyl-urea (melting point: 193°) (from ethanol), the N-[4-(β-2-hydroxy-benzamido - ethyl) - benzenesulfonyl]-N'-(4-methylcyclohexyl)-urea (melting point: 188°) (from ethanol/water), the N - [4 - (β-2-hydroxy-benzamido-ethyl)-benzenesulfonyl]-N'-n-butyl-urea (melting point: 152°) (from isopropanol/water), from N-[4-(β-2-hydroxy-benzamido-propyl)-benzenesulfonamide (melting point: 196°) the N - [4 - (β - 2 - hydroxy-benzamido-propyl)-benzenesulfonyl]-N'-(4-methyl-cyclohexyl)-urea (melting point: 158°) (from ethanol/water), from N-[4-(γ-3-acethydroxy-benzenamido-propyl)-benzenesulfonamide (melting point: 137°) the N-[4-(γ-3-hydroxy-benzamido-propyl)-benzenesulfonyl]-N'-cyclohexyl-urea (melting point: 173–174.5°) (from ethanol/water).

During the preparation in the alkaline medium the hydroxyl group was de-acetylated.

EXAMPLE 53

N-[4-(β-4-n-butoxy-benzamidoethyl)-benzenesulfonyl]-N'-isobutyl-urea 3.8 g. of N-[4-(β-4-n-butoxy-benzamidoethyl)-benzenesulfonyl]-N'-isobutyl-isourea-methylether (obtained as an oily crude product by reacting N-[4-(β-4-n-butoxy-benzamidoethyl) - benzenesulfonyl] - N'-isobutyl-thiourea with mercuric oxide in methanol) were heated for 10 minutes on the steam bath with 50 ml. of concentrated hydrochloric acid. The whole was cooled, diluted with water and the N-[4-(β-4-n-butoxy-benzamido-ethyl)-benzenesulfonyl]-N'-isobutyl-urea which, after recrystallization from methanol was found to melt at 210–212°, was suction-filtered.

EXAMPLE 54

N-[4-(β-2,4,6-trimethyl-benzamido - ethyl) - benzenesulfonyl]-N'-cyclohexyl-urea 11.3 g. of 4-(β-2,4,6-trimethyl-benzamido-ethyl)-benzene sulfonamide (melting point: 193–195° C.), prepared from 2,4,6-trimethyl-benzoylchloride and 4-(β-amino-ethyl)-benzenesulfonamide were heated to the boil with 9.2 g. of potassium carbonate in 100 ml. of acetone, while stirring. 4.2 g. of cyclohexyl-isocyanate were added dropwise and stirring was continued for 3 hours at boiling temperature. The batch was then concentrated under reduced pressure, the residue was dissolved in water, the solution was filtered and acidified with dilute hydrochloric acid. The precipitated product was re-precipitated from 1% ammonia and recrystallized from methanol. The N-[4-(β-2,4,6-trimethyl-benzamido-ethyl) - benzenesulfonyl]-N'-cyclohexyl-urea was found to melt at 214-216° C.

In analogous manner, there were obtained: the N-[4-(β-2,4,6-trimethyl-benzamidoethyl) - benzenesulfonyl] - N'-(4-methyl-cyclohexyl)-urea (melting point: 206-208° C.), the N-[4-(β-2,4,6-trimethyl-benzamido-ethyl) - benzenesulfonyl]-N'-n-butyl-urea (melting point: 210–212° C.).

In analogous manner, there were obtained: from 4-(β-3,4,5-trimethoxybenzamido - ethyl) - benzenesulfonamide (melting point: 170–172° C.) the N-[4-β-3,4,5-trimethoxybenzamido - ethyl)-benzenesulfonyl]-N'-cyclohexyl-urea (melting point: 180–181° C.) (from methanol), the N-[4-(β-3,4,5-trimethoxybenzamido - ethyl) - benzenesulfonyl]-N'-butyl-urea (melting point: 165–167° C.) (from methanol), the N-[4-(β-3,4,5, - trimethoxybenzamido - ethyl) - benzenesulfonyl] - N'-(4-methyl-cyclohexyl)-urea (trans) (melting point: 208–209°) (from methanol/dimethylformamide) and the N - [4-(β-3,4,5-trimethoxybenzamido-ethyl) - benzenesulfonyl] - N' - (4- ethyl-cyclohexyl) - urea (trans) (melting point: 205–206.5°) (from methanol).

In analogous manner, there were, furthermore, obtained: from N-4-(β-3,4,5,-trimethoxybenzamidopropyl)-benzenesulfonamide (melting point: 176° C.) the N-[4-(β-3,4,5-trimethoxybenzamidopropyl) - benzenesulfonyl]-N'-cyclohexyl-urea (melting point: 215° C.) (from acetone/water); from N - 4-(γ-3,4,5-trimethoxybenzamidopropyl) - benzenesulfonamide (melting point: 181–183° C.) the N-[4-(γ-3,4,5-trimethoxybenzamidopropyl)-benzenesulfonyl] - N' - (4-methylcyclohexyl)-urea (melting point: 166° C.) (from ethanol/water).

EXAMPLE 55

N-[4-(β-N-methyl-benzamido - ethyl) - benzenesulfonyl]-N'-cyclohexyl-urea 15.9 g. of 4 - (β-N-methylbenzamido-ethyl)-benzenesulfonamide (melting point: 184–185.5°) (from methanol) were suspended in 25 ml. of 2 N-sodium hydroxide solution and 50 ml. of acetone and, at 0–5°, 6.5 g. of cyclohexyl-isocyanate were added dropwise, while stirring. Stirring was continued for 3 hours at room temperature, the whole was diluted with water, filtered and the filtrate was acidified. The N-[4-(β-N-methyl-benzamido-ethyl)-benzenesulfonyl]-N' - cyclohexyl - urea obtained in crystalline form was found to melt, after recrystallization from a mixture of dimethylformamide and water, at 199–200°.

In analogous manner, there was obtained: the N-[4-(β-N-methylbenzamido - ethyl) - benzenesulfonyl]-N'-(4-methylcyclohexyl)-urea (melting point: 172–174° C.) (from dimethylformamide/water).

In analogous manner, there were obtained: from the 4-(β-N-methyl-4-chloro - benzamido - ethyl) - benzenesulfonamide (melting point: 198–199°) (from methanol) the N-[4-(β-N-methyl - 4 - chlorobenzamido - ethyl)-benzenesulfonyl]-N'-cyclohexyl - urea (melting point: 164–166°) (from dimethyl formamide/water) and the N-[4-β-N-methyl - 4 - chlorobenzamido-ethyl)-benzenesulfonyl] - N' - (4 - methylcyclohexyl) - urea (trans) (melting point: 187–188°) (from methanol/dimethylformamide).

In analogous manner, there were obtained: from 4-(β-N-methyl-3-methyl - benzamido-ethyl) - benzenesulfonamide (melting point: 146°) (from methanol/water) the N-[4-(β-N-methyl-3 - methylbenzamido-ethyl) - benzenesulfonyl] - N' - cyclohexyl - urea (melting point: 142–144.5°) (from methanol) and the N - [4 - (β - N - methyl-3-methylbenzamido - ethyl) - benzenesulfonyl] - N' - (4-methylcyclohexyl) - urea (trans) (melting point: 155–157°) (from methanol).

In analogous manner, there were obtained: from 4-(N-methyl - benzamido - methyl) - benzenesulfonamide (melting point: 197°) (from methanol/dimethylformamide) the N-[4-(N-methyl - benzamido - methyl) - benzenesulfonyl] - N' - cyclohexyl - urea (melting point: 179–181°) (from dimethylformamide/water) and the N - [4-(N-methyl - benzamido - methyl) - benzenesulfonyl] - N' - (4 - methylcyclohexyl) - urea (melting point: 137–138°) (from methanol).

In analogous manner, there was obtained: from 4–(N-methyl - 4 - chlorobenzamido - methyl) - benzenesulfonamide (melting point: 144°) (from alcohol) the N-[4-(N-methyl - 4 - chlorobenzamido - methyl) - benzenesulfonyl] - N' - (4 - methylcyclohexyl) - urea (trans) (melting point: 199–201°) (from methanol).

In analogous manner, there was obtained: from 4-(β-N - benzyl - 4 - benzamido - ethyl) - benzenesulfonamide (melting point: 174–175°) (from methanol) the N-[4-(β-N-benzyl - benzamido - ethyl) - benzenesulfonyl]-N'-cyclohexyl-urea (melting point: 135–137°) (decomposition) (from methanol).

EXAMPLE 56

N - [4 - (β - 3,5 - dimethylphenoxyacetamido - ethyl)-benzenesulfonyl]-N'-(4-methylcyclohexyl)-urea (trans)

18.1 g. of 4-(β-3,5-dimethylphenoxyacetamido - ethyl)-benzenesulfonamide (melting point: 172°) were dissolved in 25 ml. of 2 N-sodium hydroxide solution and 50 ml. of acetone and, at 0–5°, 7 g. of 4-methylcyclohexylisocyanate (trans) were added dropwise, while stirring. Stirring was continued for 3 hours, the whole was diluted with methanol and a small quantity of dimethylformamide, filtered, the filtrate was combined with water and acidified with dilute hydrochloric acid. The N-[4-(β-3,5-dimethylphenoxyacetamido-ethyl)-benzenesulfonyl] - N'-(4-methylcyclohexyl) - urea obtained in crystalline form was suction-filtered and recrystallized from methanol. (Melting point: 188–190°.)

In analogous manner, there was obtained: the N-[4-(β-3,5 - dimethylphenoxyacetamido - ethyl) - benzenesulfonyl] - N' - cyclohexyl - urea (melting point: 162–163°) (from methanol).

In analogous manner, there were obtained: from 4-(β-3,4 - dimethylphenoxyacetamido-ethyl) - benzenesulfonamide (melting point: 150–151°) the N-[4-(β-3,4-dimethylphenoxyacetamido-ethyl)-benzenesulfonyl] - N' - cyclohexyl-urea (melting point: 176–177.5°) (from methanol) and the N-[4-(β-3,4-dimethylphenoxyacetamido-ethyl)-benzenesulfonyl]-N'(4-methylcyclohexyl)-urea (trans) (melting point: 184–185.5°) (from methanol), from 4-(β-2,4-dichlorophenoxyacetamido-ethyl - benzenesulfonamide (melting point: 147°) the N-[4-(β-2,4-dichlorophenoxyacetamido-ethyl)-benzenesulfonyl]-N' - cyclohexyl - urea (melting point: 156–158°) (from methanol) and the N-[4-(β-2,4-dichlorophenoxyacetamido-ethyl) - benzenesulfonyl]-N'-(4-methylcyclohexyl) - urea (trans) (melting point: 173–174°) (from methanol), from 4-(β-2-methyl-4,6-dichloro-phenoxyacetamido - ethyl) - benzenesulfonamide (melting point: 85°) the N-[4-(β-2-methyl-4,6-dichloro - phenoxyacetamido - ethyl) - benzenesulfonyl]-N'-cyclohexyl-urea (melting point: 189–190.5°) (from methanol), the N-[4-(β-2-methyl-4,6-dichloro-phenoxyacetamido-ethyl)-benzenesulfonyl]-N'-(4 - methylcyclohexyl)-urea (trans) (melting point: 173–175°) (from methanol) and the N-[4-(β-2-methyl-4,6-dichlorophenoxyacetamido-ethyl)-benzenesulfonyl]-N'-(4 - ethyl - cyclohexyl) - urea (trans) (melting point: 180–180.5°) (from methanol), from 4-(β-3,4-dichlorophenylacetamido - ethyl) - benzenesulfonamide (melting point: 132–134°) the N-[4-(β-3,4-dichlorophenylacetamido-ethyl)-benzenesulfonyl] - N' - cyclohexyl-urea (melting point: 192–194°) (from dimethylformamide/water) and the N-[4-(β-3,4-dichlorophenylacetamido-ethyl)-benzenesulfonyl]-N' - (4 - methylcyclohexyl)-urea (trans) (melting point: 178–179°) (from dimethylformamide/water), from 4-(β-3,4-dimethoxyphenylacetamido-ethyl)-benzenesulfonamide (melting point: 158–160°) the N-[4-(β-3,4-dimethoxyphenylacetamido-ethyl)-benzenesulfonyl] - N' - cyclohexyl - urea (melting point: 174–176°) (from methanol) and the N-[4-(β-3,4-dimethoxyphenylacetamido-ethyl)-benzenesulfonyl] - N' - (4-methylcyclohexyl)-urea (trans) (melting point: 161–163°) (from methanol/dimethylformamide), from 4-(β-3,4-dichlorocinnamoylamido - ethyl)- benzenesulfonamide (melting point: 201–203°) the N-[4-(β-3,4-dichlorocinnamoylamido-ethyl)-benzenesulfonyl]-N'-cyclohexyl- urea (melting point: 203–204°) (from dimethylformamide/water) and the N-[4-(β-3,4-dichlorocinnamoylamido-ethyl)-benzenesulfonyl]-N'-(4-methylcyclohexyl)-urea (trans) (melting point: 196–198°) (from dimethylformamide/water).

EXAMPLE 57

N - [4 - (β - <α,α - diethyl - 4 - chlorophenylacetamido>-ethyl)-benzenesulfonyl]-N'-(4-methylcyclohexyl) - urea (trans)

15 g. of 4-[β-(α,α-diethyl-4-chlorophenylacetamido)-ethyl]-benzenesulfonamide (melting point: 118–119°) (from alcohol/water) were dissolved in 18.4 ml. of 2 N-sodium hydroxide solution and 35 ml. of acetone and, at 0–5°, 5.4 g. of 4-methylcyclohexylisocyanate (trans) were added dropwise, while stirring. The stirring of the reaction mixture was continued for 3 hours, the whole was diluted with water and methanol and the undissolved matter was filtered off. The N-[4-(β-<α,α-diethyl-4-chloro-phenylacetamido>-ethyl) - benzenesulfonyl] - N' - (4 - methyl-cyclohexyl)-urea (trans) obtained in crystalline form by acidifying the filtrate was found to melt after recrystallization from a mixture of dimethylformamide and water at 190–191°.

In the same manner, there was obtained: N-[4-(β-<α,α-diethyl-4-chlorophenylacetamido> - ethyl) - benzenesulfonyl]-N'-(cyclohexyl)-urea (melting point: 189–191°) (from dimethylformamide/water).

In analogous manner, there were obtained: from 4-[β-(α,α-diethylphenylacetamido)-ethyl]-benzene-sulfonamide (melting point: 134–136°) the N-[4-(β-<α,α-diethylphenylacetamido>-ethyl)-benzenesulfonyl] - N' - cyclohexyl - urea (melting point: 198–198.5°) (from methanol), the N-[4-(β-<α,α-diethylphenylacetamido> - ethyl)-benzenesulfonyl]-N'-butyl-urea (melting point: 150–152°) (from methanol) and the N-[4-(β-<α,α-diethylphenylacetamido>-ethyl)-benzensulfonyl]-N' - (4 - methylcyclohexyl)-urea (melting point: 170–172°) (from methanol), from 4-[β - (γ - phenylvaleramido) - ethyl]-benzenesulfonamide (melting point: 105°) the N-[4-(β-<γ-phenylvaleramido>-ethyl)-benzensulfonyl] - N' - (4 - methylcyclohexyl)-urea (trans) (melting point: 141–143°) (from methanol), from 4-[β-(α-benzylbutyramido)-ethyl]-benzenesulfonamide (melting point: 132–134°) (from methanol/water), the N-[4 - (β - <α - benzylbutyramido>- ethyl)-benzenesulfonyl] - N' - cyclohexyl - urea (melting point: 172–174°) (from methanol), the N-[4-β-<α-benzylbutyramido> - ethyl) - benzenesulfonyl] - N' - (4-methylcyclohexyl)-urea (trans) (melting point: 187–188° C.) (from methanol) and the N-[4-(β-<α-benzylbutyramido> - ethyl) - benzenesulfonyl] - N' - (4-ethylcyclohexyl)-urea (trans) (melting point: 168–170° C.) (from methanol); from 4 - (α,α - diethylphenylacetamido-methyl)-benzenesulfonamide (melting point: 128–129° C.) the N-[4-(α,α-diethylphenylacetamido-methyl)-benzenesulfonyl]-N' - cyclohexyl - urea (melting point: 184–185° C.) (from dimethylformamide/water), the N-[4-(α,α-diethylphenylacetamido-methyl) - benzenesulfonyl]-N'-butyl-urea (melting point: 160° C.) (from methanol) and the N-[4-(α,α-diethylphenylacetamido-methyl)-benzenesulfonyl]-N'-(4-methylcyclohexyl) - urea (trans) (melting point: 202–203° C.) (from dimethylformamide/water); from 4-(β-<3-methoxy-α,α-diethylphenylacetamido>-ethyl)-benzenesulfonamide (melting point: 129° C.) the N-[4-(β-<-3-methoxy-α,α-diethylphenylacetamido> - ethyl) - benzenesulfonyl] - N'-cyclohexyl-urea (melting point: 191–193° C.) (from ethanol/water), the N-[4-(β-<3-methoxy-α,α-diethyl-phenylacetamido>-ethyl)-benzenesulfonyl]-N'-(4-methyl - cyclohexyl)-urea (melting point: 151–153° C.) (from ethanol/water).

In analogous manner, there were obtained: from 4-[β-(β-methyl-β-phenylbutyramido) - ethyl] - benzenesulfonamide (melting point: 133–135° C.) (from dilute methanol) the N-[4 - (β - <β - methyl-β - phenylbutyramido>-ethyl) - benzenesulfonyl] - N' - cyclohexyl - urea (melting point: 157.5–159.5° C.) (from dilute methanol), the N-[4-(β-<β-methyl-β-phenylbutyramido>-ethyl) - benzenesulfonyl]-N'-4-methyl-cyclohexyl-urea (melting point: 194–196° C.) (from dilute methanol) and the N-[4-(β-<β-methyl - β - phenylbutyramido> - ethyl)-benzenesulfonyl]-N'-butyl-urea (melting point: 134–136° C.) (from dilute methanol).

EXAMPLE 58

N-[4-(β-<α-phenyl-β-methyl-butyramido>-ethyl)-benzenesulfonyl]-N'-cyclohexyl-urea 18 g. of 4-(β-<α-phenyl-β-methyl-butyramido>-ethyl)-benzenesulfonamide (melting point: 163–165° C.) (from dilute methanol) were dissolved in 250 ml. of acetone. After the addition of 13.8 g. of K₂CO₃ the whole was heated under reflux in the course of 1 hour to the boil, while stirring.

After the addition of 6.25 g. of cyclohexyl isocyanate stirring and heating were continued for 8 hours. The solvent was then distilled off and the residue was taken up in water. By acidifying the filtered solution a crystalline precipitate of N-[4-(β-<α-phenyl-β-methyl-butyramido>-ethyl)-benzenesulfonyl]-N'-cyclohexyl-urea was obtained. The substance was found to melt, after recrystallization from dilute methanol, at 176–178° C.

In the same manner, there was obtained from the same sulfonamide by using 4-methyl-cyclohexylisocyanate (trans) the N-[4-(β-<α-phenyl-β-methyl-butyramido>-ethyl)-benzene-sulfonyl]-N'-(4-methyl-cyclohexyl) - urea (melting point: 224–226° C.) (from dilute methanol) and by using n-butyl-isocyanate the N-[4-(β-<α-phenyl-β-methyl - butyramido>-ethyl) - benzenesulfonyl] - N '- n-butyl-urea (melting point: 137–139° C.) (from acetic ester).

In analogous manner, there were obtained: from 4-(β-<β-methyl-β-phenyl-butyramido> - ethyl)-benzene - sulfonamide (melting point: 133–135° C.) the N-4-[β-(<β-methyl-β-phenyl-butyramido> - ethyl)-benzenesulfonyl]-N'-butyl-urea (melting point: 134–136° C.) (from dilute methanol), the N-4-[β-(<β-methyl-β-phenyl-butyramido > - ethyl)-benzenesulfonyl]-N'-cyclohexyl-urea (melting point: 157.5–159.5° C.) (from dilute methanol) and the N-4-[β-(<β-methyl-β-phenyl-butyramido> - ethyl)-ben - zenesulfonyl]-N'-4-methyl-cyclohexyl-urea (trans) (melting point: 194–196° C.) (from dilute methanol); from 4 - (β - 3,4,5-trimethoxybenzamidopropyl)-benzenesulfonamide (melting point: 176° Cl) the N-[4-(β-3,4,5-trimethoxybenzamidopropyl)-benzenesulfonyl] - N' - cyclohexyl-urea (melting point: 215° C.) (from acetone/water); from 4-(γ-3,4,5-trimethoxybenzamidopropyl)-benzenesulfonamide (melting point: 181–183° C.) the N-[4 - (γ-3,4,5 - trimethoxybenzamidopropyl)benzenesulfonyl]-N'-(4 - methylcyclohexyl) - urea (melting point: 166° C.) (from ethanol/water).

EXAMPLE 59

N-[4-(β-benzophenone-4-carbonamido-ethyl)-benzenesulfonyl]-N'-cyclohexyl-urea 11.5 g. of 4-(β-benzophenone-4-carbonamido-ethyl)-benzenesulfonamide (melting point: 240–242° C.) were introduced into 100 ml. of acetone together with 8 g. of finely ground potassium carbonate. The whole was stirred and heated under reflux to the boil. After 1 hours, 3.6 g. of cyclohexylisocyanate were added dropwise while further stirring and heating and stirring were continued for 4 hours at the boiling temperature of the acetone. The acetone was distilled off in vacuo, the residue obtained was treated with water and hydrochloric acid. The crystal paste obtained was suction-filtered and washed with water. The N-[4-(β-benzophenone - 4 - carbonamido-ethyl)-benzenesulfonyl]-N'-cyclohexyl-urea was obtained as crude product in a good yield. After recrystallization from a mixture of methanol and dioxane, the substance was found to melt at 222–224° C.

In analogous manner, there was obtained from the above-defined benzenesulfonamide by using 4-methyl-cyclohexyl-isocyanate the N-[4-(β-benzophenone-4-carbonamido-ethyl)-benzenesulfonyl]-N - 4 - methyl-cyclohexyl-urea (melting point: 217–219° C.) (from methanol/dioxane).

EXAMPLE 60

N-[4-(α-ethyl-β-benzamido-ethyl)-benzenesulfonyl]-N'-cyclohexyl-urea 16.6 g. of 4-(α-ethyl-β-benzamido-ethyl)-benzenesulfonamide (melting point: 185–187° C.) obtained from benzoic acid-(β-phenylbutyl)-amide by the reaction with chlorosulfonic acid and subsequent treatment with ammonia) were dissolved in 25 ml. of 2 N-sodium hydroxide solution and 50 ml. of acetone and, at 0–5° C., 6.5 g. of cyclohexylisocyanate were added dropwise. Stirring was continued for 2–3 hours, the whole was diluted with water filtered and the filtrate was acidified with dilute hydrochloric acid. The precipitated product was suction-filtered and recrystallized from methanol. (Melting point: 189–190° C.)

In analogous manner, there were obtained: the N-[4-(α-ethyl-β-benzamido-ethyl)-benzenesulfonyl] - N' - (4-methylcyclohexyl)-urea (trans) (melting point: 184° C.) (from methanol); from 4-(α-ethyl-β-4-chlorobenzamido-ethyl)-benzenesulfonamide (melting point: 177° C.) the N-[4-(α-ethyl-β - 4 - chlorobenzamido - ethyl)benzenesulfonyl]-N'-cyclohexyl-urea (melting point: 201.5–203° C.) (from methanol/dimethylformamide), the N-[4-(α-ethyl-β-4-chlorobenzamido-ethyl) - benzenesulfonyl - N' - (4-methylcyclohexyl)-urea (trans) (melting point: 206–207° C.) (from methanol/dimethylformamide) and the N - [4 - (α-ethyl-β-4-chlorobenzamido-ethyl)-benzenesulfonyl] - N' - (4 - ethylcyclohexyl) - urea (trans) (melting point: 205–207° C.) (from dimethylformamide/water); from 4-(α,α-dimethyl-β-benzamido - ethyl) - benzenesulfonamide (melting point: 223–216° C.) the N-[4-(α,α-dimethyl-β-benzamido-ethyl)-benzenesulfonyl]-N' - cyclohexyl-urea (melting point: 195–197° C.) (from methanol) and the N-[4-(α,α-dimethyl-β-benzamido-ethyl)-benzenesulfonyl]-N'-4 - methylcyclohexyl - urea (trans) (melting point: 190–191° C.); from 4-(δ-benzamido-butyl)-benzenesulfonamide (melting point: 193° C.) the N-[4-(δ-benzamidobutyl) - benzenesulfonyl] - N' - cyclohexyl-urea (melting point: 173° C.) (from methanol/water).

EXAMPLE 61

N-[-(β-benzenesulfonylacetamido-ethyl)-benzenesulfonyl]-N'-cyclohexyl-urea 15.3 g. of 4-(β-benzenesulfonylacetamido-ethyl)-benzene-sulfonamide (melting point: 184–187° C.) were suspended in 20 ml. of 2N-sodium hydroxide solution and 40 ml. of acetone and, at 0–5° C., 5.5 g. of cyclohexylisocyanate were added dropwise. Stirring was continued for 3 hours, the whole was diluted with water and methanol, filtered and the filtrate was acidified. The N-[4-(β-benzenesulfonylacetamido-ethyl) - benzenesulfonyl]-N'-cyclohexyl-urea precipitating in crystalline form was found to melt, after recrystallization from methanol, at 187–188° C.

In analogous manner, there were obtained: the N-[4-(β-benzenesulfonylacetamido-ethyl) - benzenesulfonyl] - N'-(4-methyl-cyclohexyl)-urea (trans) (melting point: 193–194° C.) (from methanol/dimethylformamide); from 4-[β-(β-benzenesulfonyl-propionamido) - ethyl] - benzenesulfonamide (melting point: 128° C.) the N-[4-(β-<β-benzenesulfonyl - propionamido> - ethyl) - benzenesulfonyl] - N' - cyclohexyl - urea (melting point: 193–194°) (from methanol) and the N([4-(β-<β-benzenesulfonyl-propionamido>-ethyl) - benzenesulfonyl]N' - (4-methyl-cyclohexyl-urea (trans) (melting point: 188–189.5° C.) (from methanol).

EXAMPLE 62

N-[4-(β-benzamido-propyl)-benzenesulfonyl]-N'-(3-methoxypropyl)-urea 6 g. of N-[4-(β-benzamido-propyl)-benzenesulfonyl]-urethane (melting point: 76° C.), prepared by the reaction of 4-(β-benzamidopropyl)-benzenesulfonamide with chloroformic acid ethyl ester in acetone) were heated to the boil in 35 ml. of dioxane and 1.4 g. of methoxypropylamine, while stirring, until the expected quantity of methanol had distilled off. The whole was concentrated under reduced pressure by half the volume, the residue was dissolved in 1% ammonia, filtered and the filtrate was acidified with hydrochloric acid.

The crude product obtained was recrystallized from a mixture of ethanol and water. (Melting point: 153° C.)

In analogous manner, there was prepared: the N-[4-(β - benzamidopropyl) - benzenesulfonyl] - N' - furfuryl-urea (melting point: 170° C.) (from ethanol/water).

EXAMPLE 63

N-[4-chloro-3-(β-benzamido-ethyl)-benzenesulfonyl]-N'-(4-methylcyclohexyl)-urea (trans)

10 g, of 4-chloro-3-(β-benzamido-ethyl)-benzenesulfonamide (melting point: 193–195° C.), obtained from 2-(β-benzamido-ethyl)-chlorobenzene by the reaction with chlorosulfonic acid and subsequent treatment with ammonia) were dissolved in 14.8 ml. of 2 N-sodium hydroxide solution and 30 ml. of acetone and, at 0–5° C., 4.3 g. of 4-methylcyclohexylisocyanate (trans) were added dropwise, while stirring. Stirring was continued for 3 hours, the whole was diluted with water and methanol, filtered and the filtrate was acidified with dilute hydrochloric acid. The urea obtained was suction-filtered and found to melt, after recrystallization from a mixture of dimethylformamide and water, at 179–180° C.

In analogous manner, there were obtained: the N-[4 - chloro - 3 - (β - benzamido - ethyl) - benzenesulfonyl]-N'-cyclohexyl-urea (melting point: 106–108° C.) (decomposition contained 1 H$_2$O) (from methanol); from 4 - chloro - 3 - (benzamidomethyl) - benzenesulfonamide (melting point: 163–165° C.) the N-[4-chloro-3 - (benzamidomethyl) - benzenesulfonyl] - N' - cyclohexyl-urea (melting point: 180° C.) (from methanol) and the N - [4-chloro-3-(benzamidomethyl)-benzenesulfonyl] - N' - (4-methylcyclohexyl)-urea (trans) (melting point: 182–183° C.) (from methanol/water); from 2,4,6-trimethyl - 3 - (β - benzamidoethyl) - benzenesulfonamide (melting point: 198–200° C.) the N-[2,4,6-trimethyl-3-(β - benzamido - ethyl) - benzenesulfonyl] - N' - cyclohexyl-urea (melting point: 197–198° C.) (from dimethylformamide/water), the N - [2,4,6 - trimethyl - 3 - (β-benzamido - ethyl) - benzenesulfonyl] - N' - butyl - urea (melting point: 209–211° C.) (from dimethylformamide/water), the N - [2,4,6 - trimethyl - 3 - (β - benzamido-ethyl) - benzenesulfonyl - N' - (4 - methylcyclohexyl)-urea (trans) (melting point: 209–210° C.) (from dimethylformamide/water), and the N - [2,4,6 - trimethyl-3 - (β - benzamido - ethyl) - benzenesulfonyl] - N' - (4-ethylcyclohexyl)-urea (trans) (melting point: 197–199° C.) (from dimethylformamide/water); from 4-chloro-3-(4 - chlorobenzamidomethyl) - benzenesulfonamide (melting point: 130° C.) (decomposition) the N-[4-chloro - 3 - (4 - chlorobenzamidomethyl) - benzenesulfonyl] - N' - (4-methylcyclohexyl)-urea (trans) (melting point: 210–211° C.) (from dimethylformamide/water).

EXAMPLE 64

N-[4-(β-4-phenyl-benzamido-ethyl)-benzenesulfonyl]-N'-cyclohexyl-urea 3.2 g. of N-[4-(β-aminoethyl)-benzenesulfonyl]-N'-cyclohexyl-urea were dissolved in 5 cc. of 2 N-sodium hydroxide solution; 2.2 g. of p-diphenyl-carbonic acid chloride were added dropwise and the whole was heated for 5 hours to 40° C. The reaction product was then suction-filtered, washed with ether and dissolved in dilute ammonia; after filtration, it was precipitated with dilute hydrochloric acid. Yield: 85%; (Melting point: 226–227° C.).

EXAMPLE 65

N-[4-(β-<α-phenylmercapto-acetamido>-ethyl)-benzenesulfonyl]-N'-cyclohexyl-urea

The compound was prepared analogously to Example 64 from N - [4 - (β - aminoethyl) - benzenesulfonyl]-N'-cyclohexyl-urea and phenylmercaptoacetyl chloride. Melting point: 148–149° C. after recrystallization from alcohol.

In analogous manner, there was obtained: the N-[4-(β-<α - phenyl - cyclopentane - carbonamido> - ethyl)-benzenesulfonyl] - N' - cyclohexyl - urea. Melting point: 113–115° C. after recrystallization from alcohol.

EXAMPLE 66

N-[3-(β-benzamido-ethyl)-benzenesulfonyl]-N'-cyclohexyl-urea

A solution of 6.5 g. of 3-sulfamyl-benzylcyanide was hydrogenated in 400 ml. of glacial acetic acid at normal pressure and at room temperature with palladium black as catalyst. After about 1 hour, the calculated amount of hydrogen was bound. The filtrate which had been separated from the catalyst was evaporated to dryness under reduced pressure, the sirup-like residue was dissolved in 200 ml. of water, neutralized with sodium hydroxide solution and then combined with 2 mols of NaOH (calculated on the sulfonamide used). A slight turbidity was removed with charcoal. Subsequently, the benzoyl chloride (about 10% excess) was added dropwise, while stirring. After 2 hours, the crystalline precipitate was dissolved by the addition of 2 N-sodium hydroxide solution and the 3-(β-benzamido-ethyl)-benzenesulfonamide was precipitated by adjusting the pH-value to 9. It was suction-filtered, washed with water and dried in vacuo. Yield: 85% of the theory, melting point: 159–160° C.

The sulfonamide thus obtained was reacted in aqueous-acetonic solution in the presence of sodium hydroxide solution with excess cyclohexylisocyanate. On working up in the usual manner 31% of the sulfonamide used as starting material were re-obtained and the N-[3-(β-benzoamido - ethyl) - benzenesulfonyl] - N' - cyclohexyl-urea was obtained as a product containing water of crystallization. Melting point: 115° C. and decomposition. The substance contained about 1.5% of water of crystallization and was pure according to paper-chromatography.

In analogous manner, there were obtained: from 3-(β-4-chlorobenzamido-ethyl)-benzenesulfonamide (melting point: 178–179° C.) the N-[3-(β-4-chlorobenzamidoethyl)-benzenesulfonyl]-N'-cyclohexyl-urea (melting point: 118° C.) (decomposition) with a content of water of crystallization of about 1.2%; from 3-(β-3,4-dichlorobenzamidoethyl)-benzenesulfonamide (melting point: 144–145° C.) the N-[3-(β-3,4-dichlorobenzamido-ethyl)-benzenesulfonyl]-N'-cyclohexyl-urea (melting point: 130–135° C.) (decomposition) with a content of water of crystallization of about 2.3%; from 3-(β-3-fluorobenzamido-ethyl)-benzenesulfonamide (melting point: 147–148° C.) the N-[3-(β-3-fluorobenzamido-ethyl)-benzenesulfonyl]-N'-cyclohexyl-urea (melting point: 127–129° C.) (from ethanol); from 3-(β-3-methylbenzamidoethyl)-benzenesulfonamide (melting point: 149–150° C.) the N-[3-(β-3-methylbenzamido-ethyl)-benzenesulfonyl]-N'-cyclohexyl-urea (melting point: 105–107° C.) (under decomposition) with a content of water of crystallization of 0.9%.

EXAMPLE 67

N-[3-(β-benzamido-ethyl)-benzenesulfonyl]-N'-(4-methylcyclohexyl)-urea 30.4 g. of the 3-(β-benzamido-ethyl)-benzenesulfonamide prepared according to Example 66 were dissolved in 1 l. of acetone. After the addition of 41 g. of $K_2CO_3$ and 14 ml. of chloroformic acid ethyl ester, the whole was heated under reflux for 6 hours. After cooling, 200 ml. of water were added and the upper aqueous-acetonic layer was separated. The acetone was evaporated under reduced pressure, the residue was diluted with 600 ml. of water and the solution obtained was adjusted to a pH-value of 8.5 by means of dilute hydrochloric acid. The whole was allowed to stand for some hours and the sulfonamide used as starting material which had crystallized out was suction-filtered. The N-[3-(β-benzamido-ethyl)-benzenesulfonyl]-ethylurethane which, on acidifying the filtrate (pH 4) had precipitated as a viscous mass, was taken up in methylene chloride, the solution obtained was dried over sodium sulfate and evaporated to dryness under reduced pressure. The residue (33 g.) was dissolved in a mixture of 500 ml. of toluene and 100 ml. of dimethylformamide and, after the addition of 11.2 g. of trans-4-methyl-cyclohexylamino heated under reflux for 1 hour. After cooling, the whole was extracted with 500 ml. of 0.5 N-sodium hydroxide solution and then once more with 250 ml. of 0.5 N-sodium hydroxide solution. The united extracts were washed one time with ether and adjusted to a pH-value of 8.5 by means of dilute hydrochloric acid. A small quantity of a viscous precipitate was separated and then the whole was adjusted to a pH-value of 6 by dropwise addition of dilute hydrochloric acid, while stirring. The N-[3-(β-benzamido-ethyl)-benzenesulfonyl]-N'-(4-methylcyclohexyl)-urea obtained as a product containing water of crystallization was found to melt at 115° C. under decomposition. The substance contained about 1.2% of water crystallization and was pure according to paper-chromatography.

In analogous manner, there were obtained: N-[3-(β-benzamido - ethyl) - benzenesulfonyl] - N' - (4 - ethyl) - cyclohexyl-urea (melting point: 120–125°) with a content of water of crystallization of about 1.2%; N-[3-(β-benzamido - ethyl) - benzenesulfonyl] - N' - cyclooctyl - urea (melting point: 115–120° C.) with a content of water of crystallization of about 1.5%; N-[3-(β-benzamido-ethyl)-benzenesulfonyl]-N'-n-propyl-urea (melting point: 129–130° C.) (from ethanol).

In analogous manner, there was, furthermore, obtained: from N-[3-(β-4-methylbenzamidoethyl)-benzenesulfonyl]-ethylurethane (melting point: 189–190° C.) the N - [3 - (β - 4 - methylbenzamidoethyl) - benzenesulfonyl]-N'-cyclohexyl-urea (melting point: 172–173° C.) (from ethanol).

EXAMPLE 68

N-[2-(β-benzamido-ethyl)-4-methoxy-benzenesulfonyl]-N'-n-butyl-urea (a) 65 g. of β-benzamido-ethyl-4-methoxybenzene were dissolved in 156 ml. of chloroform. To the solution 125 g. of chlorosulfonic acid were added dropwise, at —10–0° C., while vigorously stirring. The temperature of the reaction mixture was then allowed to rise to room temperature and, as soon as the evolution of hydrogen chloride and sulfur dioxide was complete, the reaction mixture was poured onto ice.

The aqueous phase was decanted, the sulfochloride formed was poured over with 300 ml. of concentrated ammonia and then heated on a water bath. After a short time, the sulfonamide formed precipitated. It was cooled, suction-filtered and washed thoroughly with water. Thus the 2-β-benzamido-ethyl-4-methoxy-benzenesulfonamide having a melting point of 159–160° C. was obtained.

(b) 16.7 g. of 2-β-benzamido-ethyl-4-methoxy-benzenesulfonamide (melting point: 159–160° C.) were suspended in 200 ml. of acetone and dissolved by the addition of 2 g. of sodium hydroxide solution and water.

To this solution 5 g. of n-butylisocyanate were added dropwise at room temperature, while stirring and stirring was continued for 2 hours. A slight precipitate formed was suction-filtered and the filtrate was combined with water and hydrochloric acid. The whole was suction-filtered and the product was recrystallized from a mixture of ethanol and water. The N-[2-(β-benzamido-ethyl)-4-methoxybenzenesulfonyl]-N′-n-butyl-urea was found to melt at 146° C.

In analogous manner, there were obtained: the N-[2-(β - benzamido - ethyl) - 4 - methoxy - benzenesulfonyl] - N′-cyclohexyl-urea (melting point: 166° C.) (from dilute ethanol); the N-[2-(β-benzamido-ethyl)-4-methoxy-benzenesulfonyl] - N′ - (4 - ethyl - cyclohexyl) - urea (melting point: 168-170° C.) (from dilute ethanol); the N-[2-(β - benzamido - ethyl) - 4 - methoxy - benzenesulfonyl] - N′-(4-methyl-cyclohexyl)-urea (melting point: 167–169° C.) (from dilute ethanol).

EXAMPLE 69

N-[4-(β-3,4-methylene-dioxybenzamido-ethyl)-benzenesulfonyl]-N′-cyclohexyl-urea 9 g. of 4-(β-3,4-methylene-dioxy-benzamidoethyl)-benzenesulfonamide (melting point: 227°, from methanol) were suspended in 12.5 ml. of 2 N-sodium hydroxide solution and 50 ml. of acetone and, at 0–5°, 3.4 g. of cyclohexyl-isocyanate were added dropwise. Stirring was continued for 3 hours, then the whole was dissolved by diluting with water, filtered and the filtrate was acidified with dilute acetic acid. The N-[4-(β-3,4-methylene-dioxy-benzamidoethyl)-benzenesulfonyl] - N′ - cyclohexyl-urea obtained in crystalline form was found to melt after recrystallization from a mixture of methanol and dimethylformamide at 208–210°.

In analogous manner, there was obtained: the N-[4-(β - 3,4 - methylene - dioxy - benzamidoethyl) - benzenesulfonyl]-N′-(4-methyl-cyclohexyl)-urea (trans) (melting point: 203–205°) (from methanol/dimethylformamide).

EXAMPLE 70

N-[4-(β-benzamido-ethyl)-2,3,5,6-tetramethyl-benzenesulfonyl]-N′-cyclohexyl-urea 9 g. of 4-(β-benzamido-ethyl)-2,3,5,6-tetramethyl-benzenesulfonamide (melting point: 257°, from dimethylformamide/water) were suspended in 12.5 ml. of 2 N-sodium hydroxide solution and 50 ml. of acetone and, at 0–5°, 3.2 g. of cyclohexylisocyanate were added dropwise. When stirring was continued for 3 hours the reaction mixture gradually dissolved. Subsequently, the whole was diluted with water and methanol, the undissolved matter was filtered off, the filtrate was acidified with dilute hydrochloric acid and the precipitated N-[4-(β - benzamido - ethyl) - 2,3,5,6 - tetramethyl - benzenesulfonyl]-N′-cyclohexyl-urea was recrystallized from a mixture of dimethylformamide and water. (Melting point: 208–209°).

In analogous manner, there was obtained: the N-[4-(β - benzamido-ethyl) - 2,3,5,6 - tetramethyl - benzenesulfonyl]-N′-(4-methyl-cyclohexyl)-urea (trans) (melting point: 209–211°) (from dimethylformamide/water).

EXAMPLE 71

N-[4-(β-2-diethylcarbamyl-benzamido-ethyl)-benzenesulfonyl]-N′-(4-methyl-cyclohexyl)-urea (trans)

12 g. of 4-(β-2-diethylcarbamyl-benzamido-ethyl)-benzenesulfonamide (melting point: 190–192°, from methanol) were dissolved in the form of the sodium salt in 15 ml. of 2 N-sodium hydroxide solution and 50 ml. of acetone and, at 0–5°, 4.3 g. of 4-methylcyclohexyl-isocyanate (trans) were added dropwise. Stirring was continued for 3 hours; then the whole was diluted with water and a small quantity of methanol, the undissolved matter was filtered off and the filtrate was acidified. The N - [4 - (β - 2 - diethylcarbamyl - benzamido - ethyl) - benzenesulfonyl]-N′-(4-methyl-cyclohexyl)-urea (trans) crystallizing after a short time was recrystallized from methanol and was found to melt at 193–195°.

In analogous manner, there was obtained: from 4-(β-2-benzyl - benzamido-ethyl) - benzenesulfonamide (melting point: 139–141°) the N-[4-(β-2-benzyl-benzamido-ethyl) - benzenesulfonyl] - N′-(4 - methyl-cyclohexyl)-urea (trans) (melting point: 207–209°) (from methanol).

What is claimed is:
1. A compound selected from the group consisting of a benzene sulfonyl urea of the formula

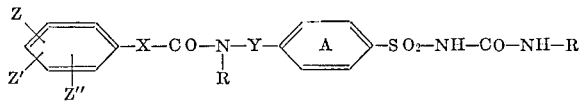

in which

R is hydrogen, methyl or benzyl;

R′ is (a) alkyl or alkenyl of 2 to 8 carbon atoms,
(b) alkoxyalkyl or alkylmercaptoalkyl of 4 to 8 carbon atoms, at least two of said carbon atoms forming the alkylene portion thereof,
(c) phenyl lower-alkyl of 7 to 9 carbon atoms or phenyl cyclopropyl,
(d) cyclohexyl lower alkyl, cycloheptylmethyl or cycloheptylethyl,
(e) 2,5-endoalkylene-cyclohexyl,
2,5-endoalkylene-cyclohexenyl,
2,5-endoalkylene-cyclohexylmethyl or
2,5-endoalkylene-cyclohexenylmethyl of 1 to 2 endoalkylene carbon atoms,
(f) lower alkyl-cyclohexyl or lower alkoxy-cyclohexyl,
(g) cycloalkyl of 5 to 8 carbon atoms,
(h) cyclohexenyl or cyclohexenylmethyl,
(i) oxanyl, thianyl, tetrahydrofuryl, furyl or thienyl, or
(j) tetrahydrofurylmethyl, tetrahydropyranylmethyl, furylmethyl or thiofurylmethyl;

X is a single chemical linkage or an alkylene bridge of 1 to 6 carbon atoms that may be interrupted by at most one member of the group O, S, SO or $SO_2$ an alkylene bridge of 2 to 3 carbon atoms;

Y is a straight or branched chain alkylene of 1 to 4 carbon atoms;

Z is hydrogen, lower alkyl, lower alkoxy, halogen, cycloalkoxy of 5 to 6 carbon atoms, cyclohexyl, lower alkyl mercapto, phenyl, phenyl lower alkyl, lower alkanoyl, benzoyl, trifluoromethyl, hydroxy, lower alkanoyloxy, benzyloxy, carboxy, lower carbalkoxy, nitrile, carbamyl, lower alkylcarbamyl, lower dialkyl-carbamyl or nitro;

Z′ and Z″ are hydrogen or (if Z is hydrogen, hydroxy, carboxy, alkyl, alkoxy or halogen) lower alkyl, lower alkyl lower alkoxy or halogen, or together being —$OCH_2O$— if Z is hydrogen;

the "A" phenylene being unsubstituted or substituted by halogen, lower alkyl or lower alkoxy; or a pharmaceutically acceptable basic salt thereof.

2. Compound of claim 1 wherein R is hydrogen.
3. Compound of claim 1 wherein R′ is cyclohexyl.
4. Compound of claim 1 wherein R′ is 4-methyl-cyclohexyl.
5. Compound of claim 1 wherein Z, Z′ and Z″ are hydrogen.
6. Compound of claim 1 wherein Y is dimethylene.
7. N - [4 - (β - benzamido - ethyl) - benzene - sulfonyl]-N′-cyclohexyl-urea.
8. N - [4 - (β - benzamido - ethyl) - benzene - sulfonyl]-N′-(4-methyl-cyclohexyl)-urea.
9. N - [4 - (β - 4 - methyl-benzamido-ethyl)-benzenesulfonyl]-N′-cyclohexyl-urea.
10. N - [4 - (β - 4 - methyl - benzamido - ethyl) - benzenesulfonyl]-N′-(4-methylcyclohexyl)-urea.
11. N - [4 - (β - 3 - methyl - benzamido - ethyl) - benzenesulfonyl]-N′-cyclohexyl-urea.
12. N - [4 - (β - 4 - methoxy - benzamido - ethyl) - benzenesulfonyl]-N′-(4-methyl-cyclohexyl)-urea.
13. N - [4 - (β - 4 - chloro-benzamido-ethyl)-benzenesulfonyl]-N′-cyclohexyl-urea.
14. N - [4 - (β - phenylacetamido - ethyl) - benzenesulfonyl]-N′-(4-methylcyclohexyl)-urea.

15. N - [4 - (β - phenoxyacetamido - ethyl) - benzenesulfonyl]-N'-cyclohexyl-urea.

16. N - [4 - (β - <phenoxypropionamido> - ethyl) - benzenesulfonyl]-N'-cyclohexyl-urea.

17. N - [4 - (β - benzamido - α - methyl - ethyl) - benzenesulfonyl]-N'-cyclohexyl-urea.

18. N - [4 - (β - benzamido - ethyl) - benzenesulfonyl]-N'-(4-ethylcyclohexyl)-urea.

19. N - [4 - (phenylacetamido-methyl) - benzenesulfonyl]-N'-(4-methyl-cyclohexyl)-urea.

20. N - (β-<β-phenylpropionamido>ethyl) - benzenesulfonyl]-N'-(4-methyl-cyclohexyl)-urea.

21. N - [4-(β-<3,4-dichlorophenylacetamido>ethyl)-benzenesulfonyl]-N'-cyclohexyl-urea.

22. N - [4-(β-benzamidoethyl)-benzenesulfonyl] - N'-cyclooctylurea.

23. Compound of claim 1 wherein R' is 4-ethylcyclohexyl.

24. Compound of claim 1 wherein Z is chlorine and Z' and Z" are hydrogen.

25. Compound of claim 1 wherein Z and Z' are chlorine and Z" is hydrogen.

26. Compound of claim 1 wherein Z is methyl and Z' and Z" are hydrogen.

27. N - [4-(β-<3-fluoro-benzamido>ethyl) - benzenesulfonyl]-N'-cyclohexyl-urea.

References Cited

UNITED STATES PATENTS 3,320,312   5/1967   Sigal et al. _____ 260—553

HENRY R. JILES, *Primary Examiner.*

H. I. MOATZ, *Assistant Examiner.*

U.S. Cl. X.R.

260—327, 332.2, 309.7, 345.7, 347.3, 347.2, 518, 519, 470, 471, 478, 465, 556, 453, 544, 543, 340.5, 564, 482, 577, 454, 326, 588, 583, 999

UNITED STATES PATENT OFFICE
CERTIFICATE OF CORRECTION

Patent No. 3,426,067                                February 4, 1969

Helmut Weber et al.

It is certified that error appears in the above identified patent and that said Letters Patent are hereby corrected as shown below:

Column 1, line 12, after "F 41,042" insert -- Feb. 20, 1964, F 42,062; May 21, 1964, F 42,933 and June 26, 1964, F43,268 --. Column 48, line 7, the left-hand benzene ring in the structural formula should appear as shown below:

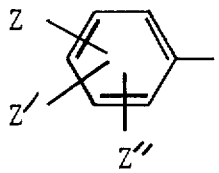

and, on the same line, the "R" at the extreme right end of the formula should read -- R′ --. Column 48, line 36, "an alkylene" should read -- , or an alkenylene --; lines 47 to 48, "lower alkyl", second occurrence, should be deleted.

Signed and sealed this 26th day of May 1970.

(SEAL)
Attest:

EDWARD M. FLETCHER, JR.                  WILLIAM E. SCHUYLER, JR.
Attesting Officer                              Commissioner of Patents